US011155366B2

(12) United States Patent
Helvajian

(10) Patent No.: US 11,155,366 B2
(45) Date of Patent: Oct. 26, 2021

(54) INTERLOCKING, RECONFIGURABLE, RECONSTITUTABLE, REFORMABLE CELL-BASED SYSTEM WITH NESTED RING STRUCTURES

(71) Applicant: The Aerospace Corporation, El Segundo, CA (US)

(72) Inventor: Henry Helvajian, Pasadena, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 538 days.

(21) Appl. No.: 15/945,617

(22) Filed: Apr. 4, 2018

(65) Prior Publication Data

US 2019/0023419 A1    Jan. 24, 2019

Related U.S. Application Data

(63) Continuation-in-part of application No. 15/655,972, filed on Jul. 21, 2017.

(51) Int. Cl.
*B64G 1/10* (2006.01)
*B64G 1/14* (2006.01)
(Continued)

(52) U.S. Cl.
CPC ............... *B64G 1/10* (2013.01); *B64G 1/222* (2013.01); *B64G 1/283* (2013.01); *B64G 1/36* (2013.01);
(Continued)

(58) Field of Classification Search
CPC .......... B64G 1/10; B64G 1/222; B64G 1/283; B64G 1/36; B64G 1/402; B64G 1/443; B64G 1/641; B64G 1/646; B64G 9/00
See application file for complete search history.

(56) References Cited

U.S. PATENT DOCUMENTS

| 3,169,725 A | 2/1965 | Berglund |
| 3,744,739 A | 7/1973 | Weaver et al. |
| (Continued) | | |

FOREIGN PATENT DOCUMENTS

| DE | 102014104695 A1 | 10/2015 |
| EP | 0541052 B1 | 2/1996 |
| (Continued) | | |

OTHER PUBLICATIONS

James Lee, "Advisory Action", dated Apr. 13, 2020, U.S. Appl. No. 15/655,972.

(Continued)

*Primary Examiner* — James Lee
(74) *Attorney, Agent, or Firm* — LeonardPatel PC

(57) ABSTRACT

Cell-based space systems with nested-ring structures that interlock and can change configuration to support a mission are provided. The cells may self-assemble into a larger structure to carry out a mission. Multiple rotatable rings may be included in a cell, with a payload/control section in the center. The rings may provide power and/or data to trams that move about the rails. Trams may interlock with other cells, carry sensors or other devices, etc. Cells may be stowed in a cell stack that is deployable. Such cell-based systems may have various applications in space, on Earth, other celestial bodies, and underwater.

37 Claims, 47 Drawing Sheets

(51) Int. Cl.
  B64G 9/00    (2006.01)
  B64G 1/22    (2006.01)
  B64G 1/28    (2006.01)
  B64G 1/36    (2006.01)
  B64G 1/40    (2006.01)
  B64G 1/64    (2006.01)
  B64G 99/00   (2009.01)
  B64G 1/44    (2006.01)
(52) U.S. Cl.
  CPC ............ *B64G 1/402* (2013.01); *B64G 1/443* (2013.01); *B64G 1/641* (2013.01); *B64G 1/646* (2013.01); *B64G 9/00* (2013.01); *B64G 2001/1092* (2013.01); *B64G 2700/24* (2013.01)

(56) References Cited

U.S. PATENT DOCUMENTS

| | | | |
|---|---|---|---|
| 3,785,590 | A | 1/1974 | Wentworth |
| 4,715,566 | A | 12/1987 | Nobles |
| 4,917,215 | A | 4/1990 | Pratt |
| 5,017,820 | A | 5/1991 | Culp |
| 5,104,070 | A | 4/1992 | Johnson et al. |
| 5,305,970 | A | 4/1994 | Porter et al. |
| 5,580,013 | A | 12/1996 | Velke |
| 6,402,624 | B1 | 6/2002 | Larson et al. |
| 6,536,712 | B1 | 3/2003 | Barenett |
| 6,568,638 | B1 | 5/2003 | Capots |
| 6,937,125 | B1 | 8/2005 | French |
| 2002/0066828 | A1 | 6/2002 | Nakamura et al. |
| 2008/0000515 | A1 | 1/2008 | Lin et al. |
| 2009/0078818 | A1 | 3/2009 | Zulkowski et al. |
| 2009/0230250 | A1 | 9/2009 | Wehner et al. |
| 2010/0264256 | A1* | 10/2010 | Yim ................ B64C 27/20 244/17.23 |
| 2010/0301676 | A1 | 12/2010 | Hernandez et al. |
| 2011/0180669 | A1 | 7/2011 | Johnson et al. |
| 2012/0199697 | A1 | 8/2012 | Nagabhushan et al. |
| 2014/0246544 | A1 | 9/2014 | Bullard et al. |
| 2014/0263844 | A1 | 9/2014 | Cook et al. |
| 2016/0130019 | A1 | 5/2016 | Jaeger |
| 2017/0055381 | A1 | 2/2017 | Tan et al. |
| 2019/0161213 | A1 | 5/2019 | Kreisel |

FOREIGN PATENT DOCUMENTS

| | | |
|---|---|---|
| GB | 2512088 B | 5/2019 |
| JP | H05330500 A | 12/1993 |
| JP | 2001253400 A | 9/2001 |
| WO | 2016130669 A1 | 8/2016 |
| WO | 2017194058 A1 | 11/2017 |

OTHER PUBLICATIONS

Cubli Page., http://robohub.org/swiss-robots-cubli-a-cube-that-can-jump-up-balance-and-walk-across-your-desk/ (last accessed Jul. 21, 2017).
DARPA "Satlets" Page, http://spectrum.ieee.org/tech-talk/aerospace/satellites/darpas-satellite-revival-program-gears-up-for-first-launch (last accessed Jul. 21, 2017).
DARPA Hydra System Page, https://www.darpa.mil/program/hydra (last accessed Jul. 21, 2017).
Detailed MIT M-Blocks Page, http://news.mit.edu/2013/simple-scheme-for-self-assembling-robots-1004 (last accessed Jul. 21, 2017).
Edwin A. Peraza-Hernandez, Darren J. Hartl, Richard J. Malak Jr., and Dimitris C. Lagoudas, "Origami-Inspired Active Structures: A Synthesis and Review," Smart Materials and Structures DOI: 10.1088/0964-1726/23/9/094001 (Aug. 2014).
H. Helvajian, "The generation after next: Satellites as an assembly of mass producible functionalized modules," Small Satellites: Past Present and Future, H. Helvajian, S. W. Janson Eds. (AIAA Press, Reston, VA), pp. 815-858 (2009).
M. R. Morgan and R. L. Lang, "Towards developing product applications of thick origami using the offset panel technique," Mech. Sc. 7, pp. 69-77 (2016).
MIT M-Blocks Page, https://www.technologyreview.com/s/523576/cubes-that-self-assemble/ (last accessed Jul. 21, 2017).
MTRAN3 Robot Page, http://www.robotpark.com/academy/modular-robots-mtran3/ (last accessed Jul. 21, 2017).
NASA SunTower Article, https://science.nasa.gov/science-news/science-at-nasa/2001/ast23mar_1 (last accessed Apr. 4, 2018).
Polymorphic Robotics Laboratory Page, https://www.isi.edu/robots/ (last accessed Jul. 21, 2017).
Wikipedia Mobius Strip Article, https://en.wikipedia.org/wiki/M%C3%B6bius_strip (last accessed Apr. 4, 2018).
W-M Shen, B. Salemi, P. Will, "Horomone-inspired adaptive communication and distributed control for CONRO self-configurable robots," IEEE Trans. Robotics & Automation, 18(5), p. 700 (2002).
James Lee, "Non-Final Office Action", dated Aug. 7, 2019, U.S. Appl. No. 15/655,972.
James Lee, "Restriction Requirement", dated Apr. 23, 2019, U.S. Appl. No. 15/655,972.
International Search Report and Written Opinion issued in PCT Application No. PCT/US18/37655 dated Oct. 29, 2018.
Patty Inglish, "The First Nation State in Space was Founded in Oct. 2016," available at https://web.archive.org/web/20161015011116/https://hubpages.com/education/The-First-Human-Nation-State-in-Space-Was-Founded-in-October (last accessed Nov. 2, 2018).
"G Gauge—Cross Clover Eztec Track Layout for Battery Operated Trains" published by Variety Discount, available at https://www.youtube.com/watch?v=6mE-5p4ICNs (Apr. 17, 2017).
"How to build a basic garden railroad, part 1" published by Garden Railways Mag, available at https://www.youtube.com/watch?v=rTpaHKF3-VQ (Apr. 3, 2012).
Invitation to Pay Additional Fees issued in PCT Application No. PCT/US2018/037655 dated Aug. 28, 2018.
PCT/ISA/206 form issued in PCT Application No. PCT/US2018/037651 on Aug. 6, 2018.
James Lee, "Final Office Action", dated Dec. 31, 2019, U.S. Appl. No. 15/655,972.
Blaine R. Copenheaver, "International Search Report & Written Opinion", dated Oct. 18, 2018, PCT Patent Application No. PCT/US18/37651.
David Barnhart et al., "Changing Satellite Morphology through Cellularization," AIAA Space 2012 Conference & Exposition, Reston, Virginia (Sep. 11, 2012).
Office Action issued in Canadian Application No. 3,070,366 dated Mar. 26, 2021.
David Barnhart et al., "Changing Satellite Morphology through Cellularization," American Institute of Aeronautics and Astronautics (Sep. 2012).
First Examination Report issued in NZ Application No. 760992 dated May 11, 2021.
First Examination Report issued in NZ Application No. 760993 dated May 11, 2021.

* cited by examiner

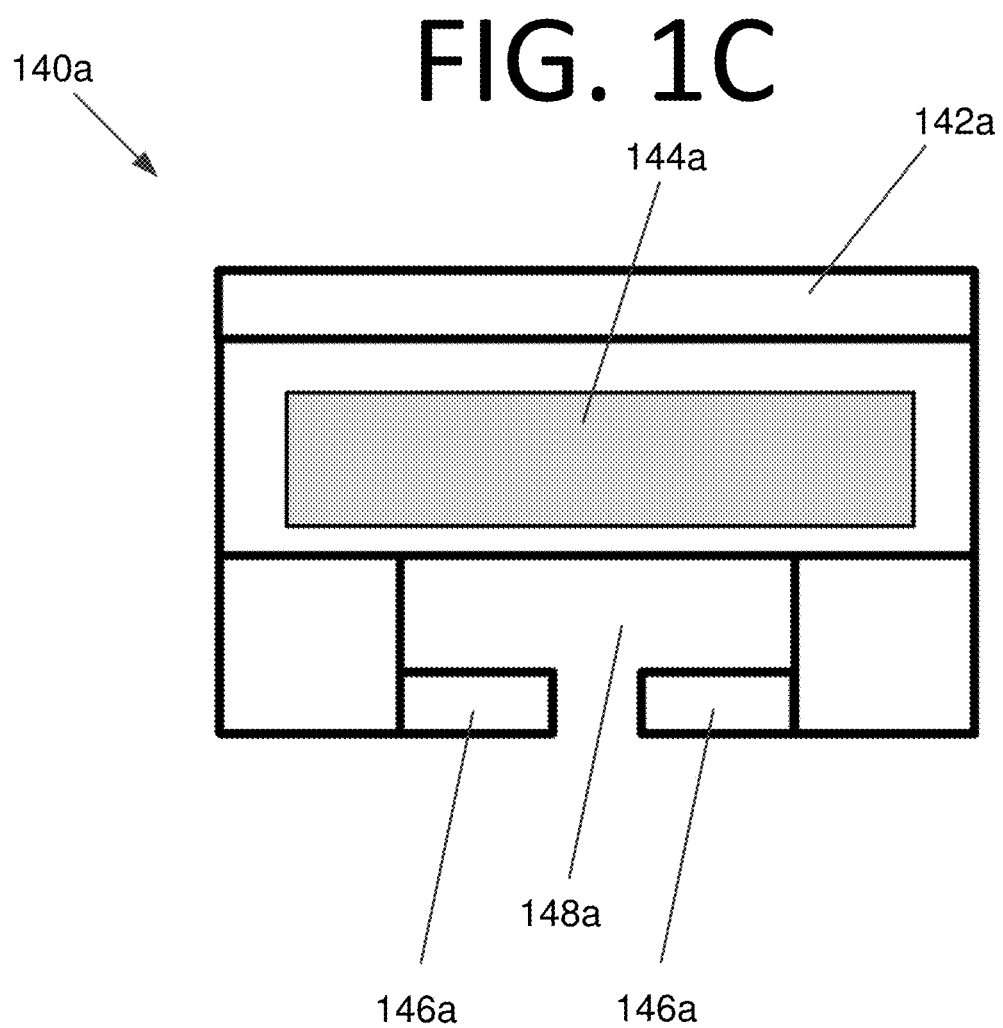

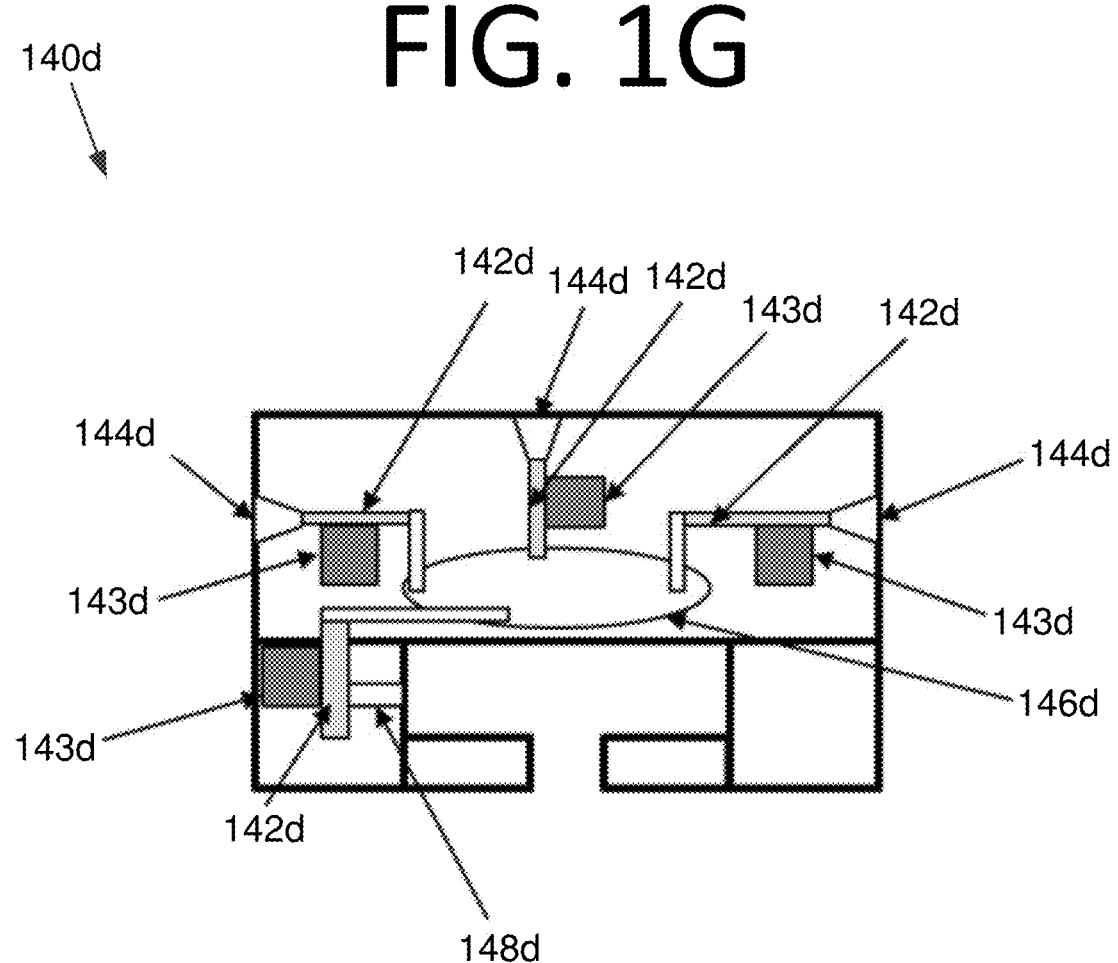

FIG. 1H
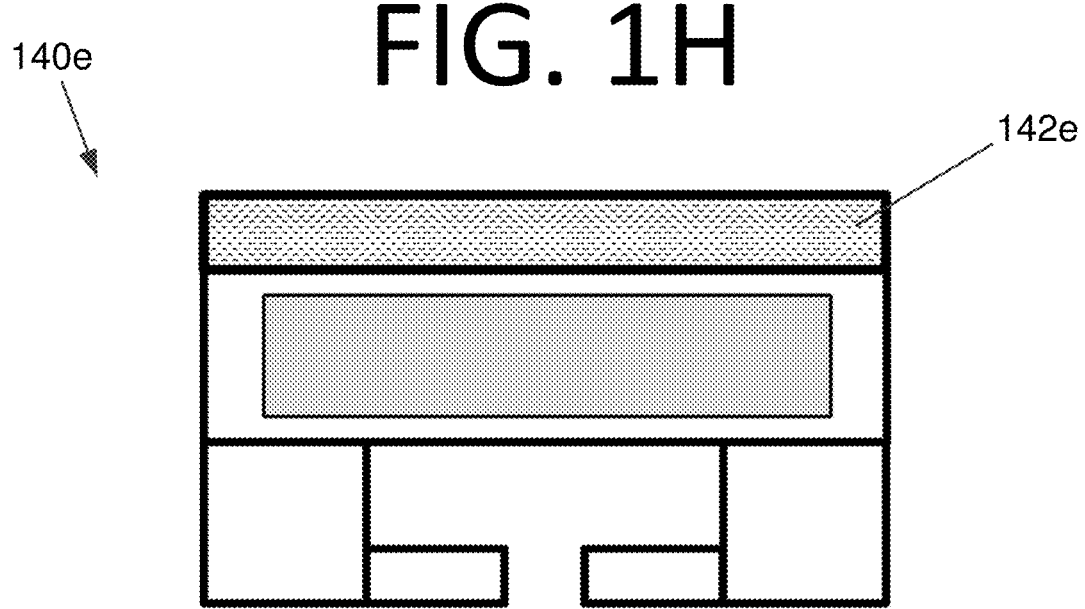
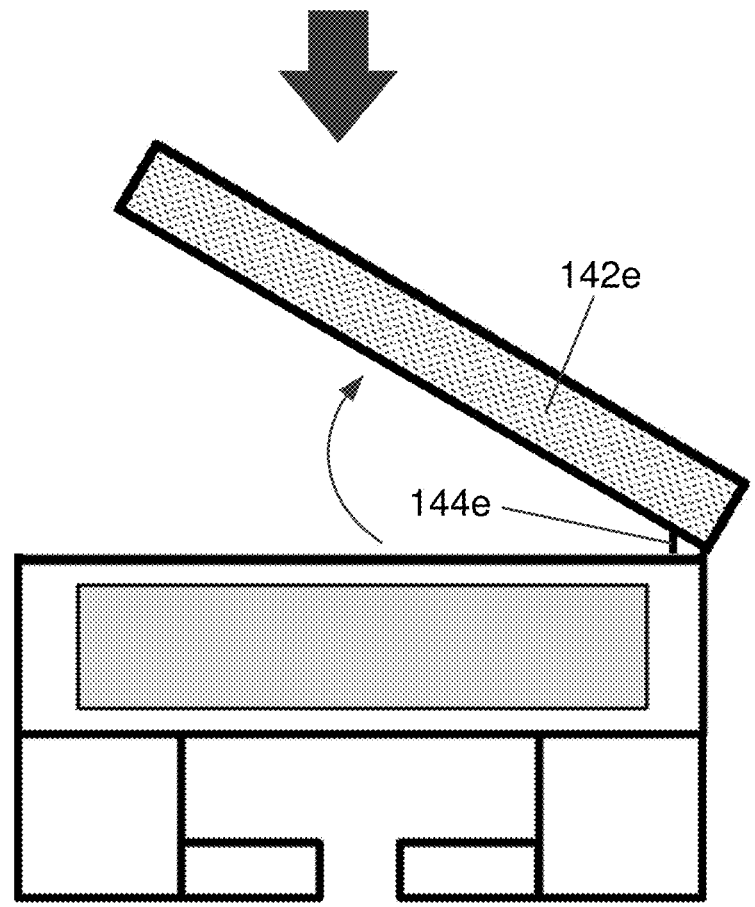

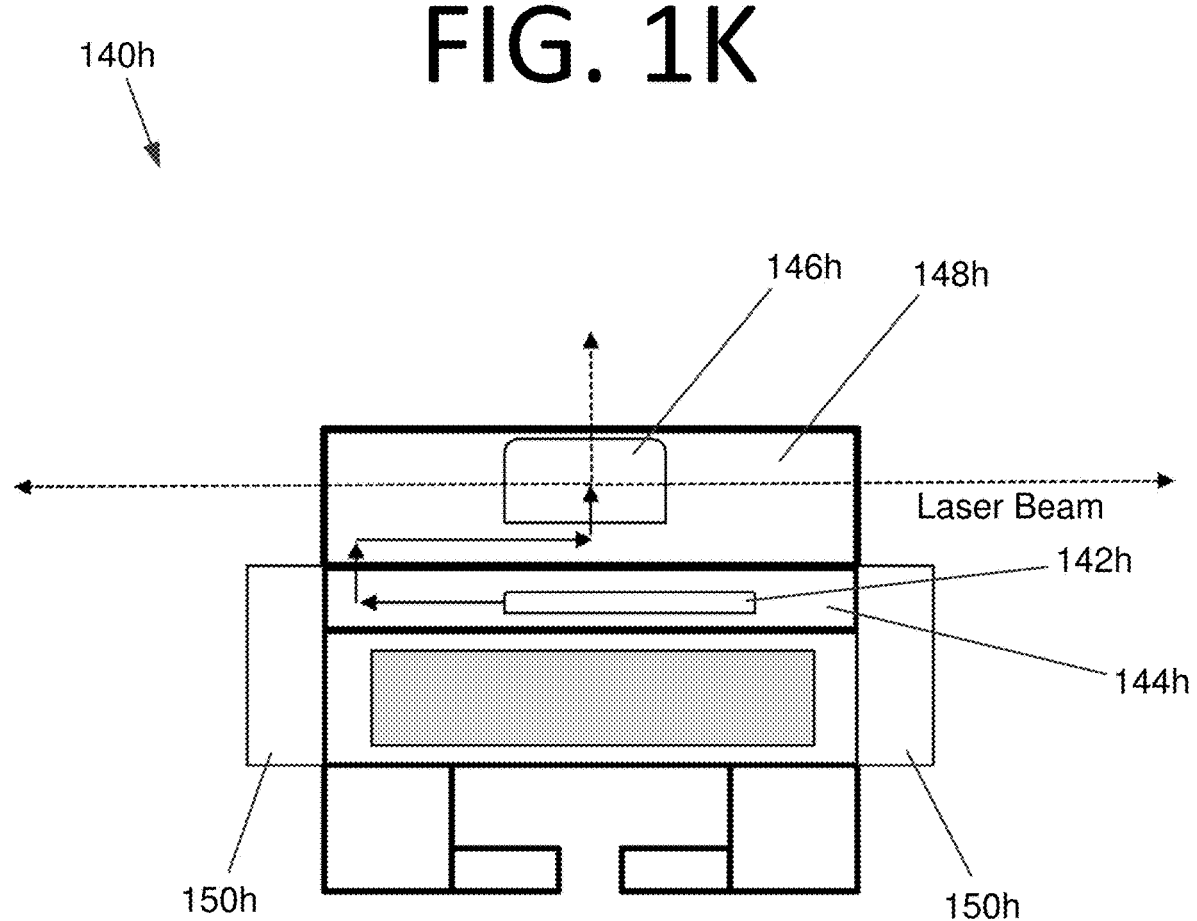

FIG. 3
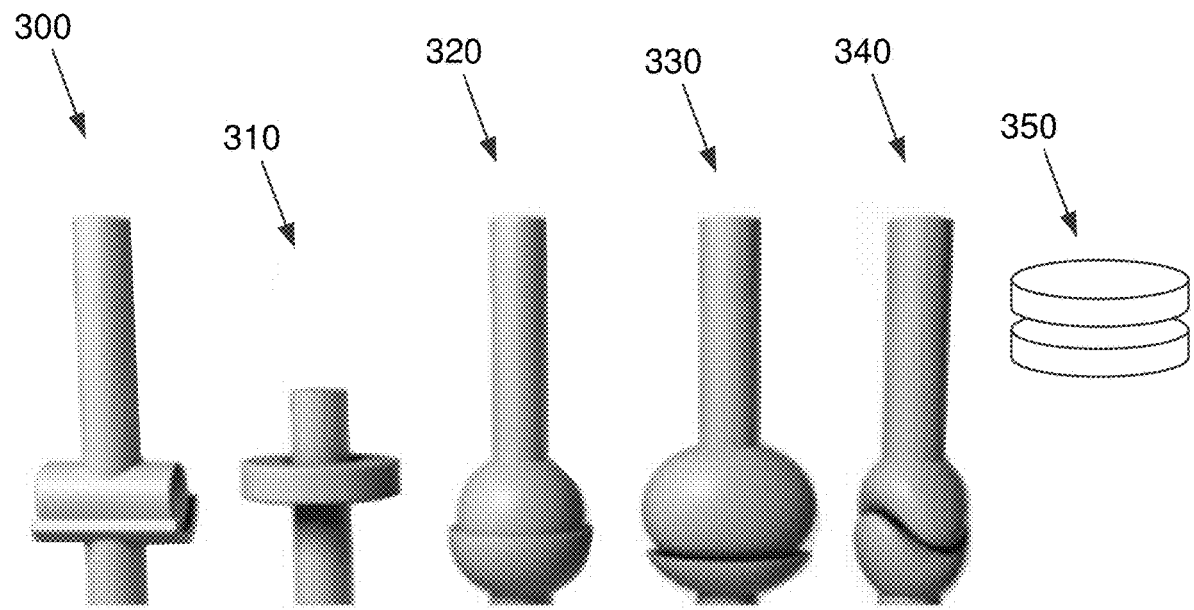
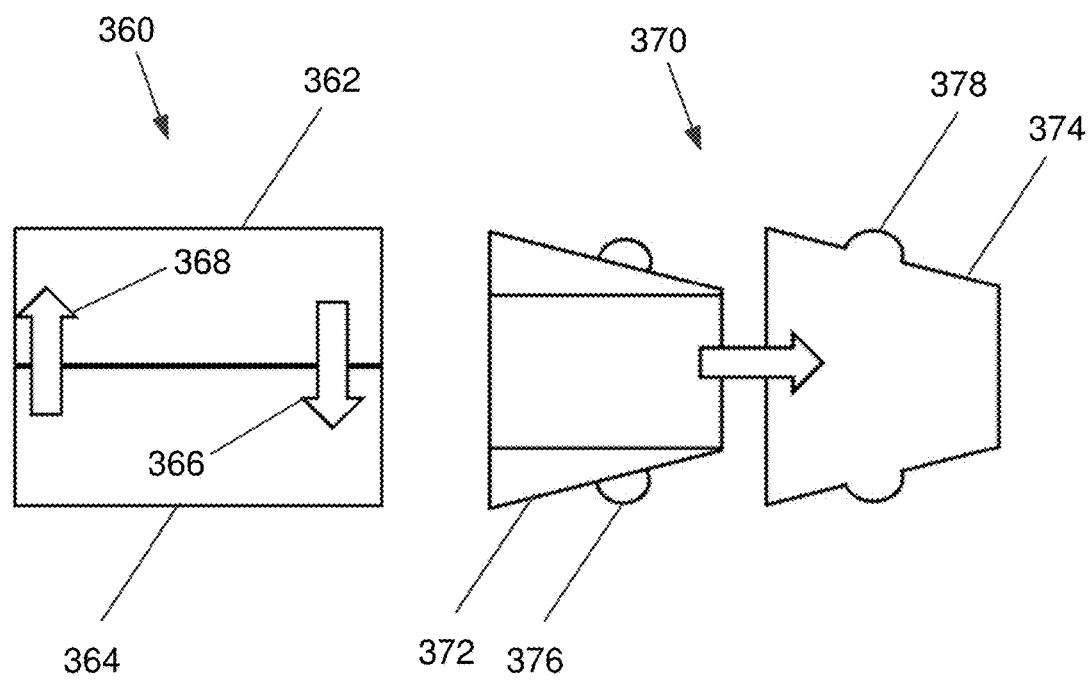

FIG. 4
400
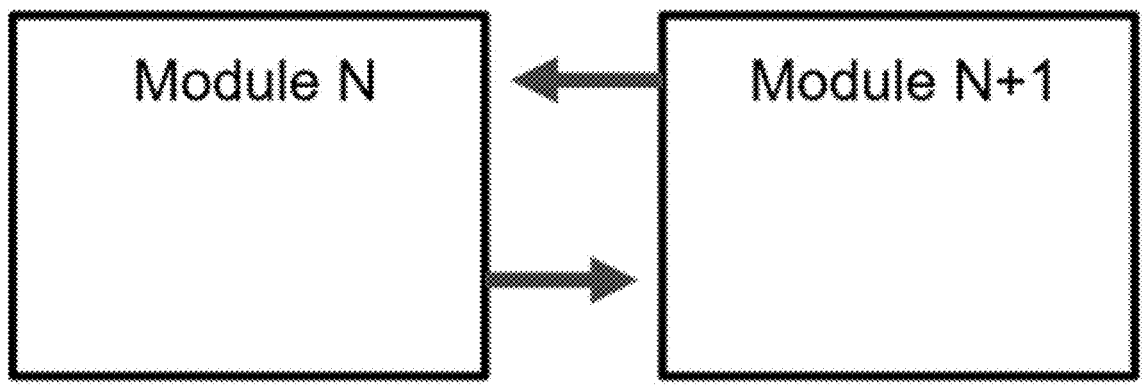
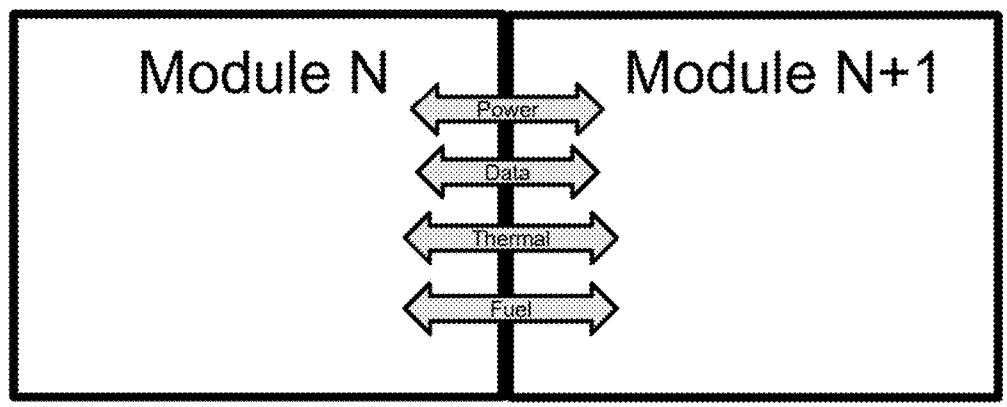

FIG. 7B
FIG. 7C
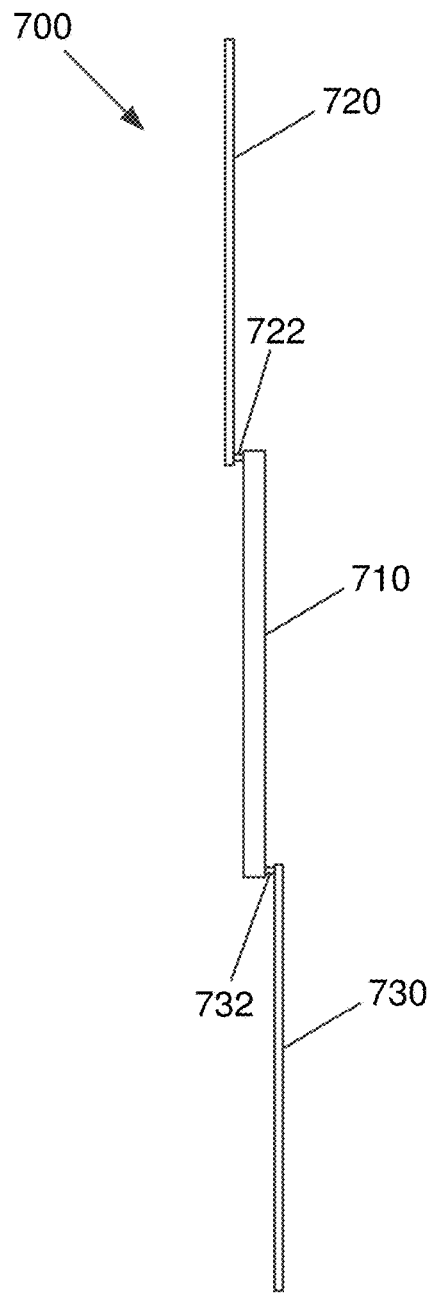
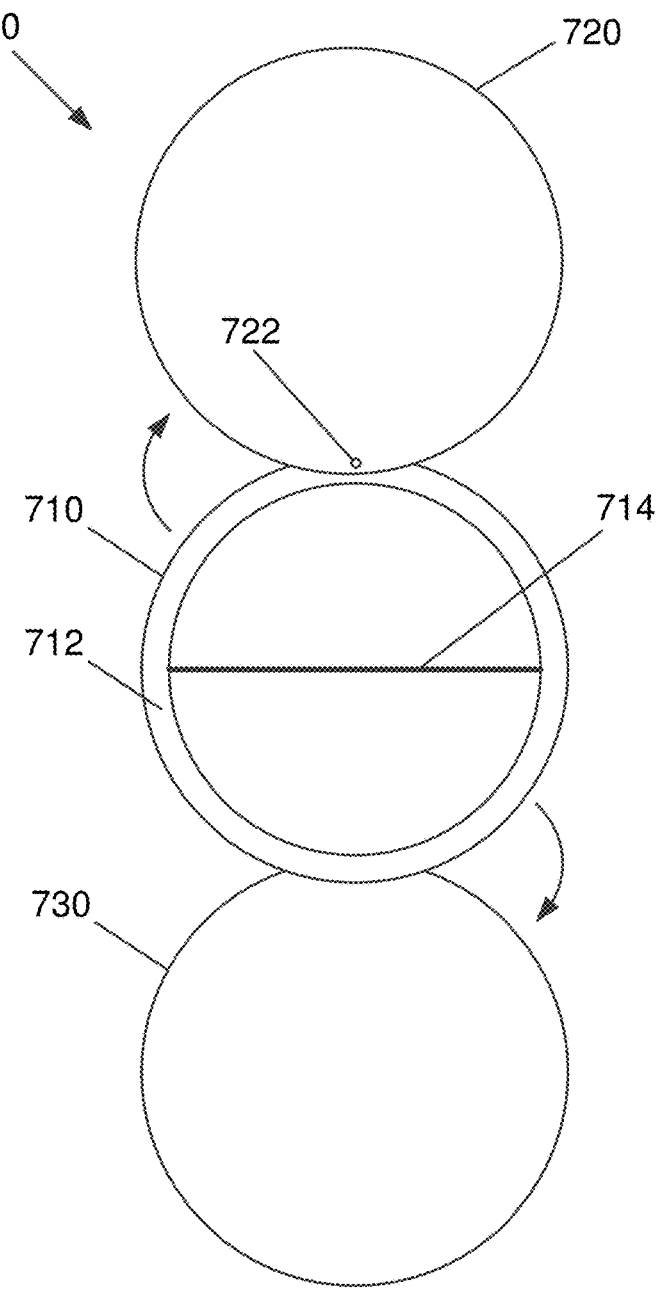

FIG. 12
1200
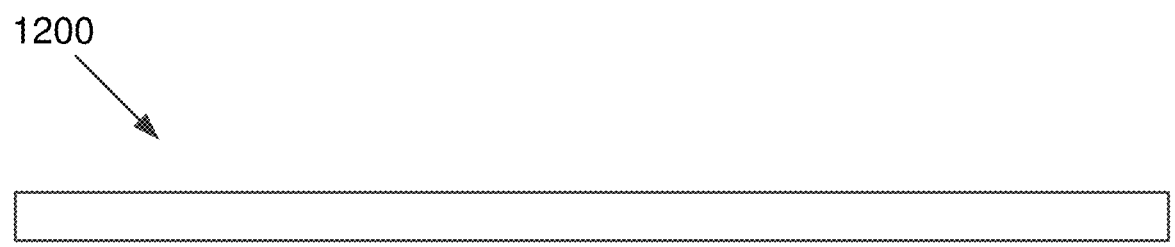
1210
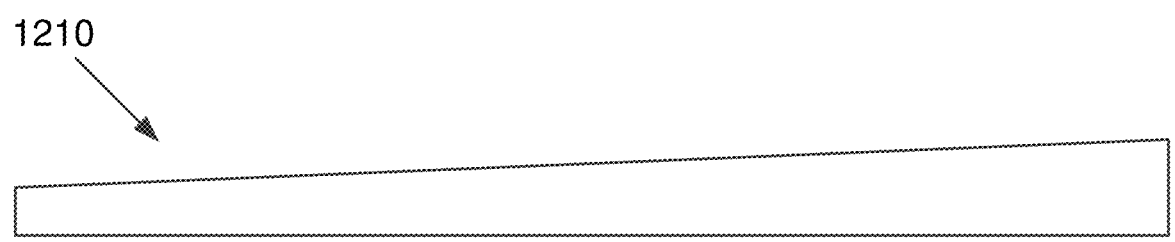
1220
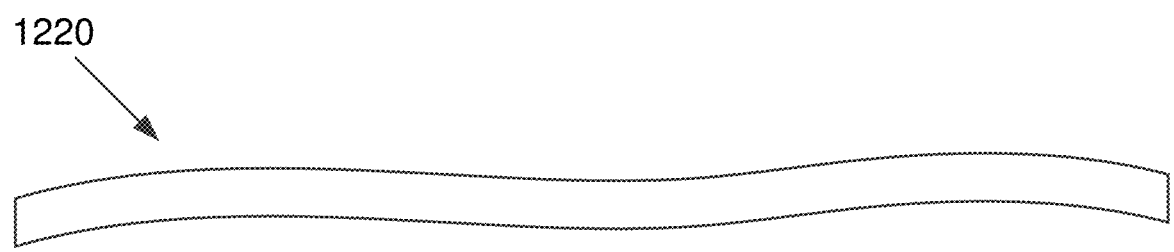

FIG. 21
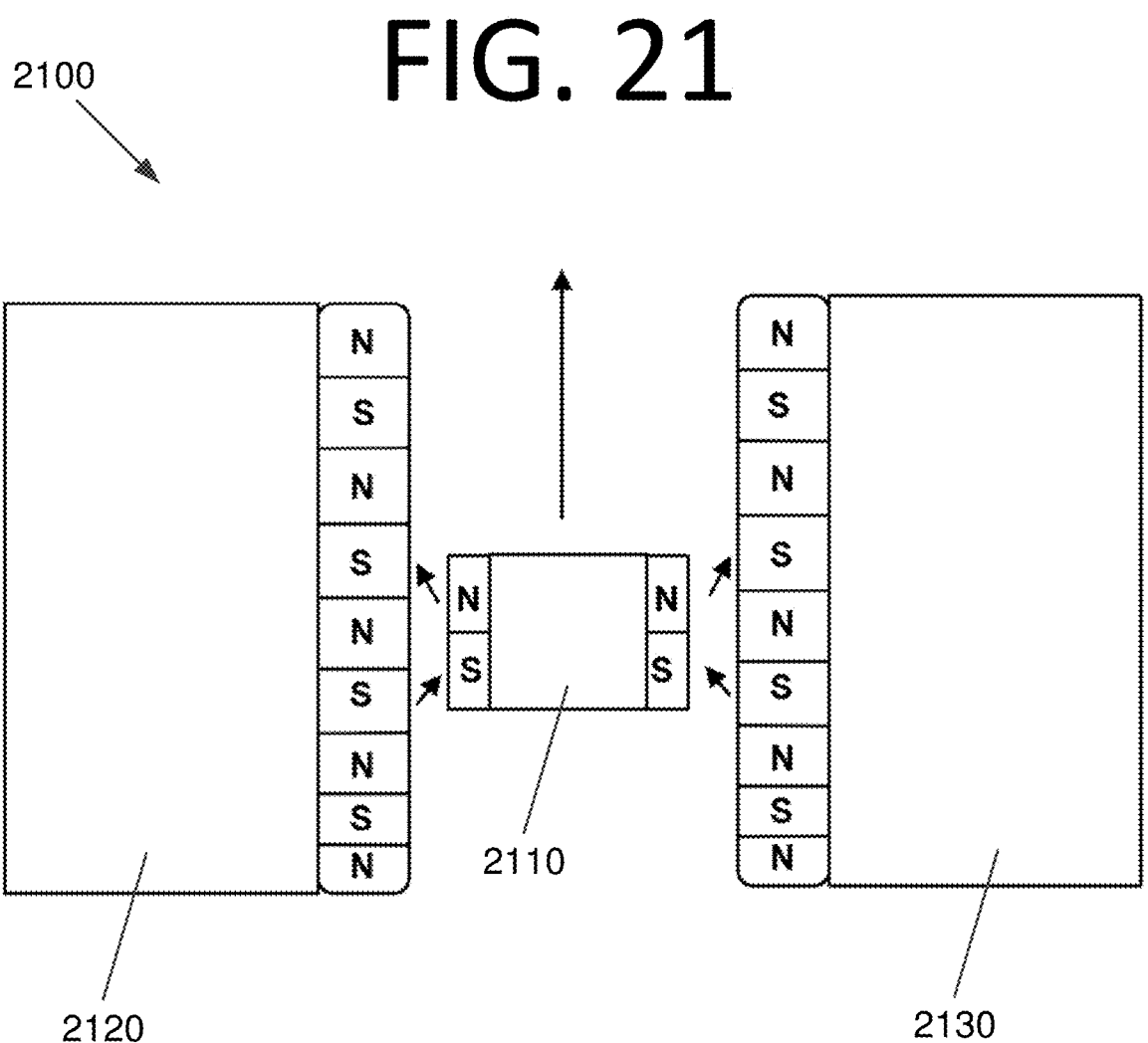
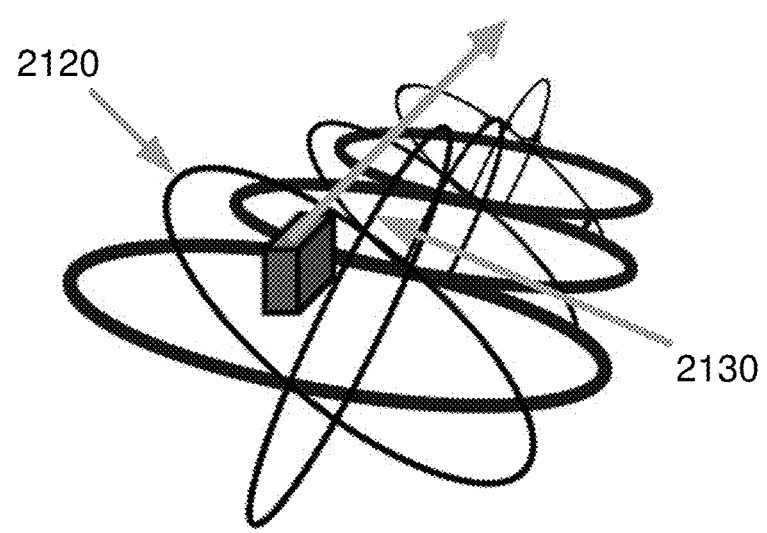

FIG. 22
2200
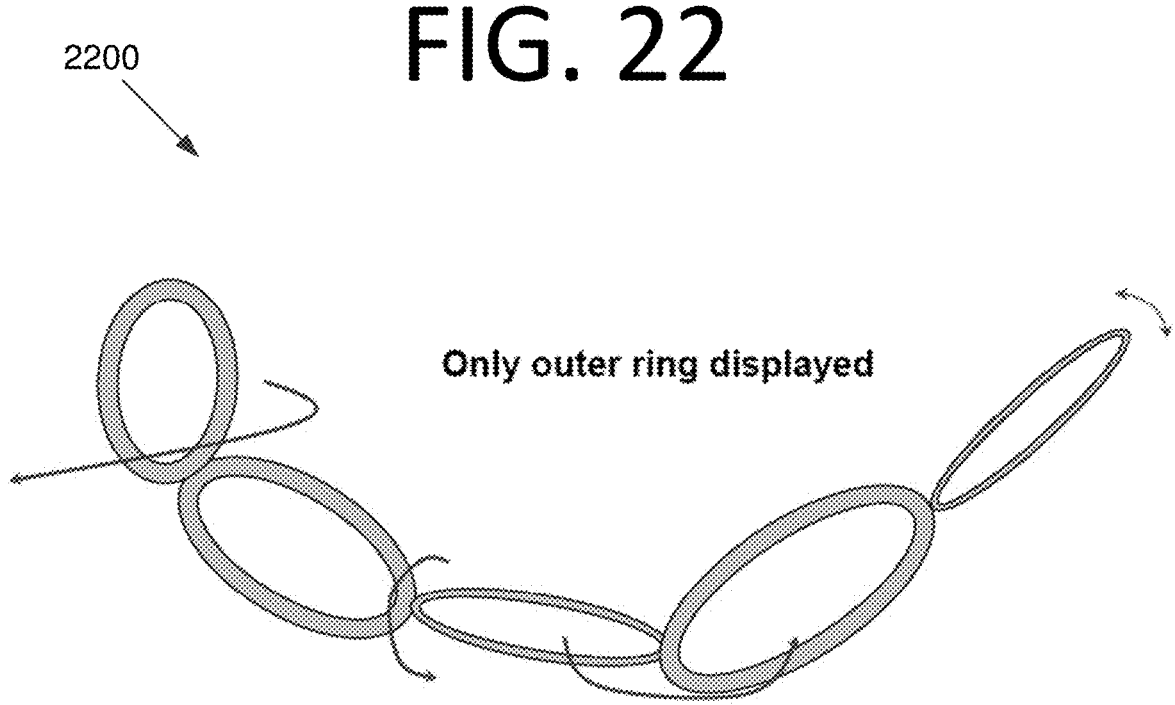
Only outer ring displayed
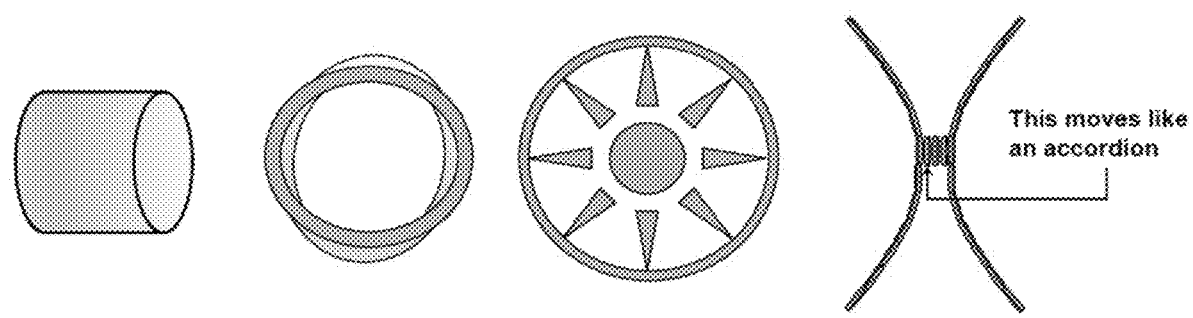
This moves like an accordion

INTERLOCKING, RECONFIGURABLE, RECONSTITUTABLE, REFORMABLE CELL-BASED SYSTEM WITH NESTED RING STRUCTURES

CROSS-REFERENCE TO RELATED APPLICATION

This application is a continuation-in-part of U.S. Nonprovisional patent application Ser. No. 15/655,972 filed Jul. 21, 2017. The subject matter of this earlier filed application is hereby incorporated by reference in its entirety.

FIELD

The present invention generally pertains to space systems, and more particularly, to cell-based systems with nested ring structures that interlock and reconfigure the ensemble topology and/or redirect the orientation of multiple payloads.

BACKGROUND

While there is no state-of-the-art with respect to interlocking, reconfigurable, reconstitutable, reformable space systems per se, some conventional space systems have "interlocking" capabilities in the sense that docking/joining may be possible (e.g., the international space station). However, these systems are not designed to allow the space system to reconfigure its morphology upon command. Indeed, current space system technology is not yet at the stage of being cell-based (i.e., modularized units that can attach/detach to form larger/smaller structures).

The current state-of-the-art in space systems architecture is individual "works-as-designed" entities with little room for adaptability. While networks of small satellites may be deployed that communicate with one another and perform some collective functions, no cell-based system exists (i.e., relatively small and modularized units that aggregate to form a larger structure). Aside from having a deployable (e.g., solar panels), which typically extend or expand, elongated payloads (e.g., telescopes) are, for the most part, built and launched as-is. These systems are payloads attached to the space vehicle and, for small space vehicles, can take up a significant volume fraction. It is non-trivial to collapse an elongated payload into a flat package, for example. Furthermore, conventional space systems tend to have a prismatic geometric structure that is not optimal for stowing prior to deployment. Accordingly, an improved reconfigurable space system may be beneficial.

SUMMARY

Certain embodiments of the present invention may be implemented and provide solutions to the problems and needs in the art that have not yet been fully solved by conventional space systems. For example, some embodiments pertain to cell-based space systems with nested ring structures that interlock and reconfigure the ensemble topology, and/or redirect the orientation of multiple payloads. Some embodiments may also be collapsible and stackable for launch. Certain embodiments facilitate the efficient movement of mass along a free-space "conveyor belt."

In certain embodiments, the cell-based system with nested ring structures does not interlock, but rather "flies" in formation, aggregating and disaggregating in accordance with the mission. Not all of the nested ring structures have to aggregate in some embodiments. Rather, a select number of cells in certain embodiments may move in this fashion (e.g., for precision imaging or broadcasting applications where interconnection may result in better attitude stability).

It should be understood that the generic term "magnetic" is used herein to specify one possible force for maintaining interconnections. The term "magnetic" includes permanent magnets (i.e., always "on"), electromagnets (i.e., on or off when voltage is applied), electropermanent magnets (i.e., the internal magnetic field can be reversed by an applied field), and/or any other suitable type of magnet without deviating from the scope of the invention.

In an embodiment, a cell-based space system includes a plurality of cells. At least one of the plurality of cells includes at least one ring and a movable tram configured to move along one of the at least one rings. The plurality of cells are configured to form an ensemble of cells that carry out collective missions involving two or more cells.

In another embodiment, a nested-ring cell includes an outer ring, an inner ring located within the outer ring, and a movable tram located on the outer ring. The movable tram is configured to move along at least a portion of the outer ring.

In yet another embodiment, a movable tram includes retaining members configured to engage with a tram retaining section of a rail to keep the movable tram operably connected to a ring of a cell. The movable tram also includes control electronics configured to control operation of the movable tram. The movable tram is configured to move along at least a portion of the ring of the cell.

In still another embodiment, a rotatable tram includes a linking mechanism and a rotatable collar to which the linking mechanism is operably connected. The rotatable tram also includes an inner ring about which the rotatable collar rotates and control electronics configured to control rotation of the rotatable collar.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1C is a front cutaway view illustrating a generic tram, according to an embodiment of the present invention.

FIG. 1G illustrates a front cutaway view of a propulsion tram, according to an embodiment of the present invention.

FIG. 1H illustrates a front cutaway view of a device flip-out tram, according to an embodiment of the present invention.

FIG. 1K illustrates a front cutaway view of a laser communication or LIDAR tram, according to an embodiment of the present invention.

FIG. 3 illustrates some example linking mechanisms, according to an embodiment of the present invention.

FIG. 4 is a conceptual diagram illustrating a system linkage interface between two cells (called modules in FIG. 4), according to an embodiment of the present invention.

FIG. 7B is a side view illustrating the cell in a deployed configuration, according to an embodiment of the present invention.

FIG. 7C is a front view illustrating the cell in the deployed configuration, according to an embodiment of the present invention.

FIG. 12 illustrates some example side profiles of a payload/control section, according to an embodiment of the present invention.

FIG. 21 illustrates a system for movement of a payload with respect to two trams, according to an embodiment of the present invention.

FIG. 22 illustrates some structures that can be formed using ring-based cells, according to an embodiment of the present invention.

DETAILED DESCRIPTION OF THE EMBODIMENTS

Figure 1A:
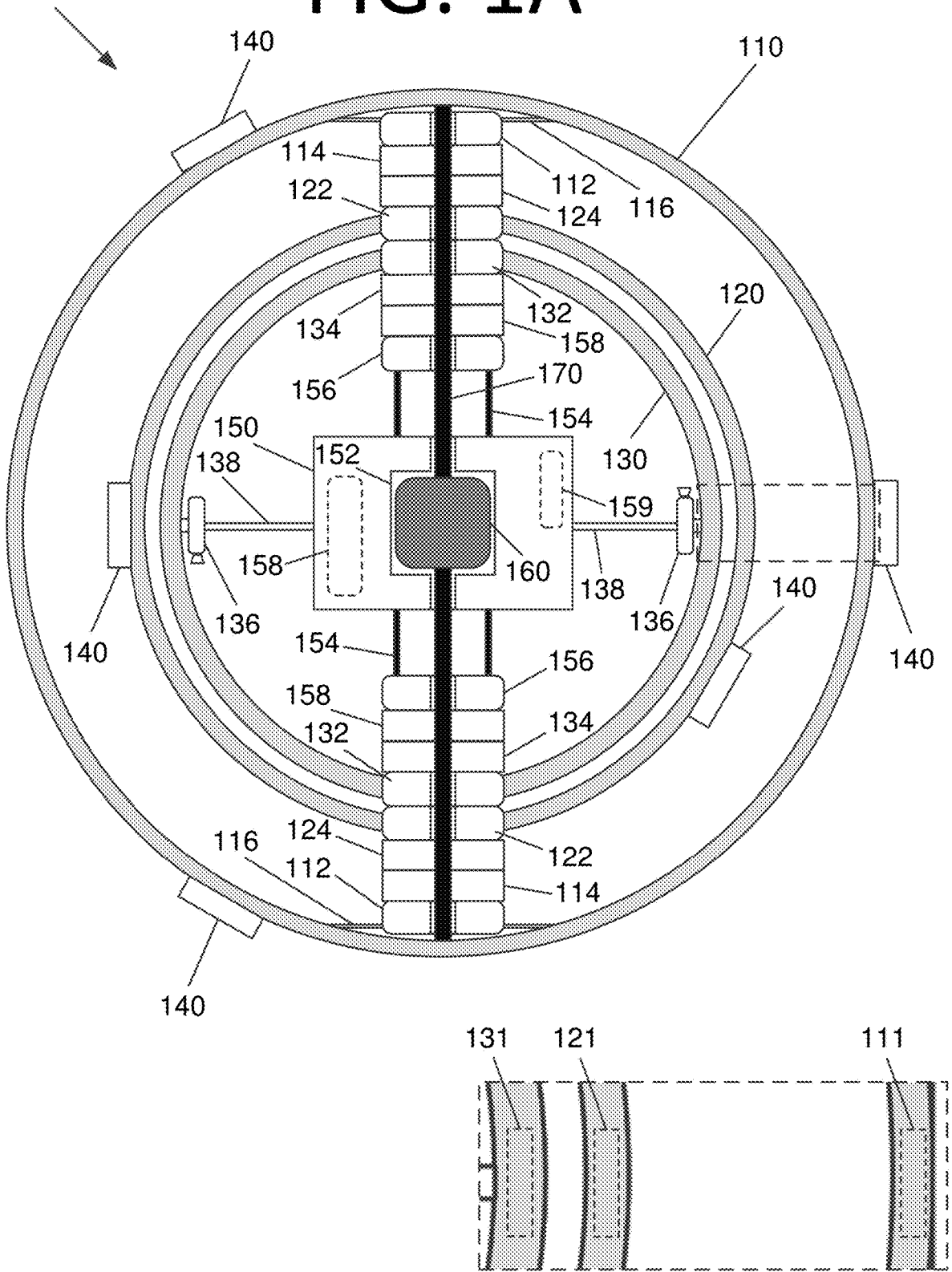
FIG. 1A is a top view illustrating a nested-ring cell, according to an embodiment of the present invention.

Some embodiments of the present invention pertain to cell-based space systems with nested-ring structures that interlock and can change configuration to support a mission. As defined herein, "rings" in a cell need not be perfectly ring-shaped. For instance, one or more of the rings in a cell may be elliptical and/or the shape thereof may not be a perfect geometric shape. For instance, a ring may have a curved shape to accommodate the shape of a payload. Cells of some embodiments may have only one ring of any desired shape surrounding a payload, whereas other embodiments may have any desired number of nested rings of any nestable shape (i.e., each inner ring can fit within the boundary of an immediately adjacent outer ring, if any) without deviating from the scope of the invention. In some embodiments, the cross section of the ring may be circular, rectangular, or any other suitable shape that accommodates the tram (which, in some embodiments, may be designed to accommodate the shape of the ring) without deviating from the scope of the invention.

With the nested-ring concept, there are numerous novel payload type possibilities and configurations. The state-of-the art for developing large argosies in space (i.e., space aggregation) envisions the use of robotic service vehicles to assemble structures. Co-joined, stowed, flat nested rings that, upon deploying, can roll and move about by prehensile grasping, offer an alternative, and potentially more effective mechanism for building space argosies without the need of tug-service robots. Since the "intelligence" in some embodiments resides in each and all nested ring cells, upon the failure of a unit, it is not necessary to wait for a tug-service robot for replacement. Rather, replacement cells can be launched and take the place of failed cells in the ensemble.

Some embodiments facilitate a space architecture that includes an interlocking system of mass producible, "smart" programmable nested-ring cells that have rotatable rings, whether attached to other cells or not. Such cells may be able to detach and "climb-over" other cells. The connected cells may transfer data, power, heat, and/or propellant within an ensemble of cells. One key novel feature of some embodiments is that the ability to hop and/or roll via prehensile grasping allows the morphology of the ensemble, which may collectively be considered to be a spacecraft, to change. This capability provides adaptability (i.e., the ability to perform different missions and multisensory missions, and/or change stance in the event of a physical security threat), upgradability (i.e., replacement of non-performing units or enacting a program for continual upgrading), and size (i.e., facilitate the formation of large physical structures). In some embodiments, structures may be 1 km in diameter, but any size and/or shape structure (including planetary-scale structures, structures that surround the sun, structures that extend from the Earth to the moon, etc.) may be constructed without deviating from the scope of the invention. Each cell may be able to both carry out its own functional needs and serve the mandate(s) of the entire ensemble.

In some embodiments, the outer ring of the nested-ring cell has particular junction points that are fixed, or one or more can move along the ring (e.g., a rail). While rings are shown herein as having specific internal and external faces, other ring designs are possible without deviating from the scope of the invention, such as a Möbius strip. See, for example, https://en.wikipedia.org/wiki/M%C3%B6bius strip. Moreover, the rings may have a cross section that is rectangular, circular, half tube-shaped, or any other suitable shape that facilitates efficient tram maneuverability without deviating from the scope of the invention. To enhance tram maneuverability, in some embodiments, the surface of the rings may be coated with a tribological material to reduce friction (e.g., some form of diamond-like carbon, $MoS_2$, and/or solid lubricants).

The trams may serve as junction points in the movable configurations, have features that enable joining of two or more nested-ring cells. Moreover, while the trams are shown in the figures herein as moving along one surface, other tram designs are also possible without deviating from the scope of the invention, such as those that allow the connector portion to be rotated about the cross-sectional shape of the ring. The inner rings, any desired number of which may be included without deviating from the scope of the invention, may also have fixed junction points and/or trams. These inner rings may hold sensors and/or payloads in some embodiments, and may primarily support components housed in the center of the nested-rings (called a payload/control section herein). It should be noted that while denoted payload/control sections herein, one or more payloads and/or some or all of the control electronics may be distributed on the rings, the trams, or both. The payload/control section may include batteries and other components that are typically required for a satellite to operate. Additionally, or alternatively, batteries may also be included on the solar panels (if any) and/or be inserted within the rings themselves.

Instead of being housed in a cube, the payload/control section may be a relatively flat "thick-pancake-like" structure where the thickness is just shy of the outer ring thickness. While analogized to a pancake, the payload/control section may have any desired shape without deviating from the scope of the invention. In some embodiments, the propulsion (e.g., valves, nozzle, propellant, etc.) are housed in the center pancake structure. In certain embodiments, the propellant is housed in the pancake structure while the control valves and exit nozzle sit on a rotatable inner ring with propellent lines connecting the two. In some embodiments, the main propellant tank is housed in the pancake structure with a secondary, smaller tank with control valves and exit nozzles on the tram. These embodiments may allow versatility in controlling the propulsive vector. Consequently, the pancake shape can be any size or shape as long as it fits within the nested rings. For instance, the payload/control section may represent a raised circle, oval, square, rectangle, rounded rectangle, or any other desired shape of uniform or varying thickness. The payload/control section may also have irregular shapes/volumes based on the payload(s) and/or component(s) included therein/thereon. In certain embodiments, the outer ring may be the thickest part of the cell when in its stowed configuration. The outer ring and/or any of the inner rings may be hollow or solid material. They may be fashioned out of different materials in some embodiments. For example, one ring may be metal or a high entropy alloy (e.g., a multi-principal element alloy), another may be constructed from composite materials (e.g., polymers with embedded nanofibers or nanotubes, carbon fiber composites—e.g., those used to manufacture aircraft, such as the Boeing 787 Dreamliner®), etc. In some embodiments, the ring may be constructed from glass-ceramic materials (e.g., Zerodur® or other zero coefficient of thermal conductivity materials) or photostructurable glass ceramics (e.g., Foturan®).

In some embodiments, the nominal thicknesses a nested-ring cell may be 10-12 cm (4-5"), but the nominal thickness can be more or less without deviating from the scope of the invention. In some embodiments, the payload/control section may rotate independently of the rings, and the rings can also rotate independently. FIG. 1A is a top view illustrating such a nested-ring cell 100, according to an embodiment of the present invention. In this embodiment, nested ring cell 100 includes three rings—an outer ring 110, a middle ring 120, and an inner ring 130. In this embodiment, rings 110, 120 are rails that include movable trams 140 (a.k.a. tractors—see parent U.S. Nonprovisional patent application Ser. No. 15/655,972). The magnified portion of FIG. 1A represented by the dashed rectangle shows that each ring 110, 120, 130 includes respective electronics 111, 121, 131. In some embodiments, electronics are included for at least one ring and supplement or replace the functionality of a payload/control section.

Rails can carry power, data lines, heat (e.g., microheat pipes), and in some embodiments, a propellant fuel line. The lines may be hardwired, fiber, and/or 3D printed along or inside the rails, as desired. For instance, in FIG. 1A, inner ring 130 includes two rotatable nozzles 136 and respective propellant lines 138. Propellant lines may be embedded in any desired ring, or more than one ring, without deviating from the scope of the invention. Propellant may also be stored within a propellant storage tank (not shown) and may be refilled via a service valve (not shown).

FIG. 1A shows a nested ring structure that is designed to rotate about one axis (shown as the y-axis here via shaft 170). In some embodiments, some nested rings rotate about a y-axis shaft, while others rotate about an x-axis shaft perpendicular to the y-axis via a gimbaled mechanism. In certain embodiments, these shafts may not be orthogonal to one another. Indeed, any number of shafts, interconnection therebetween, gimbaling mechanisms, and orientation may be used without deviating from the scope of the invention.

A payload/control section 150 includes a reaction wheel housing 152 that houses a momentum management system 160. Momentum management system 160 controls the net angular momentum vector, and includes reaction wheels (e.g., three-axis reaction wheels) and a momentum dumping system (e.g., magnetorquers) that enable the desaturation of the momentum of the reaction wheels. Each nested ring 110, 120, 130 and payload/control section 150 has its own respective motors 112, 122, 132, 156 and can independently rotate. The rotation can be continuous, fixed angular motion that is then stopped, or motion to a prescribed set of angular locations with stops at constant or varying times without deviating from the scope of the invention. Any rotation induced by motors 112, 122, 132, 156 should be countermanded by momentum management system 160 to keep the overall attitude (i.e., a defined observation direction) of nested ring cell 100 steady.

Motors 112 are attached to outer ring 110 via support structure 116, but are able to rotate about shaft 170 while attached thereto. Motors 122 are attached to middle ring 120, but are able to rotate about shaft 170 while attached thereto. Motors 132 are attached to inner ring 130, but are able to rotate about shaft 170 while attached thereto. Also, motors 156 are attached to payload/control section 150 via tubes/struts 154, but are able to rotate about shaft 170 while attached thereto. All motors 112, 122, 132, 156 in this embodiment have properties currently found in rotation stages with a center hole aperture: (1) bidirectional motion with velocity control; (2) encoders to ensure precise angular motion and positioning; and (3) mechanical clutches to lock. Motors 112, 122, 132, 156 are also designed to operate in a vacuum environment. In some embodiments, the motor function can be integrated into shaft 170. In certain embodiments, only one motor per ring is used.

Thus, rings 110, 120, 130 and payload/control section 150 rotate about shaft 170. Shaft 170 may also include data and/or power lines that provide data and/or power between rings 110, 120, 130 and payload/control section 150. In some embodiments, shaft 170 may also contain one or more propellant fuel lines to deliver propellant to one or more rings. This may be used, for instance, to control rotation thereof, as well as to control and power each tram 140 and a sensor or other device that "rides" on top of the tram.

Payload control section 150 also includes a primary propellant storage tank 158 and a secondary propellant storage tank 159. Secondary propellant storage tank 159 may function as a reserve in some embodiments. Any number, size, and location of propellant storage tanks may be used without deviating from the scope of the invention. Propellant storage tanks 158, 159 are connected to propellant lines 138 (connection not shown) and include electronic valves (not shown) that control the flow of propellant.

Figure 1B:
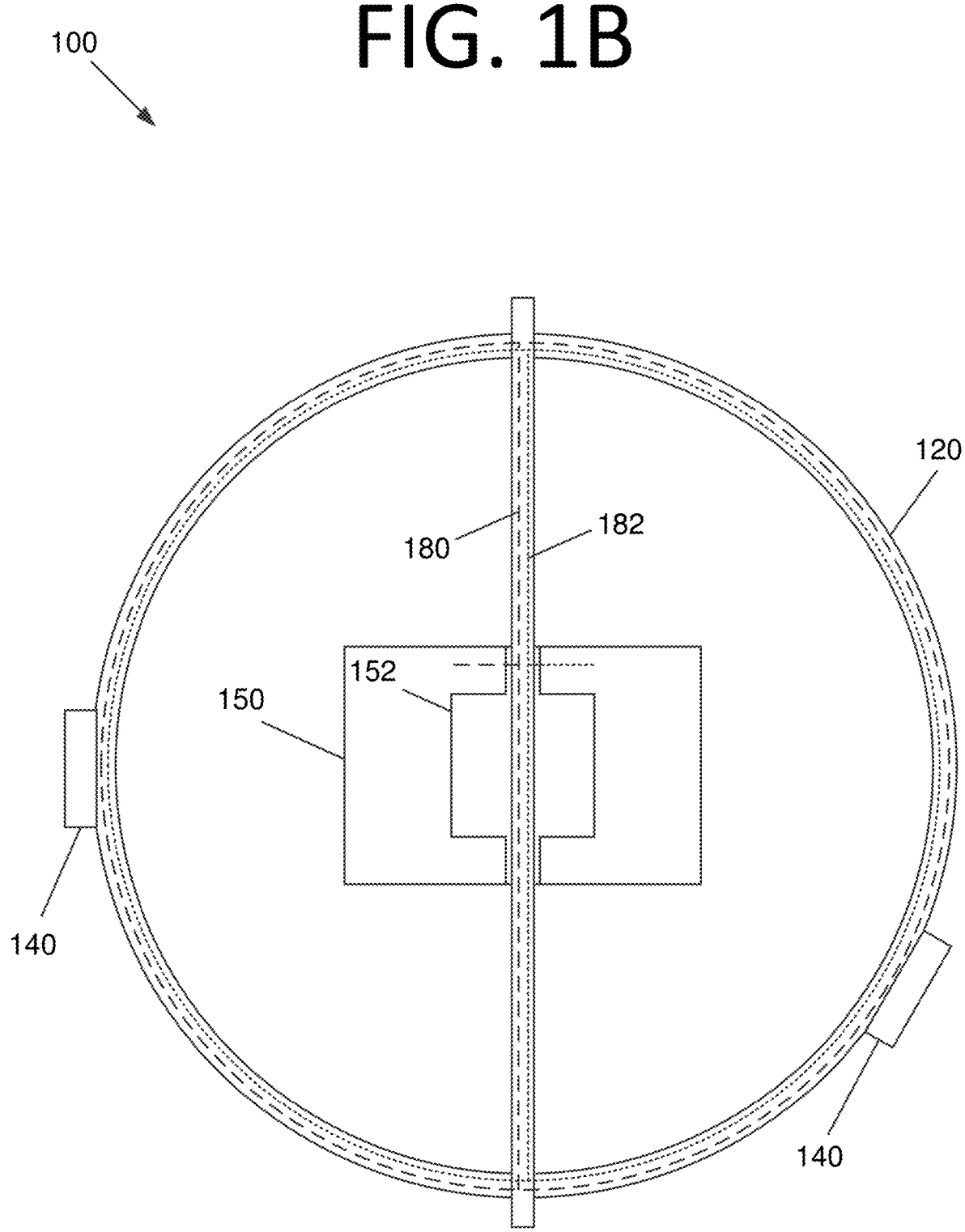
FIG. 1B is a top cutaway view illustrating a wiring scheme in the nested-cell ring, according to an embodiment of the present invention.

FIG. 1B is a top cutaway view illustrating a wiring scheme in nested-cell ring 100, according to an embodiment of the present invention. The wiring can be traditional metal conductors, optical fiber, 3D printed, pattern transfer fastened/bonded, etc. with interconnects as desired or necessary. In some embodiments, the wiring may be within the ring, wrapped about the ring, or any combination thereof without deviating from the scope of the invention. Various components from FIG. 1A have been removed and colors have been changed to white for illustration purposes. More specifically, ring 120 remains, and the wiring scheme for ring 120 may be similar to that for ring 110 or any other ring that requires power/data for its operation (e.g., to operate trams 140). Power lines 180 (lines with larger dashes) and data lines 182 (lines with smaller dashes) extend through shaft 170 and also throughout ring 120. Power line 180 and data line 182 also extend into payload/control section 150 and interface with internal circuitry thereof (not shown). Power and data may be transferred to payload/control section 150 and/or one or more of rings 110, 120, 130 via a direct-contact "brush" and/or non-contact optical, RF, or electromagnetic transport in certain embodiments. In some embodiments, trams 140 and ring 120 may have a similar structure to that shown in FIGS. 6A and 6B and 5A and 5B, respectively, of parent U.S. Nonprovisional patent application Ser. No. 15/655,972, for example.

Figure 1D:
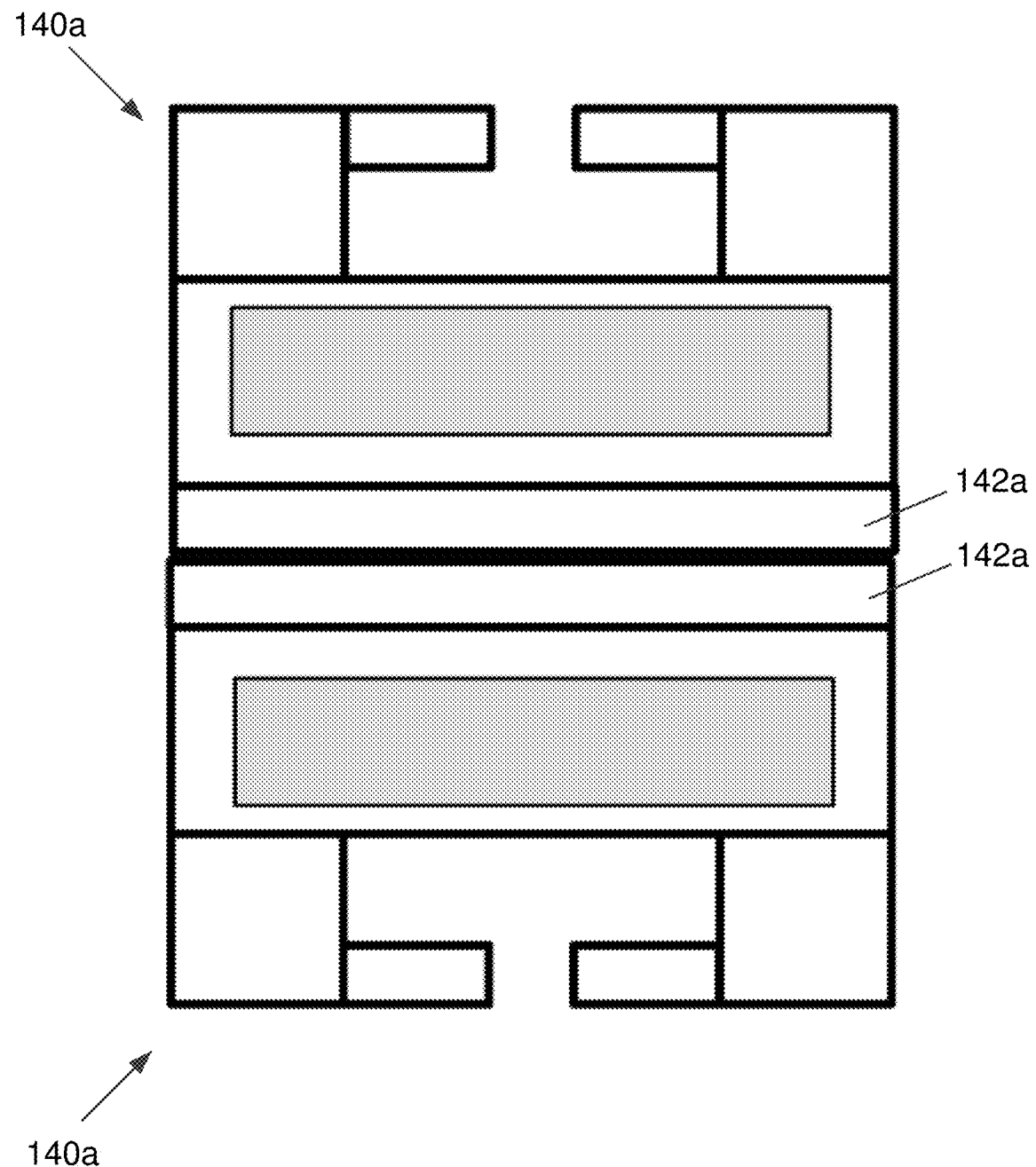
FIG. 1D illustrates two generic trams joined at their linking interface, according to an embodiment of the present invention.

In some embodiments, trams may be capable of performing various operations, such as connecting to other cells to form a structure, to provide power and/or data and to act as support structures to hold external components that can be articulated (e.g., sensors, cameras, transmitters and/or receivers, mirrors, solar panels, heat shields, mirrors, lenses, etc.), and the like. FIG. 1C is a front cutaway view illustrating a generic potential tram 140a that may be capable of performing these operations, according to an embodiment of the present invention. In some embodiments, depending on the physical shape and properties of the ring, the ring shape and/or the tram coupling shape may be rectangular, circular, or any other suitable shape in which the tram can "grasp" or couple onto the ring without deviating from the scope of the invention. Tram 140a includes a linking mechanism 142a that is capable of performing linking operations with linking members of other trams and/or other structures (e.g., holding a component such as a lens, linking with another rail or other physical structure, etc.). Control circuitry 144a controls the operation of tram 144a and its components. Retaining members 146a keep tram 140a operably connected to or proximate to a rail (not shown), which fits within a rail space 148a defined in part by retaining members 146a. Rail space 148a is shown as rectangular in FIG. 1C, but may be any suitable shape without deviating from the scope of the invention. Two such trams 140a that are linked via respective linking mechanisms 142a are shown in FIG. 1D.

Figure 1E:
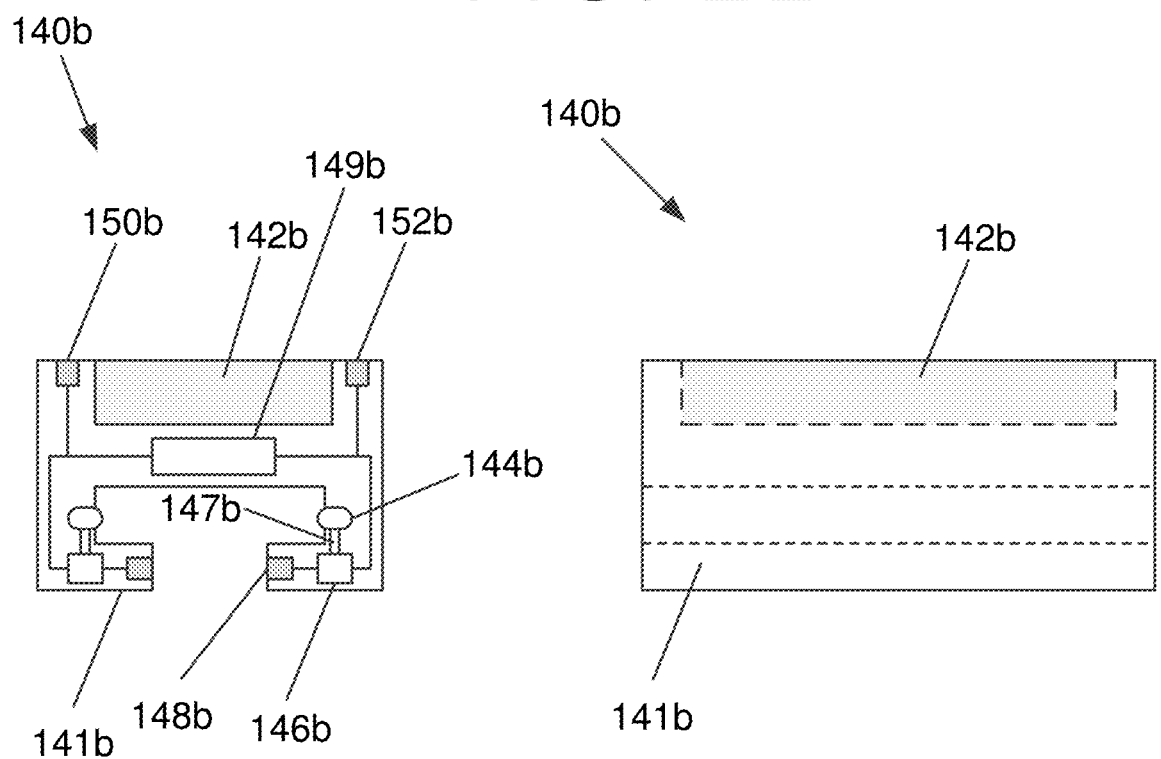
FIG. 1E illustrates front cutaway (left) and side (right) views of a magnetic tram, according to an embodiment of the present invention.

Many tram embodiments are possible without deviating from the scope of the invention. It should also be noted that tram embodiments described herein and derivatives thereof may be used with any suitable component (e.g., cells or any other physical structure) and for any suitable application (whether terrestrial, space-based, underwater, underground, etc.) without deviating from the scope of the invention. For instance, in FIG. 1E, tram 140b includes retaining members 141b that hold tram 140b in place on a retaining section of a rail. Tram 140b also includes an electromagnet 142b that may engage with magnets of other rings and/or trams. However, in some embodiments, mechanical connections may be used in addition to, or in lieu of, magnets. Tram 140b also includes wheels 144b that contact the tram retaining section of the rail. Wheels 144b are driven by brushless electric motors 146b via respective shafts 147b. Electrical contacts 148b contact one or more wires of the rail. In some embodiments, the "wheels" or "guides" can be ball bearings and the motion thereof may be similar to direct-drive, slotless, brushless servomotors. The tram in some embodiments may include an optical encoder or other encoder (e.g., a laser-based interferometer) that characterizes the tram position along the rail without deviating from the scope of the invention.

Similarly, the connections of a tram and the rail can follow an industry-proven direct drive linear motor (DDLM) with the requirement that it must operate in vacuum environment and include some form of space qualified lubricant (e.g. solid lubricant, $MoS_2$, diamond-like carbon, etc.). A DDLM is a motor that is laid out flat and directly coupled to the driven load, eliminating the need for ball/lead screws, rack and pinions, belts/pulleys, and gearboxes. In some embodiments, rails may be coupled to tractors configured as DDLMs. In some embodiments, the tram and rail can be moved in a similar manner to technology implemented in magnetic levitation (maglev) trains, which induce both motion and levitation using electromagnetics. Motion is induced by altering the polarity of the magnets in sequence and levitation is facilitated by permanent magnets.

In this embodiment, tram 140b includes circuitry 149b that controls operation of tram 140b. For instance, circuitry 149b may include, but is not limited to, a microcontroller, a transceiver, and/or any other suitable circuitry without deviating from the scope of the invention. In certain embodiments, no control circuitry may be present, and brushless electric motors 146b may be controlled by providing power to the conductor(s) of the rail to drive brushless electric motors 146b.

Per the above, in some embodiments, power and/or data from a tram may be provided from the tram to another connected tram or device. Accordingly, tram 140b includes a power contact 150b and a data contact 152b that send/receive power and data, respectively, to/from a connected tram or device. In this manner, tram 140a may power a sensor or camera, receive power from a solar panel or battery, provide power and data between connected cells, etc. Also included in tram 140b are materials that enable the efficient transfer of heat between connected cells.

Figure 1F:
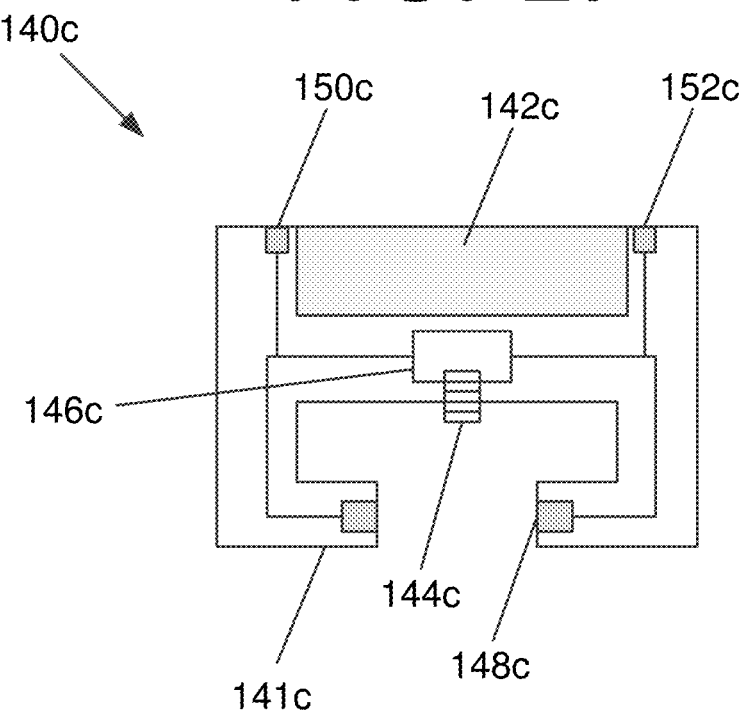
FIG. 1F illustrates a front cutaway view of a magnetic tram, according to an embodiment of the present invention.

FIG. 1F shows an alternative magnetic tram 140c. Similar to magnetic tram 140b of FIG. 1E, tram 140c includes retaining members 141c, a magnet 142c, and electrical contacts 148c. However, in this embodiment, a motor 146c is powered directly by conductor(s) of the rail and engages with teeth of the rail via gear 144c. Motor 146c rotates gear 144c, moving tram 140c along the rail. Moreover, if a DDLM concept is used, tram 140c in FIG. 1F would not need to include gears 144c or motors 146c. Also similar to tram 140b, tram 140c includes a power contact 150c and a data contact 152c that send/receive power and data, respectively, to/from a connected tram or device.

In some embodiments, a specific nested ring and the trams on the ring have all the properties as noted above, but in addition, are designed to provide free space propulsion. FIG. 1G shows an embodiment of such a tram 140d. Tram 140d includes three nozzles for expelling propellant gas 144d, which are controlled by three respective control valves 142d and associated control circuitry 143d. Tram 140d has a local propellant tank 146d that serves all nozzles 144d. Propellant tank 146d is filled by tram 140d stopping at a specific location along the ring (i.e., a "gas station"). At that location, a hermetic seal connection is made with rail 148d, and valve 142d proximate to rail 148d is opened via proximate controller 143d. The "gas station" is fueled from a larger tank located elsewhere (e.g., the payload/control section).

FIG. 1H illustrates a front cutaway view of a device flip-out tram 140e, according to an embodiment of the present invention. Tram 140e includes an attached device 142e that "flip-out" via a hinge 144e. Hinge 144e may be motorized to facilitate retractability. Devices that may constitute device 142e include, but are not limited to, one or more of a lens, a mirror, a shade, a filter, a flip-out sensor, a flip-out angular momentum control device (e.g., a reaction wheel), a patterned electrode that serves as a linear motor, or any combination thereof.

Figure 1I:
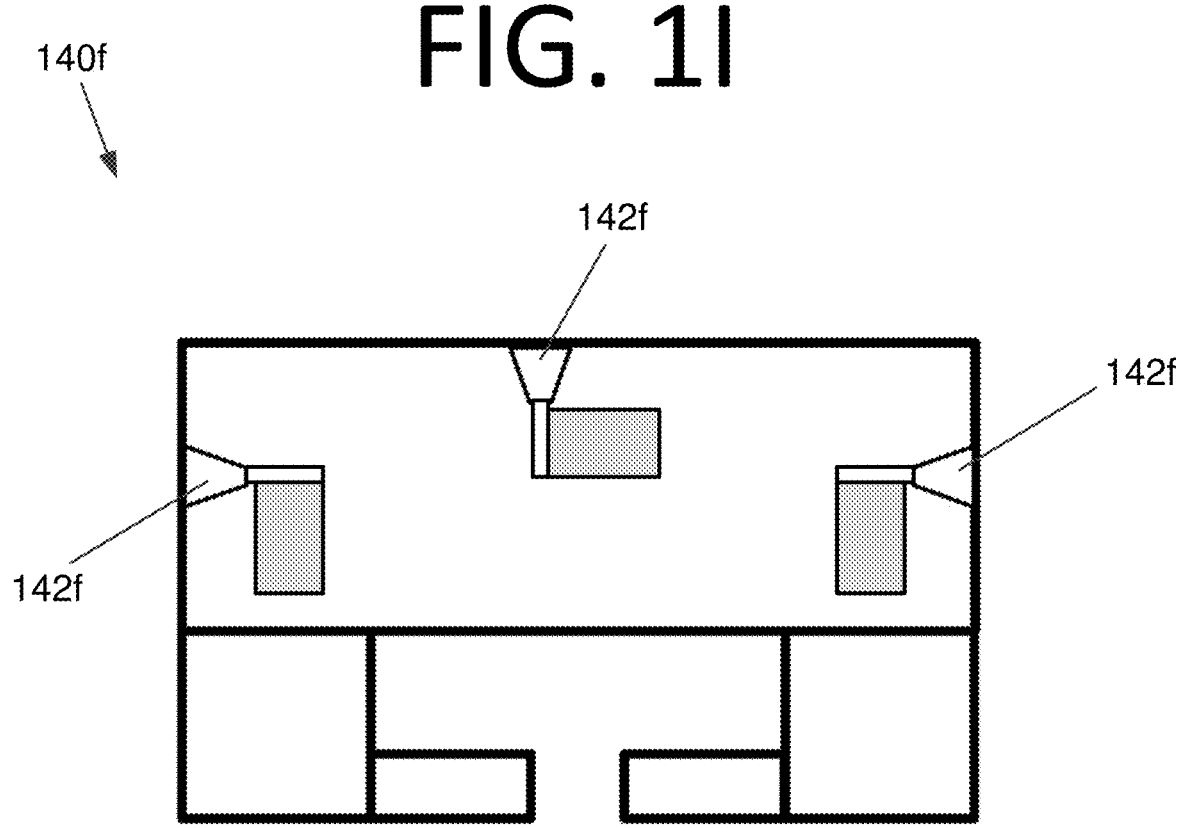
FIG. 1I illustrates a front cutaway view of a mm-Wave or μ Wave sensing tram, according to an embodiment of the present invention.

FIG. 1I illustrates a front cutaway view of a mm-Wave or μ Wave sensing or broadcasting tram 140f, according to an embodiment of the present invention. Tram 140f includes three horn antennas 142f on the left, right, and top of tram 140f. Electronics are not shown to better illustrate horn antennas 142f. The benefits of mm-Wave and μ Wave technology are discussed in more detail below.

Figure 1J:
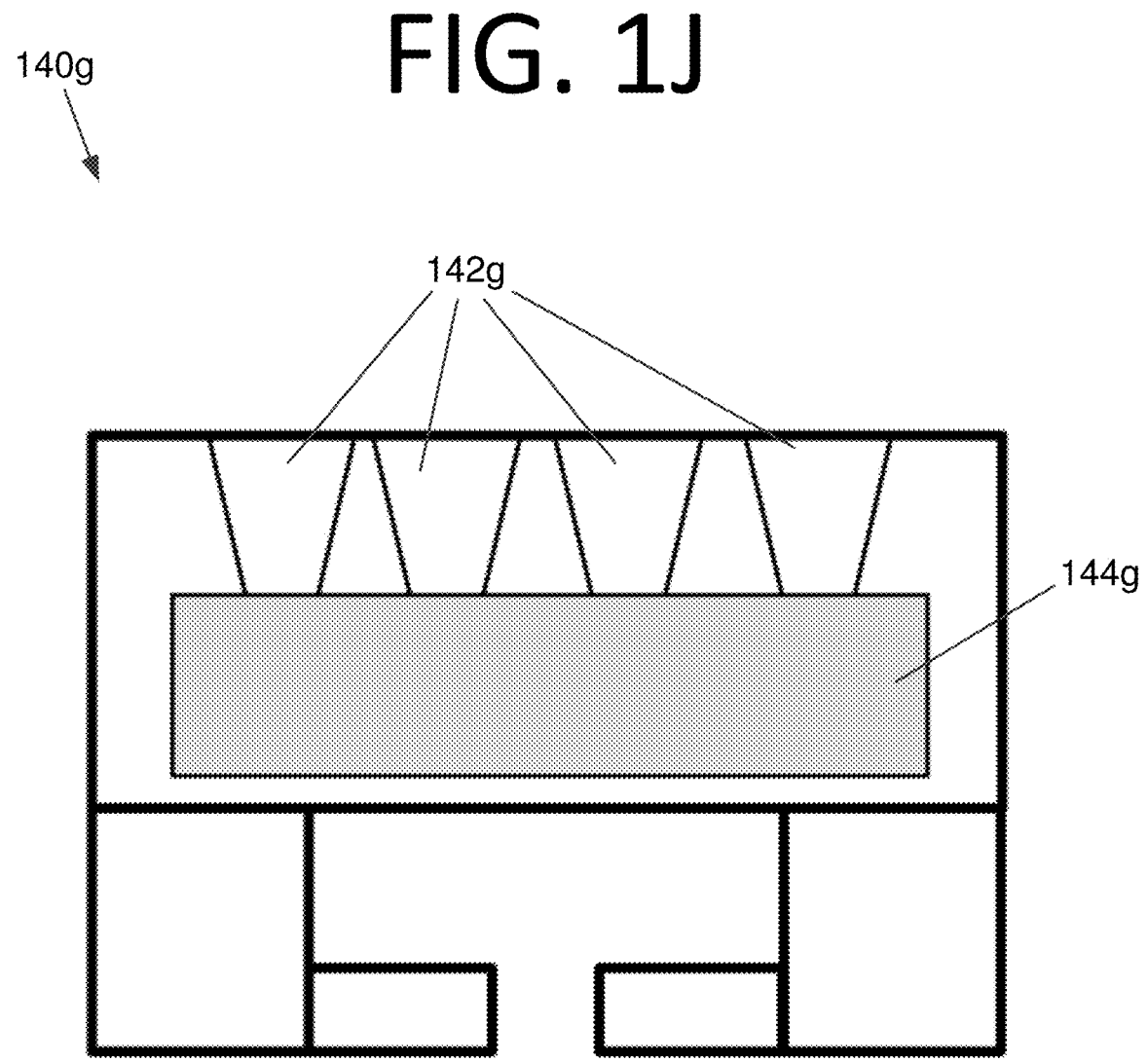
FIG. 1J illustrates a front cutaway view of an imaging tram, according to an embodiment of the present invention.

FIG. 1J illustrates a front cutaway view of an imaging tram 140g, according to an embodiment of the present invention. Tram 140g includes four imagers or detectors 142g (e.g., single photon detectors) in this embodiment. However, any suitable number, type, and/or location (e.g., on the side) of imagers and/or detectors may be used without deviating from the scope of the invention.

FIG. 1K illustrates a front cutaway view of a laser communication or LIDAR tram 140h, according to an embodiment of the present invention. Tram 140h includes a laser system 142h inside a laser housing 144h. Laser system 142h includes optics, modulators, filters, mirrors, and diagnostics to ensure the proper and continual operation of the laser-based LIDAR. Tram 140h is considered as the LIDAR source, with the return signal being sensed/picked up by another tram, such as tram 140g of FIG. 1J. The LIDAR laser beam is then directed by a gimbled or galvanometer-based beam delivery control system 146h. While FIG. 1K shows the laser beam exiting in three primary directions, it should be noted that the beam can exit in any direction between the dotted line beam direction lines. Beam delivery control system 146h (e.g., electronics, diagnostics, motor control, etc.) is housed in beam delivery control system housing 148h. Beam delivery control system housing 148h may also house one or more sensors (not shown) in some embodiments. While lasers are currently highly efficient in converting electrical energy to photons, they generate heat, which should be removed. Accordingly, a cooling system 150*h* is included that provides passive radiators and/or active cooling (e.g., fluid motion, a recirculatory, etc.).

Figure 2A:
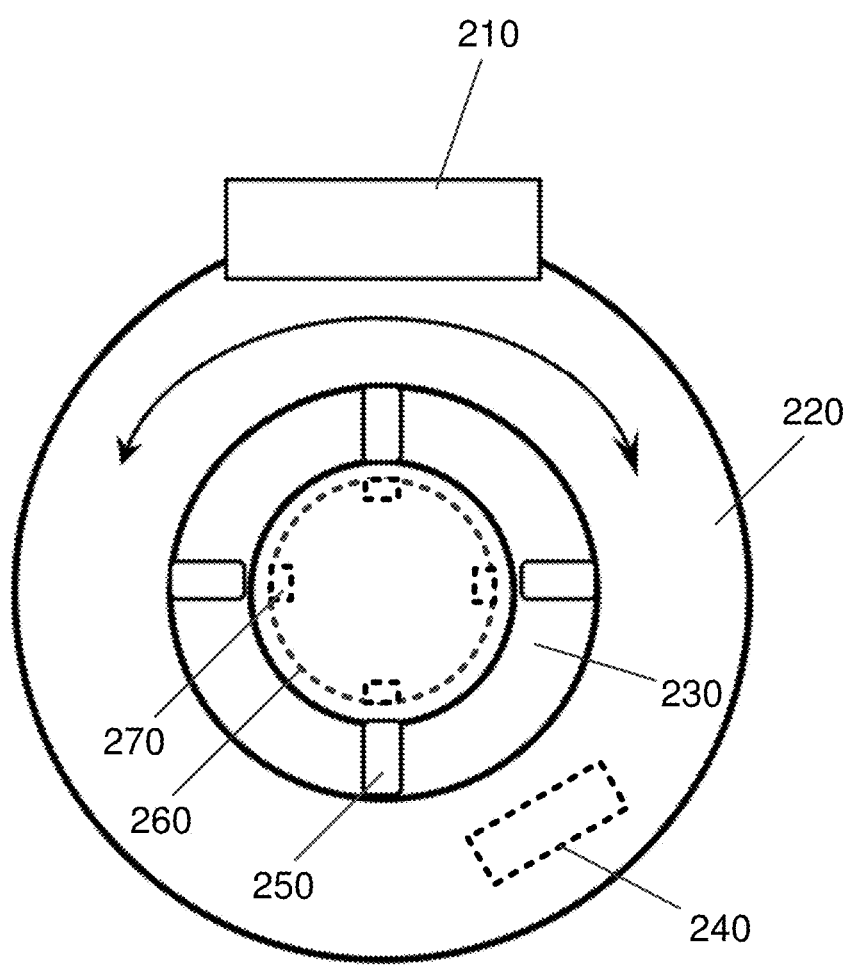
FIG. 2A is a front cutaway view illustrating a circular magnetic tram, according to an embodiment of the present invention.
Figure 2B:
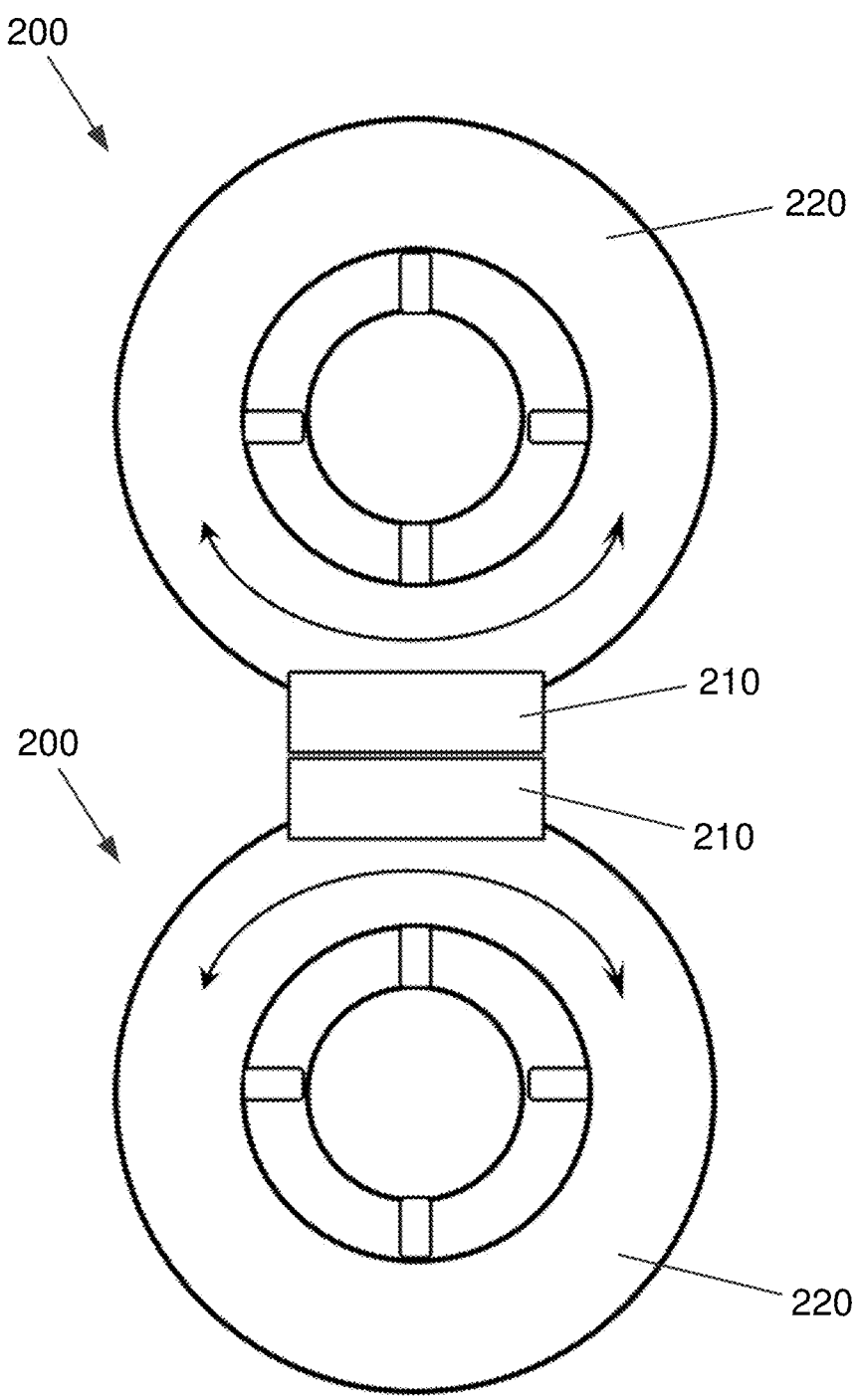
FIG. 2B is a front cutaway view illustrating two interconnected circular magnetic trams, according to an embodiment of the present invention.

While rectangular-shaped trams are shown in FIGS. 1C-K, it is possible to have trams of any desired shape without deviating from the scope of the invention. For instance, FIG. 2A is a front cutaway view illustrating a circular magnetic tram 200, according to an embodiment of the present invention. Tram 200 includes a linking mechanism 210 that engages with linkage points of other trams (see FIG. 2B, for example). Linking mechanism 210 is operably connected to a rotatable collar 220 that rotates about an inner ring 230. Control electronics 240 control rotation of rotatable collar 230.

In this embodiment, four rail guides 250 on inner ring 230 provide power for control electronics in order to provide power to rotate rotatable collar 220, attach linking mechanism 210 to other linkage points or structures, etc. However, any number and/or location of rail guides may be used without deviating from the scope of the invention. In some embodiments, rail guides may receive power wirelessly. Inner ring 230 is physically connected to rail 260, which is tubular in this embodiment, held in place magnetically, or both. Power is provided to rail guides 250 via conductors 270 of rail 260.

Figure 2C:
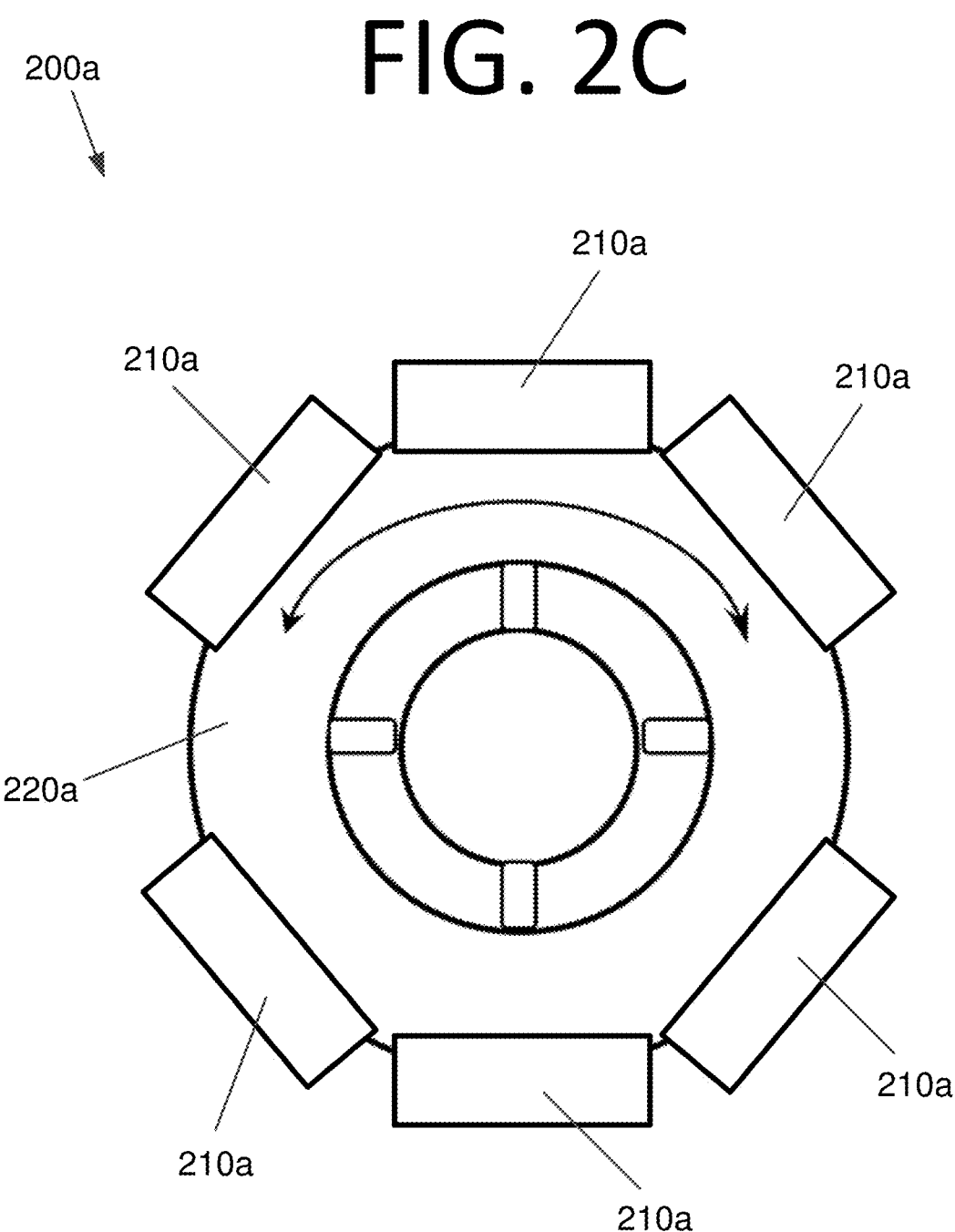
FIG. 2C is a front cutaway view illustrating a circular magnetic tram with multiple linkage points, according to an embodiment of the present invention.

It should be noted that multiple linking mechanisms may be used such that a single tram can connect to two or more cells, other structures, etc. FIG. 2C shows such a tram 200*a*. In this embodiment, six linking mechanisms 210*a* are connected to rotatable collar 220*a*. Linking mechanisms 210*a* may be of different types in some embodiments, such that of tram 200*a*. For instance, the linking mechanisms shown in FIG. 3 may all be included on tram 200*a*, creating multi-purpose linkages.

FIG. 3 illustrates some example linking mechanisms, according to an embodiment of the present invention. It should be noted that the linking mechanisms shown in FIG. 3 may include sensors or other devices in some embodiments without deviating from the scope of the invention. It should also be appreciated that other linking mechanisms are possible, and any suitable linking mechanism may be used without deviating from the scope of the invention. For instance, linking mechanisms in some embodiments may be part of (e.g., either half of) a hinge joint 300, a pivot joint 310, a ball and socket joint 320, an ellipsoid in socket joint 330, a saddle joint 340, planes 350, a mechanical and magnetic interlock 360, a spring-loaded ball and groove joint 370, etc. The construction and operation of joints 300, 310, 320, 330, 340 is readily apparent. The illustrated linking mechanisms may be motorized in some embodiments.

Planes 350 magnets with opposite polarities that each come from a different respective linking mechanism. Mechanical and magnetic interlock 360 includes an upper magnetic half 362 and a lower magnetic half 364 with opposite polarities. Mechanical connector 366 of upper half 362 and mechanical connector 368 of lower half 364 mechanically connect their respective halves to the opposite half. A plane joint with latch ball locking 370 is also possible. A ball portion 372 fits into a hollow socket portion 374 via spring-loaded latch balls 376 (e.g., spring-loaded ball bearings) that fit within ball grooves 378.

In some embodiments, cells may exchange various physical items and information. Such a system linkage interface 400 is shown in FIG. 4. In FIG. 4, modules (i.e., cells) N and N+1 connect. After connection, N and N+1 are able to share power, data, heat, and fuel.

Figure 5:
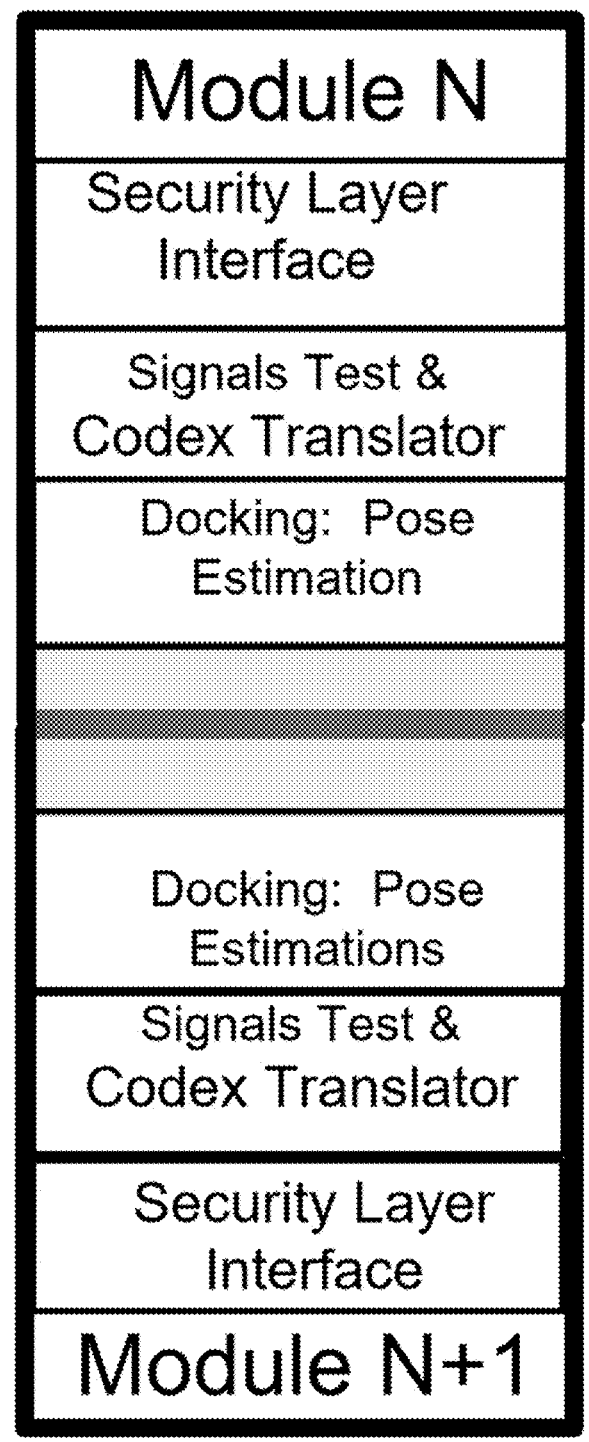
FIG. 5 illustrates a layered process control interface for exchanging materials and docking information, according to an embodiment of the present invention.

Various interfaces are possible for the exchange of material(s) and/or signals without deviating from the scope of the invention. In some embodiments, each interface may have hardware/software components denoted "layers" herein. One such layered process control interface 500 for exchanging materials and docking information is shown in FIG. 5. Both N and N+1 include respective security interface layers, signals test and codex translator layers, and pose estimation layers for docking. The terms are generic here and the order of layers as shown can be varied without deviating from the scope of the invention. The primary functions of the layers are as follows. The layer labeled as "docking: pose estimation" includes sensors, electronics (e.g., circuits), and control systems with software that ensures that when modules N and N+1 are close, but not yet connected, the relative pose of each module is such that it will induce a successful docking engagement. Consequently, pose estimations should be done prior to physical docking.

The layer labeled as "signals test and codex translator" includes sensors, electronics (e.g., circuits), and control systems with software that conducts two functions after successful docking: (1) the layer tests the interconnected signals to ensure that they have the right voltage, current, pulse structure, etc.; and (2) the layer also is able to change the protocol of the data and/or control formats that will pass between modules N and N+1. In some embodiments, modules may be manufactured by different vendors and prior worldwide standards generation, communication, and controls may have different protocols (e.g., they may use a different codex). The signals test and codex translator layer converts the communication protocols so that modules N and N+1 can exchange valid information. The layer labeled as "security layer interface" includes sensors, electronics (e.g., circuits), and control systems with software that serves as a signal's "firewall" between module N and module N+1. This layer is intended to protect the adjoining modules from cyberattacks (e.g., malware, denial of service (DoS), Byzantine attacks, man-in-the-middle, and others). The terms are generic here and other attacks are possible and may be mitigated against without deviating from the scope of this invention.

Various types of control software may be included in some embodiments at the individual cell level, at the collective ensemble level, or both. The collective ensemble represents all of the connected cells and their collective computational abilities in their totality. For instance, all cells may individually include computation hardware (e.g., microprocessors and/or nanoprocessors, GPUs, etc.). Some of the software, such as that for a particular cell's self-maintenance functions, could be run on the cells' computational hardware locally. However, in some embodiments, "local" (as opposed to global or worldwide) computational cloud architectures may be used. With such an architecture in place, excess computational processing capabilities of cells in the ensemble may be used to support or enable ensemble functions. Examples of ensemble functions include, but are not limited to, maintaining the attitude of a large (e.g., 1 km) space construct (e.g., an argosy), the coherent capture of signals from numerous sensors that are widely spaced from one another, general distribution of electrical power or communication bandwidth among thousands of cells, etc. In this sense, the cells of the ensemble are somewhat analogous to cells that maintain the main systems of the human body (e.g., nervous, lymphatic, circulatory, endocrine, etc.). These systems operate beyond the functions of the individual body cells that collectively enable them.

To connect one tram to another, power and data contacts may be aligned with one another and trams may be mechanically and/or magnetically attached to one another. For instance, an electromagnet of one tram may be set to the opposite polarity of an electromagnet of the other tram so they attract (i.e., N-S or S-N). To separate, the polarity of one magnet may be modified to be the same as the other magnet (i.e., N-N or S-S). The magnets may be housed or encapsulated in materials to ensure minimal magnetic leakage (e.g., mu-metal) since stray magnetic fields affect some sensors (e.g., radiometric sensors).

In order to maintain attitude of the cell, for each ring rotation (or rotation of the payload/control section), or more specifically, an angular momentum change, there should be a near-simultaneous counter-rotation maneuver to compensate for the angular momentum change. This can be done by motion of another ring, motion of the reaction wheels (in the payload/control section), movement of a tram, a small propulsive maneuver, or a combination thereof, with the intent that the angular momentum change in the first motion-maneuver is nulled by the second motion-maneuver.

A key feature of this approach is that that the outer ring dimension can be any desired size, which could depend on the mission and/or launcher that is used. The outer ring could be 10 cm, 30 cm, 300 cm, any desired diameter, or a combination thereof without deviating from the scope of the invention. For example, if the outer and inner rings are manufactured from carbon fiber reinforced composites (CFSs), rings of approximately 5.7 meters in diameter can readily be produced, which is the same cross section as the fuselage of a Boeing 787 Dreamliner®. Furthermore, the outer ring may have an irregular shape, as discussed herein.

Because the nested-ring cell in some embodiments is circular in shape and able to be flattened, it is possible to "stack" cells onto different launch vehicles (e.g., air-launched Pegasus rockets, the Delta rocket family, the SpaceX Falcon 9, etc.), some example stackable configurations are described in more detail below. The outer ring in each cell may have a connector tram that is capable of multi-axis rotation. Consequently, such a joint could be used to connect the stacked nested-ring cells during stowage (see, e.g., FIGS. 6A and 6B) such that upon orbital deployment, the stacked cells expand like a Slinkey™ toy or an accordion (see, e.g., FIGS. 6C, 6D, and 6E), but with only one attachment point per cell in some embodiments. This deployment approach enables the placing of hundreds, thousands, or more nested-ring cells into orbit without having to exercise a disengagement/re-engagement maneuver. This provides a significant cost and energy savings for missions that require a large number of cells to be deployed, connected, and operate in concert. This capability is novel and is harder to implement with cube-shaped units, for example.

The prehensile grasping mobility of the cells that provides a hop and/or roll action in some embodiments requires more power than body-mounted solar cells of conventional CubeSats can provide. Space data from Aerocubes show that a 1U CubeSat with solar cells mounted on two sides is capable of producing approximately 4 watts of power for normal orbits and operations. However, calculations show that approximately 8 watts of power would be necessary to have a fully functioning programmable cell in some embodiments, albeit that number is based on power draws of current motors and robotics. Gathering more solar power generally requires a deployable (i.e., a solar panel that extends out from the cell). This approach is the current practice in space systems. However, given that the cells of some embodiments perform hop and/or roll maneuvers, a traditional solar panel deployable would be obstructive.

An alternative is developing a deployable that can be opened/closed repeatedly, as is described further in some embodiments below. This may be risky using folding deployable solar panels (e.g., origami-type structures) due to the complex mechanical linkages involved therein, and the possibility of a jam-up. To address this concern, two or more round solar panels may be employed. In some embodiments, the backs of the solar panels may carry batteries that can scale with the solar panel surface area and create a more integrated photovoltaic system. Furthermore, in a stowed configuration, the batteries may make up the surface area of the top and bottom of the cell, and thus protect the delicate solar panel surface area from handling damage. In certain embodiments, solar cells/batteries within a panel may be attached to trams on the outer ring, and thus can both traverse along the outer ring and pivot about a universal motion joint of the tram.

Figure 7A:
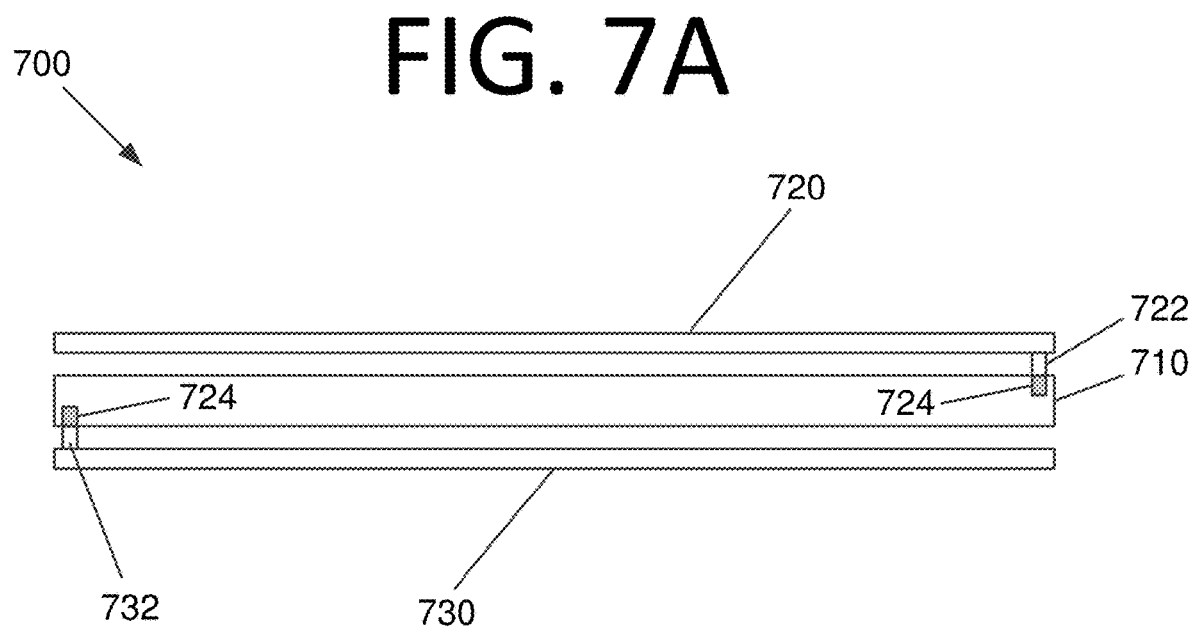
FIG. 7A is a side view illustrating a cell in a partially deployed configuration with round top and bottom solar panels, according to an embodiment of the present invention.
Figure 8:
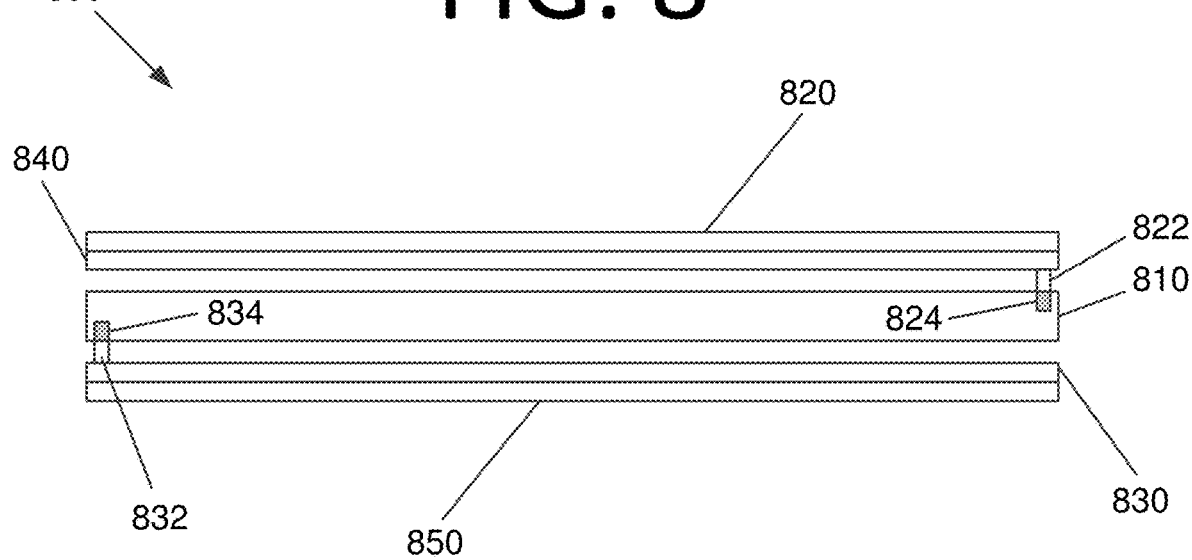
FIG. 8 is a side view illustrating a cell with round top and bottom solar panels in a partially deployed configuration that have, or are operably connected to, batteries, according to an embodiment of the present invention.

In some embodiments, cells with solar cell/battery panels are employed (see, e.g., FIG. 8; see also the descriptions of FIGS. 7A to 8 below). The solar cell/battery panels may be circular in some embodiments, and may be connected to a payload/control section in the center via specialized connections that provide power from the solar cell/battery panels to the payload/control section. In the stowed configuration, the solar cell/battery panels may be housed or recessed within the outer ring. Consequently, and unlike in FIG. 8, in a cross-sectional view of the fully stowed configuration, the solar cell/battery panels would not show. During deployment, the specialized connections may push the solar cell/battery panels above the outer ring to allow the solar cell/battery panels to pivot and rotate about the connections and deploy, in a similar manner to what is shown in FIGS. 7B and 7C. The specialized connections may be motorized such that upon failure of a solar cell/battery panel or upon the cell instituting a roll motion (e.g., via prehensile grasping), the solar cell/battery panels can be rotated back into the housing. The diameter of the solar cell/battery panels should be smaller than the diameter of the outer ring to permit protective stowage. In embodiments where the battery is located behind the solar cell panels and during stowage, the solar cells are typically hidden, and the specialized connections may have a robotic joint design to enable both twisting and pivoting motion.

In some embodiments, it is possible to attach various sensors and other devices to the trams. For instance, cameras may be powered by the ring rail via the tram or via wireless RF or optical power, and may transmit data to the payload/control section using wireless technology, e.g., via millimeter wave (mm-Wave) or microwave (µ Wave) wireless technology, which may have speeds of approximately 100 Gb/s, or via a hardwired data line available on the ring rail. Because mm-Wave technology (Ka, V, W, mm) and µ Wave technology (and in the future, terahertz technology and beyond) is inherently smaller than current wireless technology (S, C, X, Ku, and K bands), it can be integrated onto the trams of even smaller cell embodiments relatively easily. Moreover, the mm waves and microwaves are more directional, and therefore, it is easier to direct the energy toward the payload/control section. Another feature that is possible is that when multiple cameras are mounted on ring trams, it is possible to see in front, to the side, and behind the facing direction of the nested ring structure. Cameras on an inner ring, for example, can be controlled to periodically "look around" (e.g., look other directions including towards an adjacent connected neighbor cell) without having to rotate the payload/control section. For example, a small light detection and ranging (LIDAR) device (which, in essence, is laser radar) can be attached to a tram that is powered by the payload section. The laser and its smaller extendable telescope (if necessary) and/or a beam directing mirror may be used to allow sensing of nearby objects (e.g., ~300 km or less) to mitigate against a hit by space debris.

Certain payloads can only be operated when extended. For instance, in the case of a telescope, the laws of optics dictate the distance between lenses and mirrors for the desired magnification/resolution. Extensible systems such as telescopes cannot easily be "flat-packed". However, with a nested-ring structure, a primary lens or mirror on one of the rings may be rotated out such that the lens or mirror is at a particular distance L from a secondary mirror (located on another ring or on the payload/control section). A similar concept is feasible for an antenna (e.g., RF, mm-Wave, μ Wave, etc.) that requires a larger surface area for signal capture, which can be flipped out at a particular distance L.

A similar concept can be applied with other optical elements that are typically found in telescopes to filter or analyze light prior to detection by a sensor. For example, in some telescope designs, the optical focal point is not placed on the sensor or a secondary mirror. Rather, the focal point is just above the sensor or secondary mirror. This allows insertion of spatial filters (e.g., a field stop) and other devices to be placed at the focal point to further refine and characterize the image. In such embodiments, the characterization sensors or devices may be placed on a tram closer to the sensor (often, but not necessarily, on the payload/controller section). Given the multiple nested rings of some embodiments, it is also possible to change the magnification of the lens/mirror of the primary optics, and consequently allow for multiple telescopic magnifications.

In some embodiments, a lens of aperture D may be rotated such that the distance from the lens to the surface (e.g., a camera chip) has distance L. A lens or a mirror may direct the focused light onto a second mirror, which then further reflects the light to a sensor located on a rail or the payload/control section. This would be useful, for example, if there are multiple cameras and each camera chip is sensitive to a different wavelength band.

In certain embodiments, the sensor may need to be shielded from ambient light to keep it cool, and thus lower electronics noise. Such embodiments may capture images from a source that emits heat via radiation (e.g., the Earth). In some important frequency bands, the Earth's albedo produces sufficient energy to increase the noise level on sensitive sensors. Currently, these sensors must be kept cold by using cryogenic fluids, which evaporate in the vacuum of space over time, thus rendering the sensor inoperable. In orbits about Earth, staring into dark space can lower the surface temperature of an object close to 116K (−157° C.). With a nested-ring architecture, sensitive sensors can be placed so as not to look at the sun or Earth, and the image (i.e., desired incoming radiation) may be guided to the sensor via a sequence of mirrors that can move with motion of the cell in orbit. Another approach would be to use sun or heat shields to protect a sensor in a similar configuration to the deployable solar panels described below. The sun and heat shields may thus fold out and be positioned as desired.

Additional advantages of the nested-ring architecture are apparent in situations where multiple rings (attached or nonattached) work in concert. For instance, two nested-ring structures may not be attached per se, but rather, may be attached to other rings themselves. In this mission, a laser beam generated from one nested-ring may hit a deployable on the other nested-ring that is a mirror, and the outcome is redirection of the laser energy. This may provide a novel optical communication, cell-to-cell, crosslink scheme. It should be noted that if the other nested-ring deployable is not a mirror that merely defects light, but is actually a part of a telescope, then the divergence of the laser beam may be changed by using mirrors or lenses from different nested ring deployables. Other scenarios are also possible in which cells are attached, and the totality of all of the linked cells takes up a distance measured in kilometers. In such instances, a high speed local optical free-space intracell communication link may be established. To better appreciate the advantages of this scenario consider 1,000 attached cells in some articulated topology with Cell #1 and Cell #1000 being at opposite ends. It may be more efficient (e.g., reduced latency in information transfer) for Cell #1 and Cell #1000 to communicate via a direct free-space optical communication link than via a woven hardwire communication system.

Another example where a nested-ring system may be beneficial is in the assembly of caged structures that carry radiative matter, such as a radioisotope thermoelectric generator (RTG or RITG) or a nuclear reactor. These systems may serve as power sources for long duration space missions, such as to the edges of our solar system and beyond. A drawback of such nuclear systems is that the radiation emitted from these devices is harmful to the operation of nearby electronics. For example, in the case of RTGs, these are typically placed at the end of a large truss. In some embodiments, an RTG or nuclear reactor may be placed in the center of a structure.

For voyages to the outer reaches of our solar system, reactors serve not only to provide power, but also heat given that temperatures on conventional electronics usually plummet below the operational range. A large cage structure, for instance, where operating payloads are placed at the periphery and the power source is in the middle, would be able to deliver electrical power and heat from the center core to other cells via diffusion through interconnected cells and/or via radiative transfer if the payload/control sections of the respective cells are oriented to capture the heat. For example, if the reactor portion in the center is a sphere (e.g., one-meter diameter), by Stefan-Boltzmann's Law, approximately 6.3 kW of radiated heat power is emitted via radioactive decay if the center temperature can be held at 200° C. Rather than having all the heat escape into space, a portion could be collected by orienting the payload/control sections of the cells.

STACKABLE/DEPLOYABLE RING-SHAPED CELLS

In some embodiments, the nested ring structures may be collapsible and stackable for launch. Such embodiments may facilitate more efficient use of the payload compartment volume of a launch vehicle, for example. Because current space systems do not yet utilize "cell-based" architectures, efficient packaging for launch is problematic for these systems. At certain sizes, not all shapes lead to efficient stowage. For example, prismatic shapes, such as cubes (e.g., CubeSats), do not efficiently pack within a cylindrical launch vehicle when launched in large numbers. Some embodiments offer a better solution. One or more stacks of nested ring cells could efficiently fill the launch vehicle payload volume with more space vehicles. Also, nested ring cells could be designed to fit to the payload shape and volume of a given launch vehicle (e.g., that of FIG. 2B).

Figure 6A:
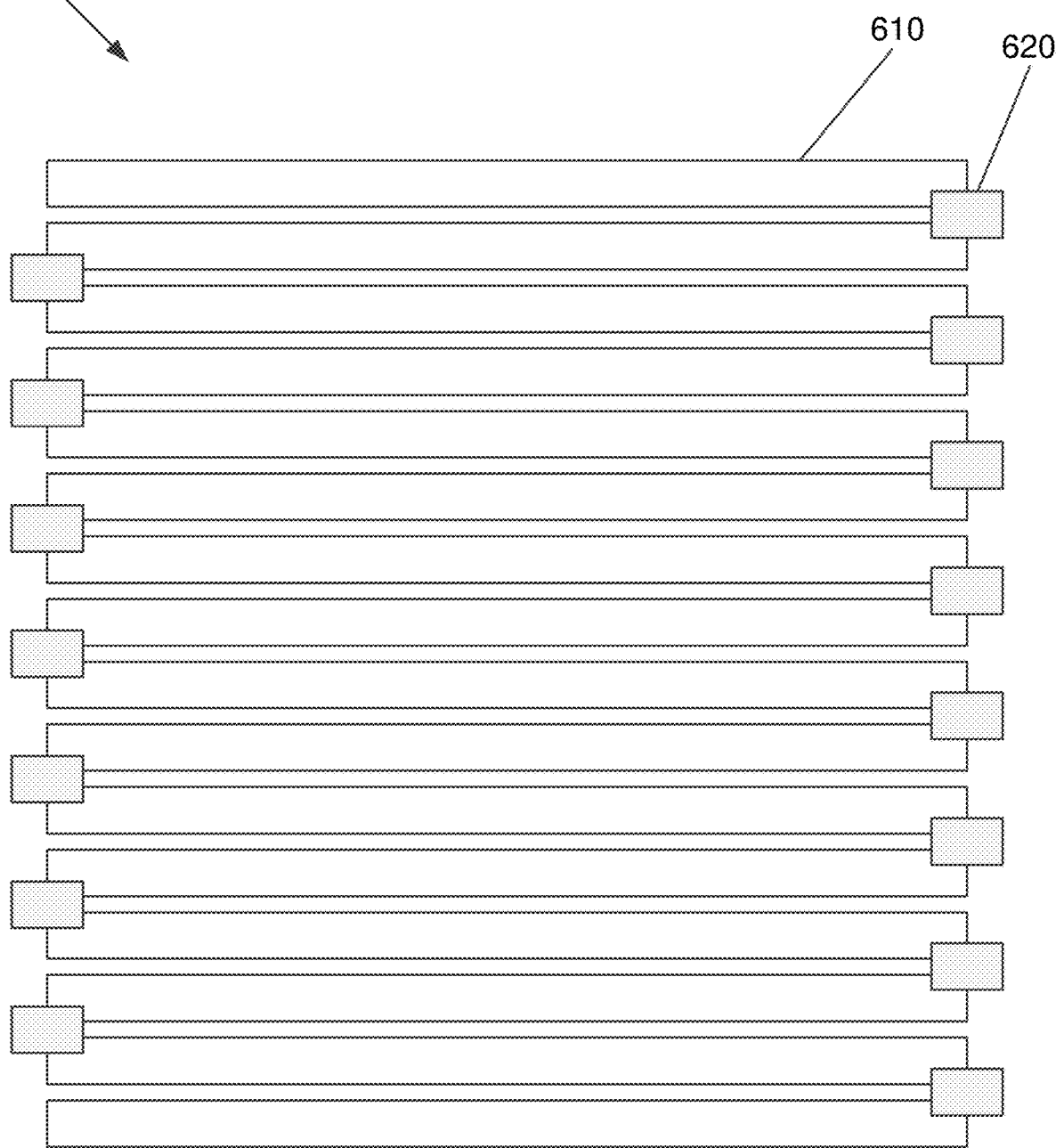
FIG. 6A is a side view illustrating a cell stack in a stowed configuration, according to an embodiment of the present invention.

FIG. 6A is a side view illustrating a cell stack 600 in a stowed configuration, according to an embodiment of the present invention. Cell stack 600 includes ring-shaped cells 610, where each cell is connected to two other cells (unless on the top or bottom of cell stack 600, in which case the top and bottom cells are connected to only one other cell) via connecting members 620 (e.g., ball joint connectors, magnets, or any other suitable connector without deviating from the scope of the invention). In some embodiments, cell 610 may be cell 100 of FIGS. 1A and 1B. In this embodiment, each connecting member 620 is on the opposite side of cell stack 600 as the one above/below it. However, connecting members may interconnect adjacent cells in any desired location and/or configuration without deviating from the scope of the invention.

In some embodiments, connecting member 620 may rotatably connect two adjacent cells such that they are not separable. However, in certain embodiments, connecting member 620 may be made up of two separate portions—one for each connected cell—that mechanically and/or magnetically connect to, and release from, one another. In certain embodiments, the cells may mechanically interlock with one another via a releasable mechanism driven by an actuator. In some embodiments, some cells may use magnets to interlock and others may use mechanical interlocking mechanisms. Mechanical interlocking mechanisms may be stronger and may support larger structures. In some embodiments, mechanically connected cells may form a support structure within the space system that supports other cells or non-cell space vehicles and provides the ability to build even larger space systems than magnets alone may allow. Additionally or alternatively, such structures may be used for terrestrial and/or underwater support structures in some embodiments.

Figure 6B:
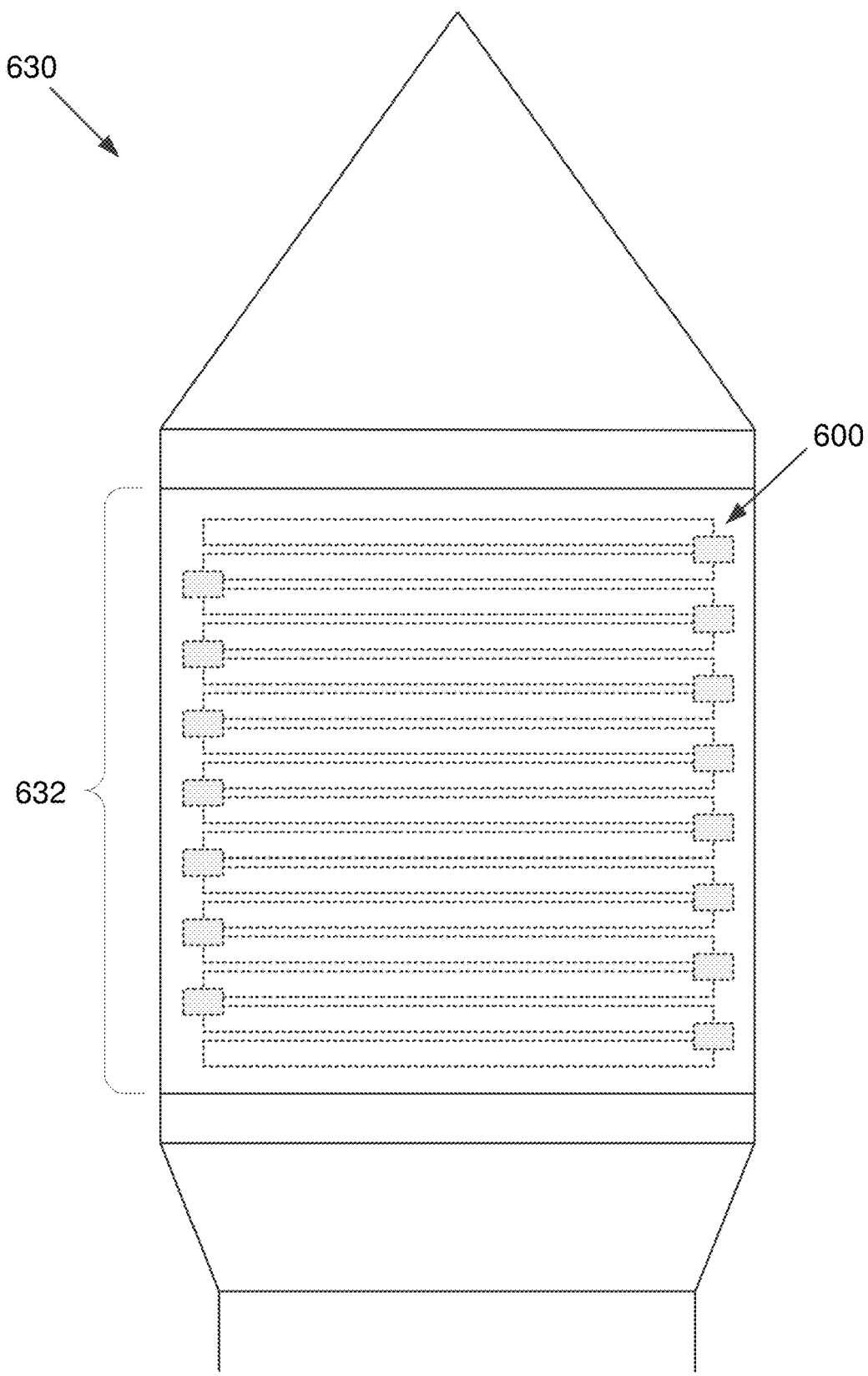
FIG. 6B is a side view illustrating a payload section of a launch vehicle with the cell stack loaded therein, according to an embodiment of the present invention.

FIG. 6B is a side view illustrating a payload section 632 of a launch vehicle 630 with cell stack 600 loaded therein, according to an embodiment of the present invention. Due to the generally cylindrical shape of payload section 632 in this embodiment, cell stack 600 makes efficient use of the space therein. When "flattened" for deployment, cells 610 may require considerably less volume than a 1.5 U or 3 U CubeSat, for example. As such, a larger number of flattened cells capable of performing equivalent or superior functionality to small CubeSats may be deployed in a single launch. Furthermore, as is discussed in parent U.S. Nonprovisional patent application Ser. No. 15/655,972, cells may be inserted in multiple launches and may collectively join to form larger structures than fixed-size systems that conventional launch vehicles can deliver. This enables construction of potentially enormous structures in space.

Figure 6C:
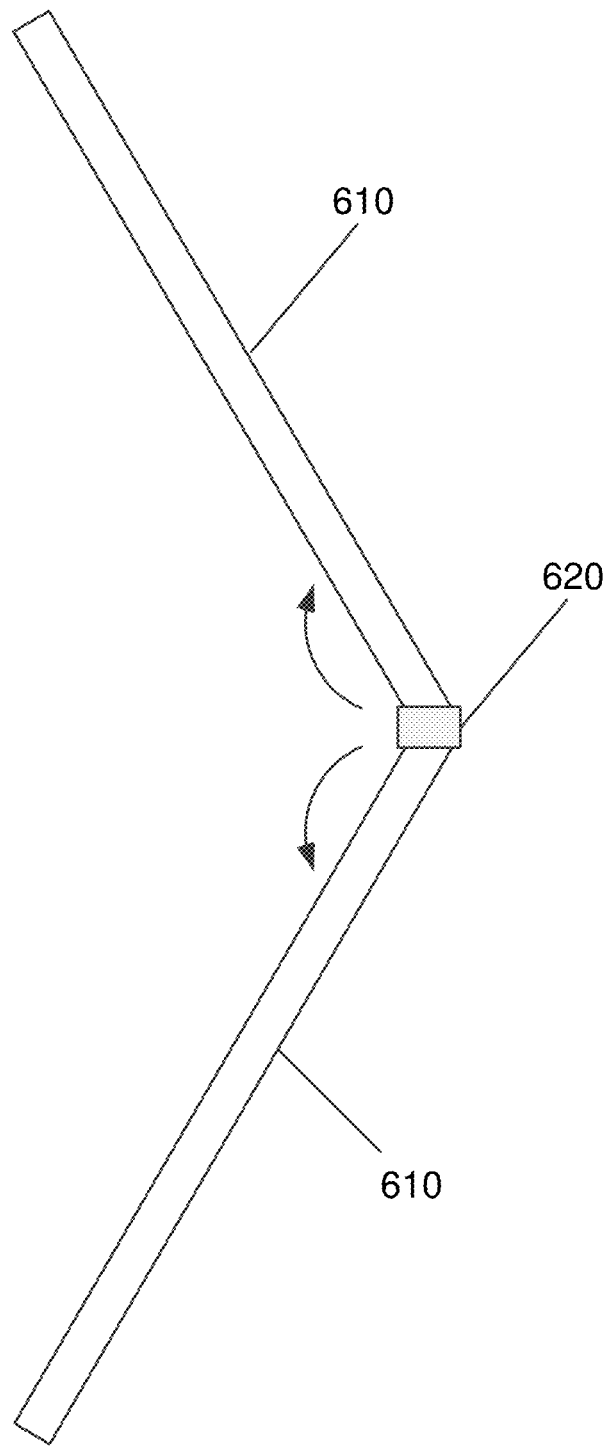
FIG. 6C is a side view illustrating two cells unfolding about a connection member, according to an embodiment of the present invention.
Figures 6D, 6E:
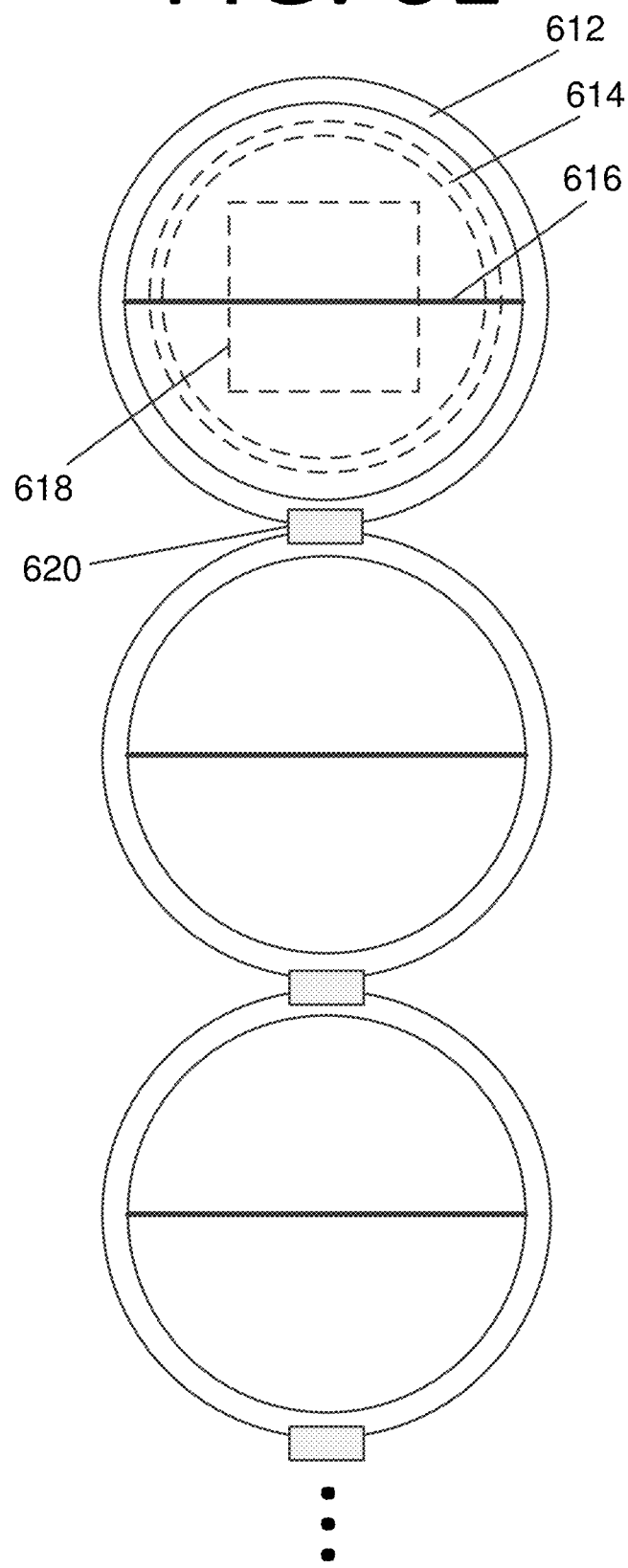
FIG. 6D is a side view illustrating the cell stack in a deployed configuration, according to an embodiment of the present invention.
FIG. 6E is a front view illustrating the cell stack in the deployed configuration, according to an embodiment of the present invention.

FIG. 6C is a side view illustrating two cells 610 unfolding about a common connection member 620, according to an embodiment of the present invention. Once deployed, cells 610 may deploy about their respective connection mechanisms. In this embodiment, cells 620 move about connection mechanism 620 until they are perpendicular with respect to their stowed position. See also FIG. 6D. Because connection member 620 may employ a variable angle connection scheme, the full deployment need not be as shown in FIGS. 6D and 6E. Given a large number rings, in some embodiments, the net expanded or unfolded structure can have a curved shape to enable capture of light or images with better efficiency, for example.

FIG. 6E is a front view illustrating cell stack 600 in the deployed configuration, according to an embodiment of the present invention. Cells 610 include an outer ring 612 that defines the widest circumferential boundary of cells 610 and a support member 616 to which one or more inner rings and a payload may be attached. As shown in the upper cell, at least one inner ring 614 and a payload/control section 618 may be attached. While shown as a thick line here, it should be appreciated that support member 616 may be hollow in some embodiments, and may internally and/or externally facilitate power and/or data between rings 612/614 themselves, and/or between rings 612/614 and payload/control section 618. It should also be appreciated that any suitable support structure, or structures, may be used without deviating from the scope of the invention. For instance, multiple support structures may be used. Additionally, or alternatively, adjacent cell sections may be connected to one another. For instance, outer ring 612 may be connected to inner ring 614, inner ring 614 may be connected to payload/control section 618, etc.

Various components may be included in and/or on payload/control section 618. Essentially, these components may be the subsystems that are required to control and fly space vehicles. These may be any suitable component including, but not limited to, cameras, radio frequency (RF) antennas, transceivers, thermometers, radiation detectors, novel sensors, light sources, spectrometers, reaction wheels, an attitude determination and control system (ADCS), processing circuitry (e.g., a central processing unit (CPU), a field programmable gate array (FPGA), an accelerator (e.g., a graphical processing unit (GPU)), etc.), propulsion mechanisms and tanks, or any other component or combination of components without deviating from the scope of the invention. One or more components may be deployable in some embodiments. For instance, an antenna may be extended and retracted, a solar array may be unfurled and retracted, etc.

In certain embodiments, some connected nested-ring cells do not contain a payload/control section, such as payload/control section 618, but instead only have nested rings (i.e., they are hollow in the center). These specialized nested-ring cells may be wirelessly controlled from adjoining nested-ring cells that have a full complement of control systems. In other words, cells without a payload/control section may have electronics and batteries within their rings, or attached thereto, that enable them to move their trams and rings.

The embodiment shown in FIGS. 6A-E shows a cell stack that deploys into a linear arrangement of cells. However, any cell interconnection patterns are possible without deviating from the scope of the invention. Furthermore, once separated from the launch vehicle, the cells may move about one another, connecting to, moving to the outer rim, and disconnecting from one another using a suitable connection mechanism (e.g., magnets, as shown in FIGS. 7A and 7B of parent U.S. Nonprovisional patent application Ser. No. 15/655,972).

FIG. 7A is a side view illustrating a cell 700 in a partially deployed configuration with round top and bottom solar panels 720, 730, respectively, according to an embodiment of the present invention. Sun or heat shields, reflecting surfaces, or an antenna dish may be designed and deployed in a similar manner to solar panels 720, 730 in some embodiments. Solar panels 720, 730 may be thin film, crystalline, or any other suitable solar panel technology without deviating from the scope of the invention. Top solar panel 720 and bottom solar panel 730 connect to a cell body 710 of the cell via extensible, rotatable connecting members 722, 732, respectively. In some embodiments, solar panels may be connected to trams on rings of the cell. Respective actuators 724, 734 rotate each of connecting members 722, 732. In some embodiments, the rotatable actuators may be on the side of connecting members 722, 732 proximate to the respective solar panels, the side proximate to cell body 710, or both.

In the stowed configuration, solar panels 720, 730 are housed or recessed within cell body 710. Consequently, if fully stowed in this side view, solar panels 720, 730 would not be visible. During deployment, connecting members 722, 732 push solar panels 720, 730 above/below cell body 710, respectively, via actuators 724, 734. Solar panels 720, 730 can then pivot and rotate about connecting members 722, 732 and deploy, as shown in FIGS. 7B and 7C.

In some embodiments, connecting members 722, 732 are motorized via actuators 724, 734 such that upon failure of cell 700, solar panels 720 or 730, or the cell instituting a roll motion (e.g., via prehensile grasping), solar panels 720, 730 can be rotated back into cell body 710. In some embodiments, where the failure is catastrophic (e.g., meaning power/control is completely lost to cell 700) a wireless coded message from a nearby cell may jettison the failed cell by either a miniature gyro-based separator or a non-explosive shape memory alloy device that changes shape to release the solar panels and all connections. In certain embodiments, connecting members 720, 730 are also hinged such that solar panels 720, 730 may also be rotated about an axis provided by the hinge. Connecting members 720, 730 include power lines (not shown) that provide power from solar panels 720, 730 to cell 700.

In the fully stowed configuration, solar panels 720, 730 are packaged such that they are contained within cell body 710 for protection. Cell 700 is vertically and horizontally compact, with solar panels 720, 730 recessed below the thickness of outer rim 710 (and nothing additional to the horizontal footprint). However, it should be noted that in some embodiments, one or both solar panels 720, 730 may be larger or smaller than cell body 710. However, in these embodiments, packaging is typically less efficient. Solar panels may also have a different shape than the cell body in some embodiments. In certain embodiments, cell 700 may be connected to other cells and stowed for deployment in a cell stack in a similar manner to that shown in FIGS. 6A and 6B. However, depending on the location of the connections between cells (which may move due to connections to respective trams), the solar panels may need to be of a smaller diameter than the outer ring of the cell in order to be stackable.

FIGS. 7B and 7C are side and front views, respectively, illustrating cell 700 in a deployed configuration, according to an embodiment of the present invention. In order to deploy, solar panels 720, 730 first pop up (i.e., above cell body 710 such that they clear its thickness) and then rotate about respective rotatable connecting members 722, 732 to expose photovoltaic cells (not shown) of solar panels 720, 730. Rotatable connecting members 722, 732 are also connected to an outer ring 712 of cell body 710. Similar to FIG. 6E, a support member 714 is also included in this embodiment. The orientation, shape, size, and configuration of support member 714 may differ from what is shown without deviating from the scope of the invention. The diameter of solar panels 720, 730 should be smaller than the diameter of cell body 710 to permit protective stowage. In embodiments where the battery is located behind the solar panels (e.g., cell 800 of FIG. 8) and during stowage, respective connecting members have a robotic joint design to facilitate twisting and pivoting maneuvers.

In order to optimize power generation when the sun is in view, solar panels 720, 730 may both have their photovoltaic cells facing the same direction (e.g., both on the face visible in FIG. 7C). In some embodiments, batteries may be included opposite the photovoltaic side of the solar panels in order to facilitate compactness and to increase power storage capabilities. Such a cell 800 is shown in FIG. 8 in a partially deployed configuration. Like cell 700 of FIGS. 7A-C, cell 800 includes a cell body 810, a top solar panel 820, a bottom solar panel 830, extensible, rotatable connecting members 822, 832, and actuators 824, 834. However, each of solar panels 820, 830 includes a respective battery 840, 850 on its non-photovoltaic side. Additionally, or alternatively, battery pack 840, 850 may include circuitry for their respective solar panels, if such circuitry is not already included as part of solar panels 820, 830. This facilitates significant power storage capabilities while also ensuring that batteries 840, 850 do not consume space that could otherwise be used for other components within the outer ring of cell 800. Extension and rotation of the solar panels/batteries may be facilitated by actuators 824, 834. In some embodiments, instead of the batteries, the back of the solar cells may include heat radiators to remove excess heat from the nested-ring cell. Because the solar panels are likely to face the sun, the back of the panels will tend to be facing dark space, where removal of heat by radiative means would be more efficient.

It is also possible to have embodiments where the bottom solar panel/battery positions are reversed (i.e., the positions and orientations of solar panel 830 and battery 850 would be reversed). In such embodiments, the upper connector may enable a 180-degree door-hinge motion to expose the lower solar panel, as well as some rotation about the upper connector. The lower connector may thus have 180-degree door-hinge motion, a 360-degree twist motion about the horizontal axis with respect to what is shown in FIG. 8 to bring the lower solar panel to face the sun, and some rotation about the lower connector.

In some embodiments a series of deployed connected nested rings (see, e.g., FIGS. 6C, 6D, and 6E) could be used in space as a means for capturing solar power for terrestrial use, where each cell has two solar panels deployed. This is an efficient means to deploy what NASA calls the "Sun-Tower." See, for example, https://science.nasa.gov/science-news/science-at-nasa/2001/ast23mar1. A very conservative calculation shows that it is possible to stack 297 nested rings that are 2 cm thick with a 4.6 m diameter in the payload fairing of a single Space X Falcon Heavy launch vehicle, somewhat similar to what is shown in FIG. 6B, which may be deployed similar to the manner shown in FIG. 6C. If the solar panels used just roll-to-roll solar cells (~12% efficiency currently) instead of thin-film crystalline copper indium gallium selenide (CIGS) solar cells (~23% efficient (NREL)) or 4 junctions with concentrator solar cells ~46% efficient (Fraunhofer ISE/Soitec), only 70% of the available sunlight could be harnessed, and of that, only 40% is converted to wireless power (e.g., IR laser or microwave), the amount of electrical power generated from one Falcon Heavy launch tower, ~1.1 MW, is enough to power 684 homes. The generated power could also be beamed to satellites already in space (analogous to a "gas station" in space).

Figure 9A:
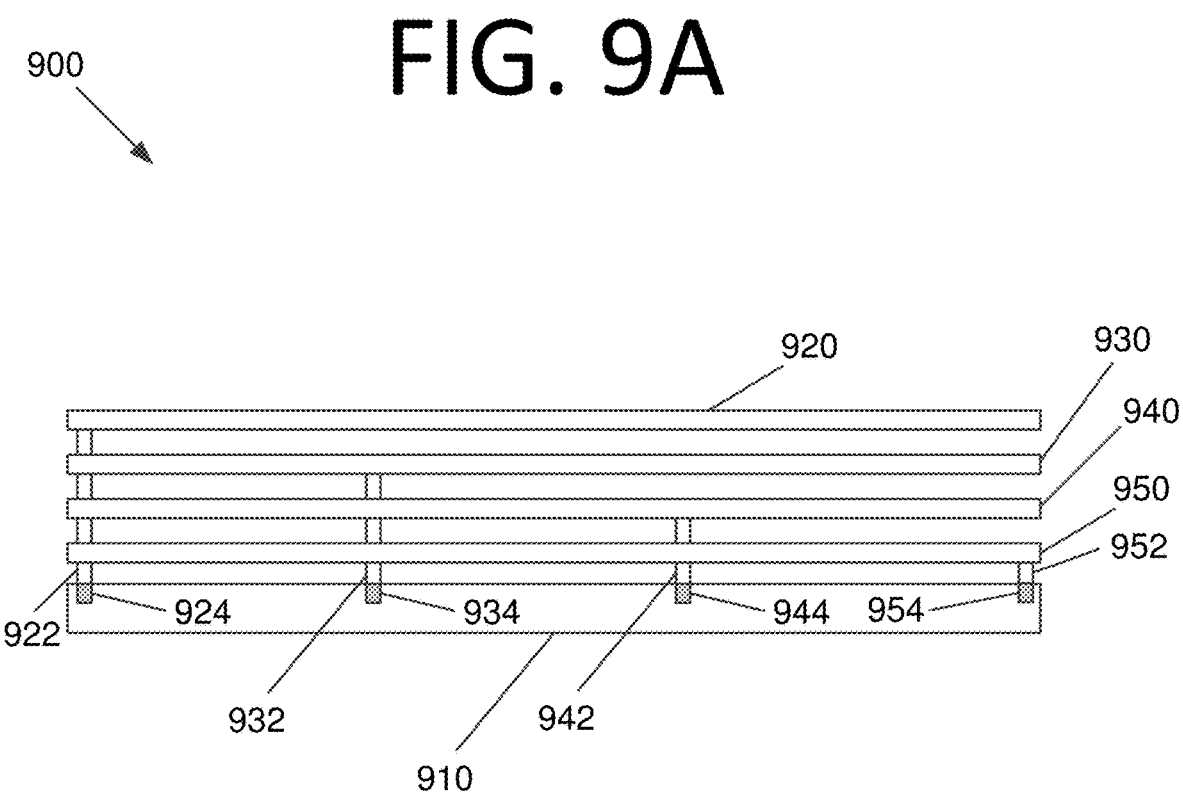
FIG. 9A is a side view illustrating a cell in a partially deployed configuration with four round solar panels on one side, according to an embodiment of the present invention.

It is also possible to have more than two solar panels in some embodiments. Such an embodiment is shown in cell 900 of FIGS. 9A and 9B. As with cells 100 and 600, cell 900 includes a cell body 910, an outer ring 912, and a support member 914. However, cell 900 includes four solar panels on its upper side. Solar panel 920 is the uppermost panel, with solar panel 930 below solar panel 920, solar panel 940 below solar panel 930, and solar panel 950 below solar panel 940. Each solar panel 920, 930, 940, 950 is rotatably connected to rotatable connecting members 922, 932, 942, 952, respectively. Rotation of rotatable connecting members 922, 932, 942, 952 is facilitated by actuators 924, 934, 944, 954, respectively.

Solar panels 920, 930, 940, 950 are stacked on top of outer ring 912. The panels need not be all solar panels in some embodiments. Rather, at least one panel could be another mission support structure, such as reflecting (RF or optical) surfaces for enabling satellite cross-link communications or power transfer (e.g. microwave).

Figure 9B:
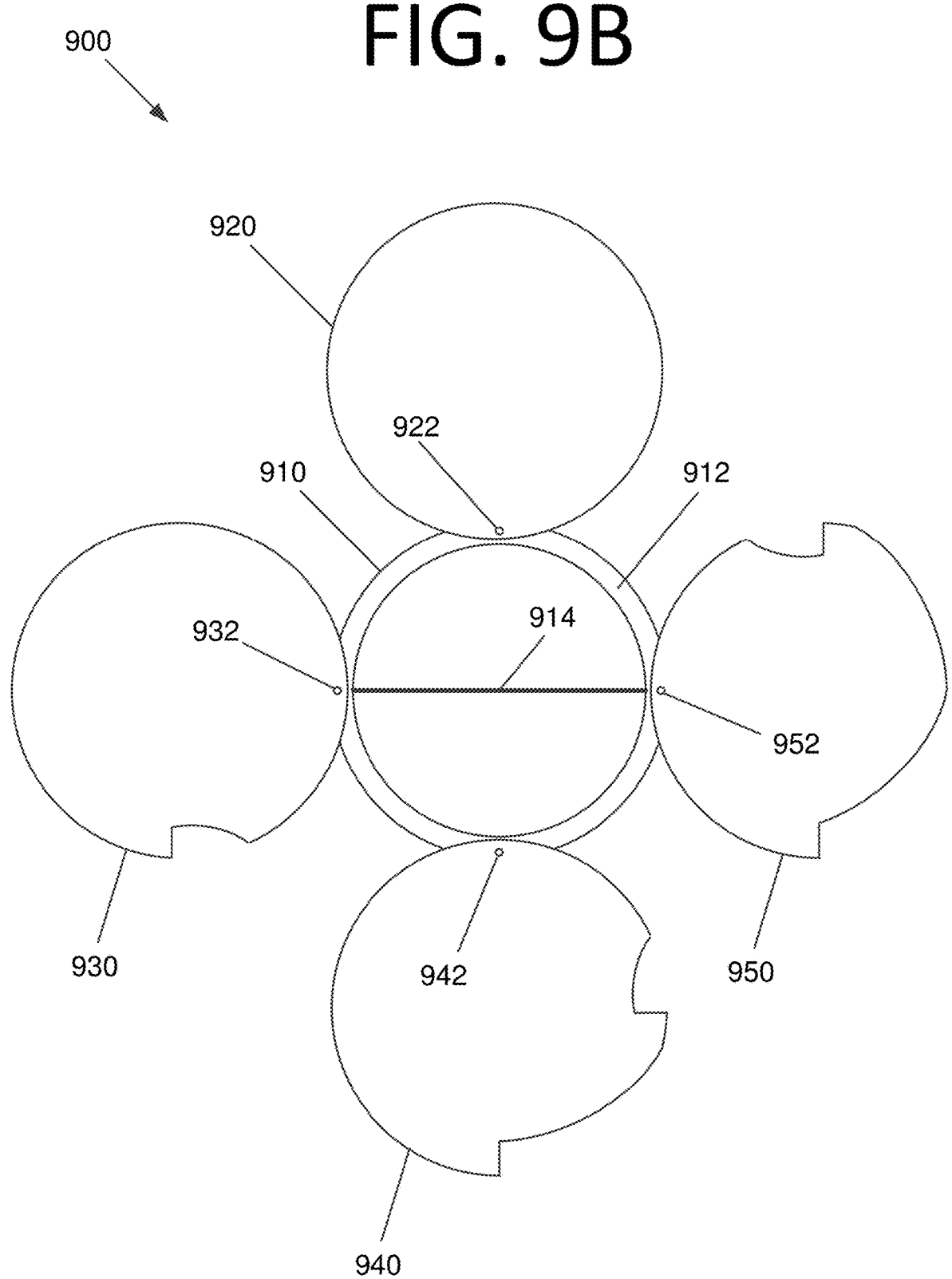
FIG. 9B is a front view illustrating the cell in a deployed configuration, according to an embodiment of the present invention.

As can be seen in FIG. 9B, solar panels 930, 940, 950 have different shapes than solar panel 920, which is in top and does not need to accommodate for any rotatable connection members. More specifically, the shape of solar panel 930 accommodates rotatable connection member 922, the shape of solar panel 940 accommodates rotatable connection members 922, 932, and the shape of solar panel 950 accommodates rotatable connection members 922, 932, 942. It should be noted that the shapes of solar panels 930, 940, 950 as depicted are not necessarily optimal, and any suitable shape may be used without deviating from the scope of the invention. For instance, solar panels 930, 940, 950 may be round with the exception of arc-shaped slits (one for solar panel 930, two for solar panel 940, and three for solar panel 950), where each slit avoids collision with a respective rotatable connection member when cell 900 is in the stowed configuration. In some embodiments, solar panels could be located on the back side of cell 900, or on the front and the back side thereof with photovoltaic faces oriented in opposite directions with respect to the front panels and the back panels, without deviating from the scope of the invention. One or more solar panels could also have batteries on the non-photovoltaic sides thereof for power storage.

In some embodiments, such as those where it is necessary to have the solar panels facing the sun as the satellite or nested-ring structure moves about the Earth in orbit, rather than being horizontally rotatable, solar panels in some embodiments may deploy via hinges. The hinges may be connected to a tram on the outer ring that can move. In other embodiments, the panel is an antenna or reflector that must face in a particular direction.

Figure 10A:
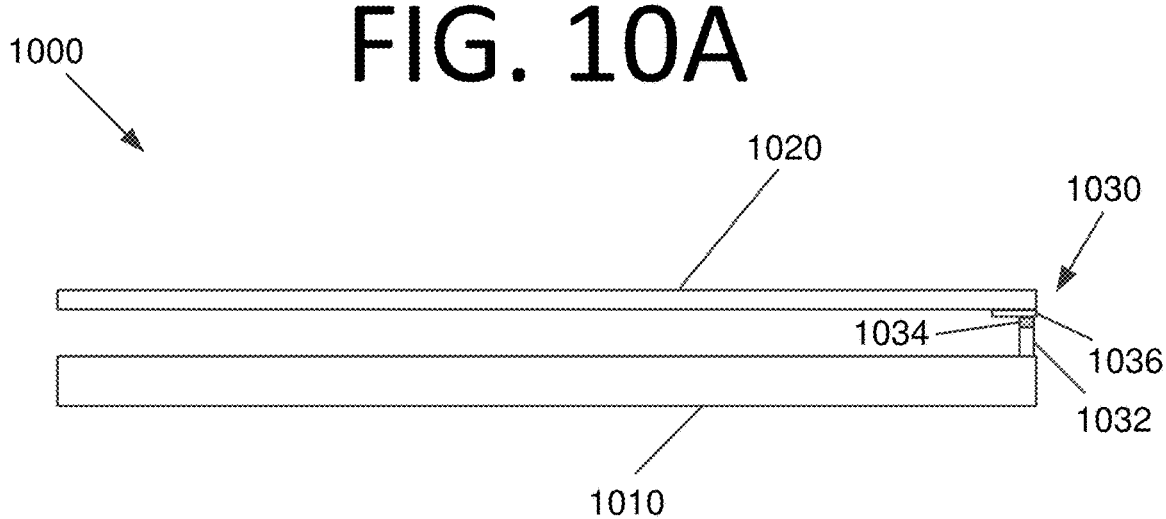
FIG. 10A is a side view illustrating a cell with a solar panel in a partially deployed configuration connected via a hinge, according to an embodiment of the present invention.
Figure 10B:
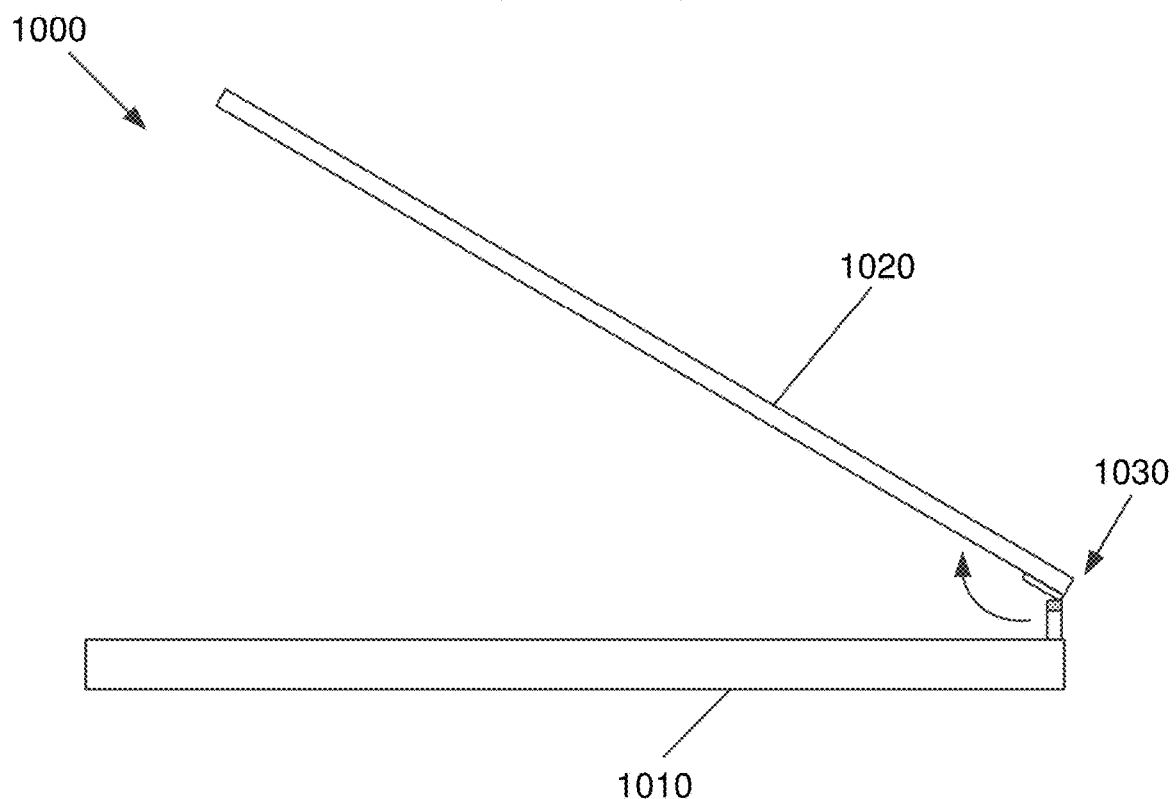
FIG. 10B is a side view illustrating the cell with the solar panel in another partially deployed configuration, according to an embodiment of the present invention.

An example cell 1000 of an embodiment with a solar panel is shown in FIGS. 10A and 10B. Cell 1000 includes a cell body 1010, a solar panel 1020, and an actuated hinge 1030. Actuated hinge 1030 rides on a tram (not shown) that can go move around the perimeter of the outer ring. Actuated hinge 1030 includes a post 1032 that is operably connected to cell body 1010, an actuator 1034, and a solar panel connection plate 1036 that is operably connected to actuator 1034 and facilitates hinge functionality for solar panel 1020. However, in some embodiments, solar panel 1020 may be connected directly to actuator 1034 without deviating from the scope of the invention. In some embodiments, hinge 1030 may be movable about the outer ring of cell 1000 in a manner similar to that disclosed in parent U.S. Nonprovisional patent application Ser. No. 15/655,972.

During deployment, actuator 1034 causes solar panel 1020 to rotate as shown in FIG. 10B. Actuated hinge 1030 coupled with tram motion about the outer ring permits the photovoltaic face of solar panel 1020 in this embodiment to face the sun when orbiting the Earth. When deployed, the photovoltaic face of solar panel 1020 would also be facing up with respect to FIGS. 10A and 10B, but may be tilted in order to be better oriented towards the sun. Indeed, in some embodiments, hinge 1030 may be constructed such that solar panel 1020 can rotate all the way to the back side of cell body 1010 such that the surface of solar panel 1020 that faces towards the top of cell body 1010 is facing outwards (down with respect to FIG. 10A) from the back of cell body 1010.

Figure 10C:
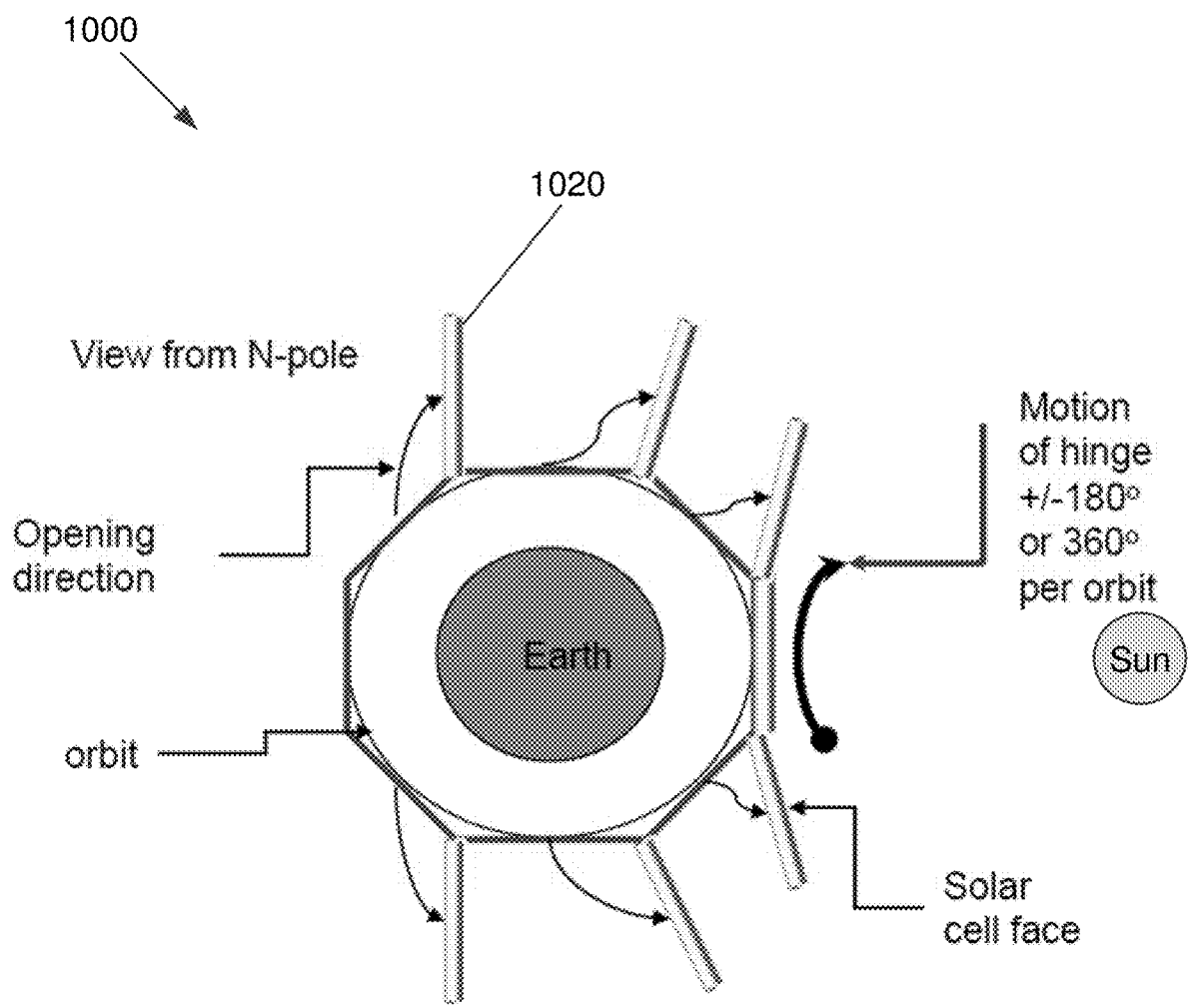
FIG. 10C illustrates potential orientations of the solar panel during orbit, according to an embodiment of the present invention.

FIG. 10C illustrates potential orientations of solar panel 1020 during orbit, according to an embodiment of the present invention. Only solar panel 1020 is shown in FIG. 10C for illustration purposes. As cell 1000 orbits the Earth, the optimal orientation for solar cell 1020 changes. Hinge 1030 may be used to optimally orient solar panel 1020 towards the sun (except perhaps in eclipse, if the orbit has an eclipse phase). Alternatively, solar panel 1020 could be an antenna, a reflector, or any other device or structure that requires pointing in a specific direction without deviating from the scope of the invention. Moreover, multiple hinges may be included enabling more complex articulation, and/or panels may rotate.

Multiple solar panels per side are also possible with hinge configurations. The top solar panel could be round, and lower solar panels could include "cut-outs", somewhat similar conceptually to cell 900 of FIGS. 9A and 9B, to accommodate supports for hinges of any solar panels above the respective solar panel. To deploy, the top solar panel may deploy first, then the next highest, then the next highest, and so forth until all solar panels are deployed.

It should be noted that in addition to, or in the place thereof, sun shields or heat shields may be included and deployed in a similar manner to the solar panel configurations shown in FIGS. 7A, 7B, 9A-C, 10A, and 10B. The sun shields or heat shields may take the place of one or more of the solar panels.

Figure 11:
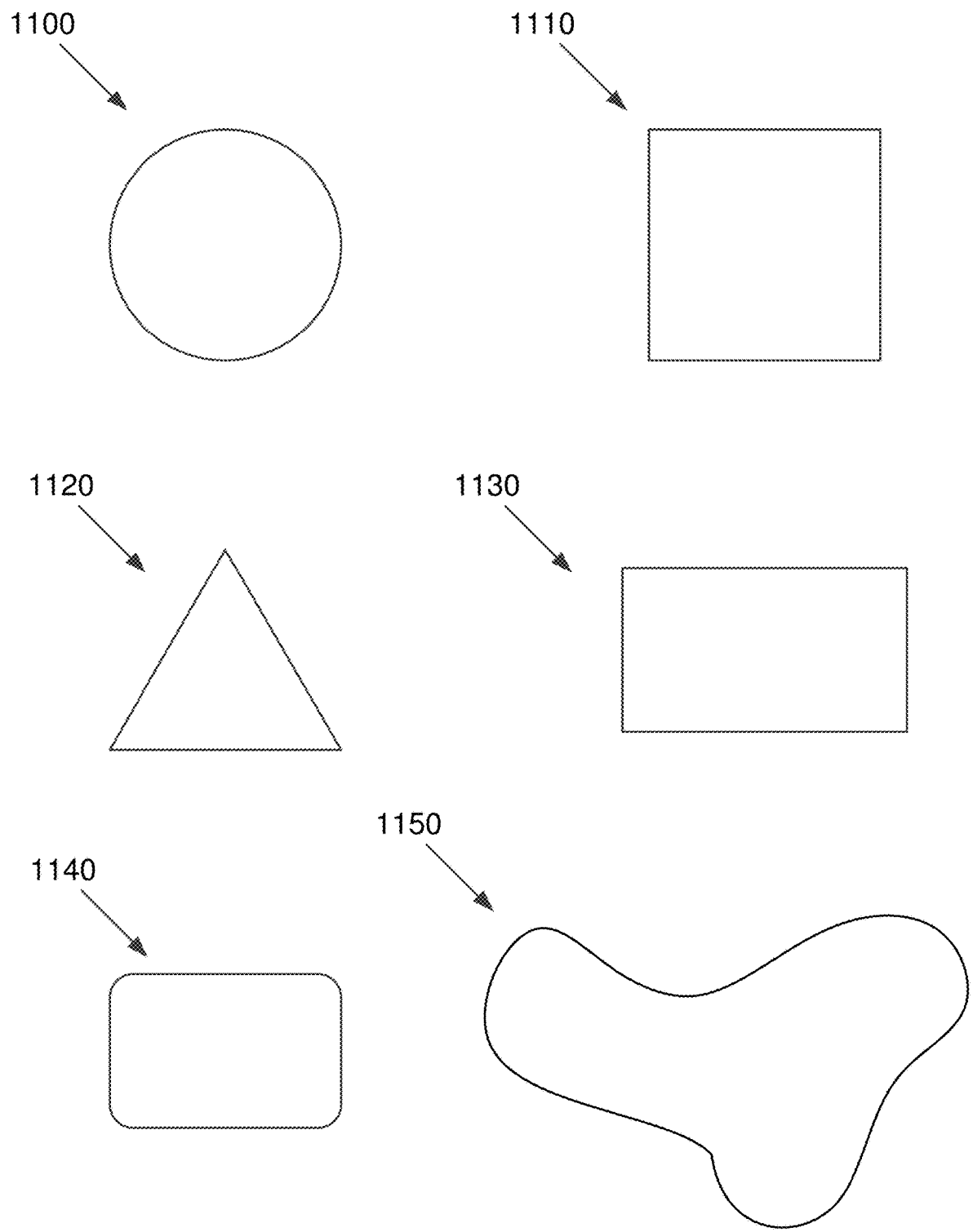
FIG. 11 illustrates some example shapes of a payload/control section, according to an embodiment of the present invention.

Per the above, the payload/control section may have different shapes in some embodiments. For instance, as shown in FIG. 11, the payload/control section may have a circular shape (1100), a square shape (1110), a triangular shape (1120), a rectangular shape (1130), a rounded rectangular shape (1140), an irregular shape (1150), or any desired shape without deviating from the scope of the invention. As shown in FIG. 12, the payload/control section may have a uniform thickness (1200), a sloped thickness (1210), a uniform wave-shaped thickness (1220), or any other desired design without deviating from the scope of the invention.

Figure 13:
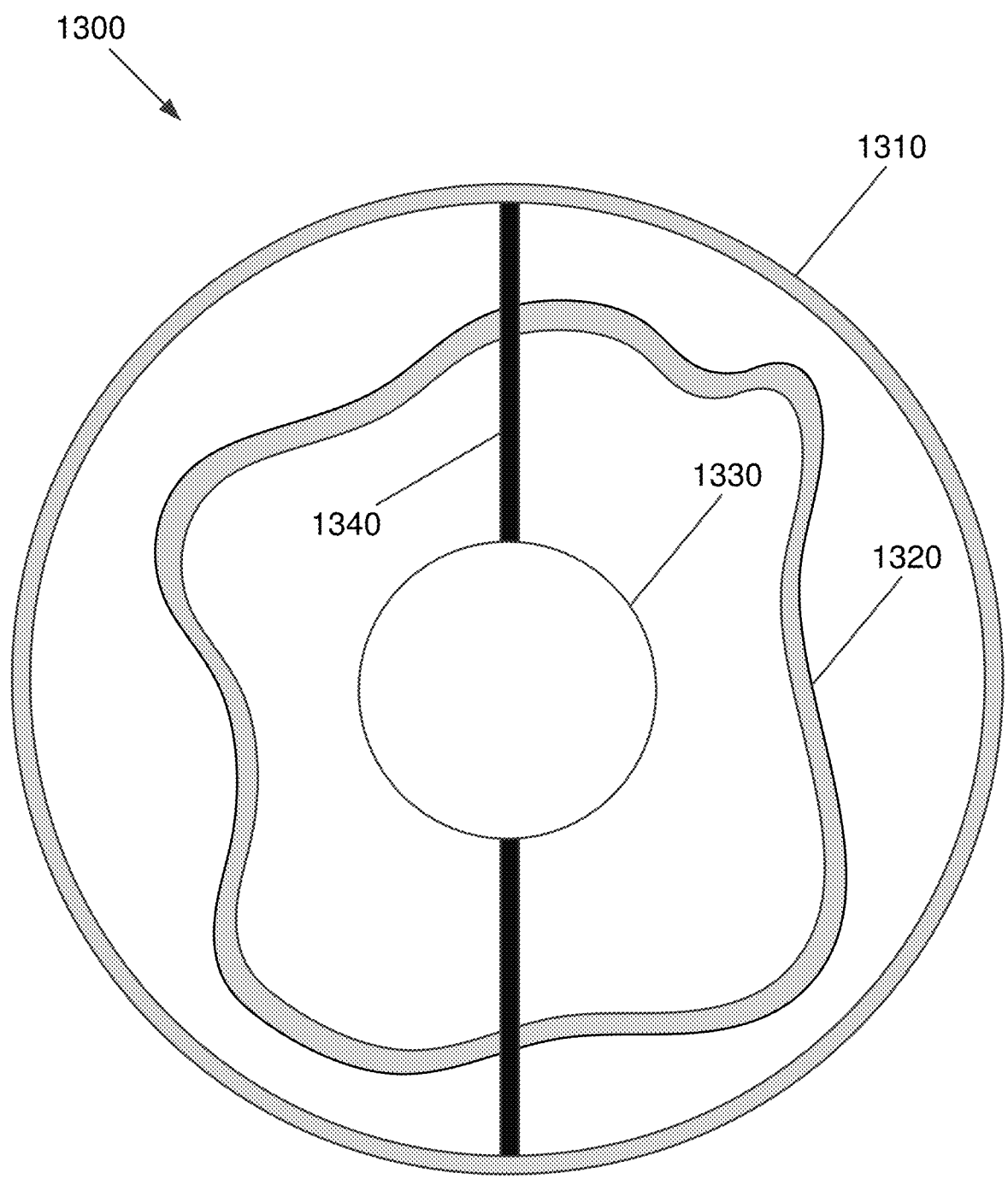
FIG. 13 is a top view illustrating a cell with an irregular-shaped inner ring, according to an embodiment of the present invention.

In some embodiments, cell rings have non-circular (e.g., elliptical, rectangular, square, triangular), irregular shapes, or combinations thereof. Such a cell 1300 is shown in FIG. 13. Cell 1300 includes a circular outer ring 1310 and an irregular inner ring 1320. Rings 1310, 1320 surround payload/control section 1330 and rotate about a shaft 1340. While not the case in FIG. 13, the shape of the rings may be designed to accommodate components of the payload/control section, for example.

DEPLOYABLE SYSTEM

There are some missions in which a deployable system such as that shown in FIGS. 6C-10C may not provide the necessary functionality. A very large aperture telescope is one example. A large antenna is another. Accordingly, some embodiments have an alternative design that enables such missions.

Figure 14A:
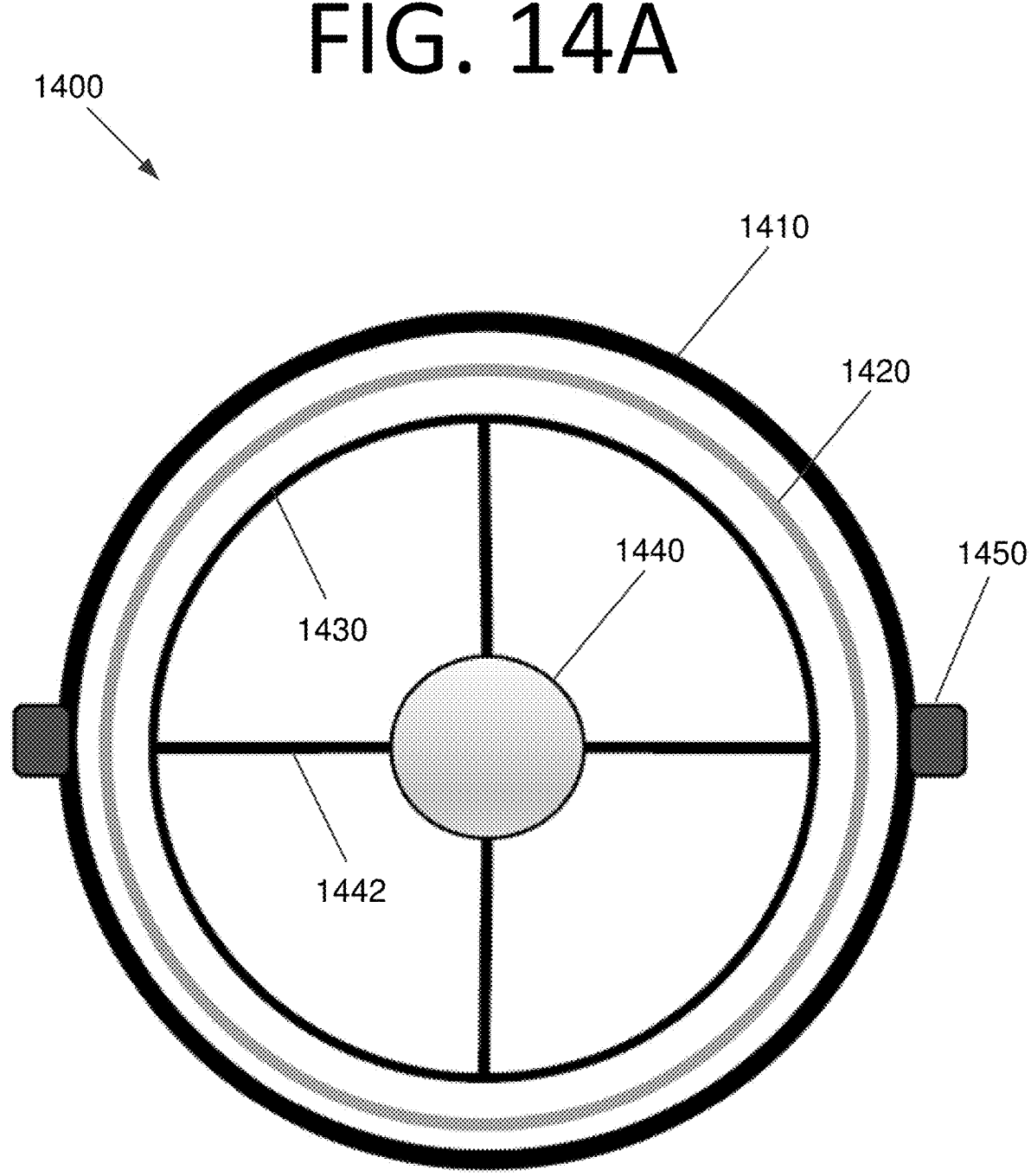
FIG. 14A is a top view illustrating a cell-based extensible/collapsible telescope, according to an embodiment of the present invention.
Figure 14B:
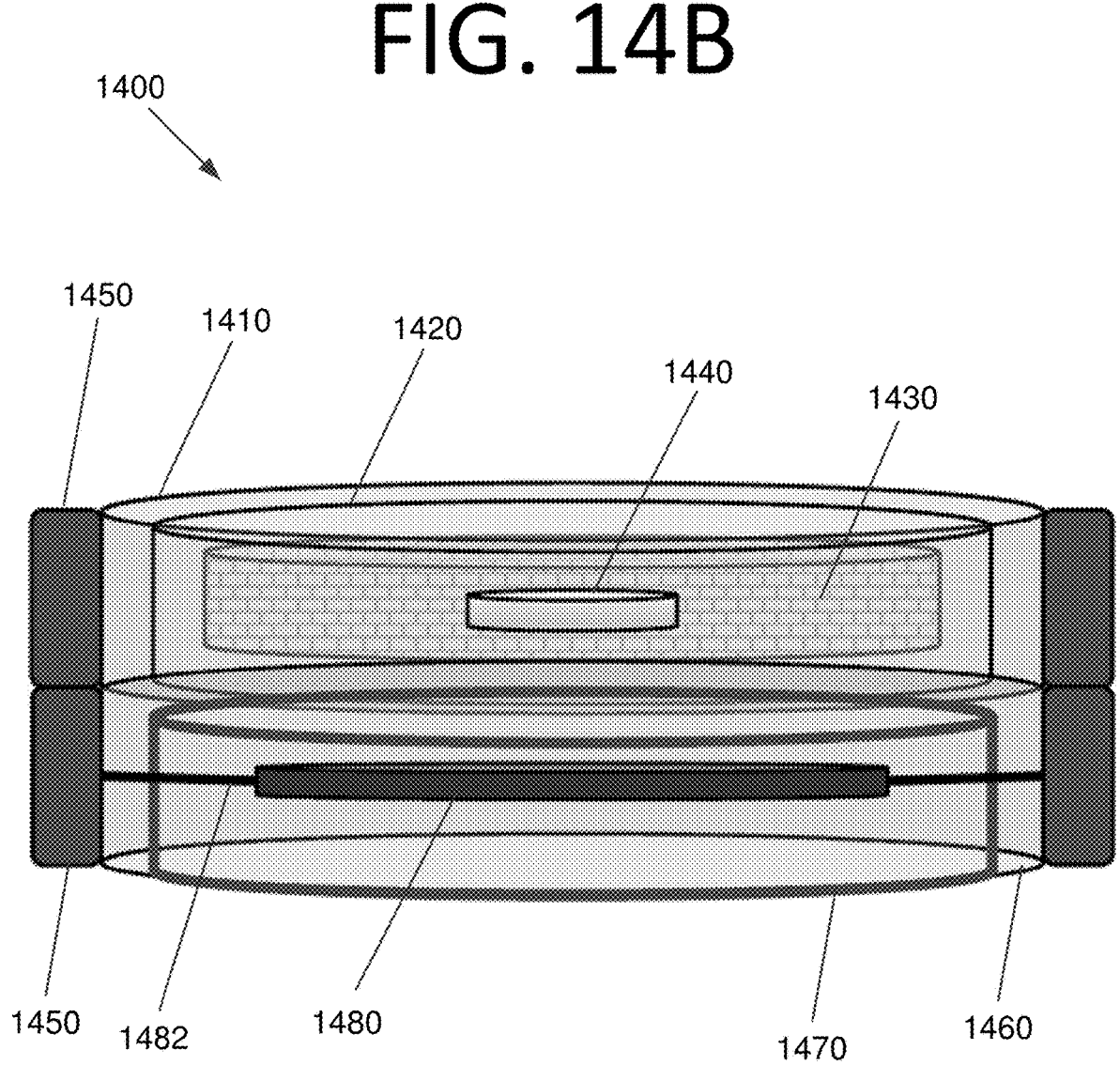
FIG. 14B is a side view illustrating the cell-based telescope in a collapsed configuration, according to an embodiment of the present invention.
Figure 14C:
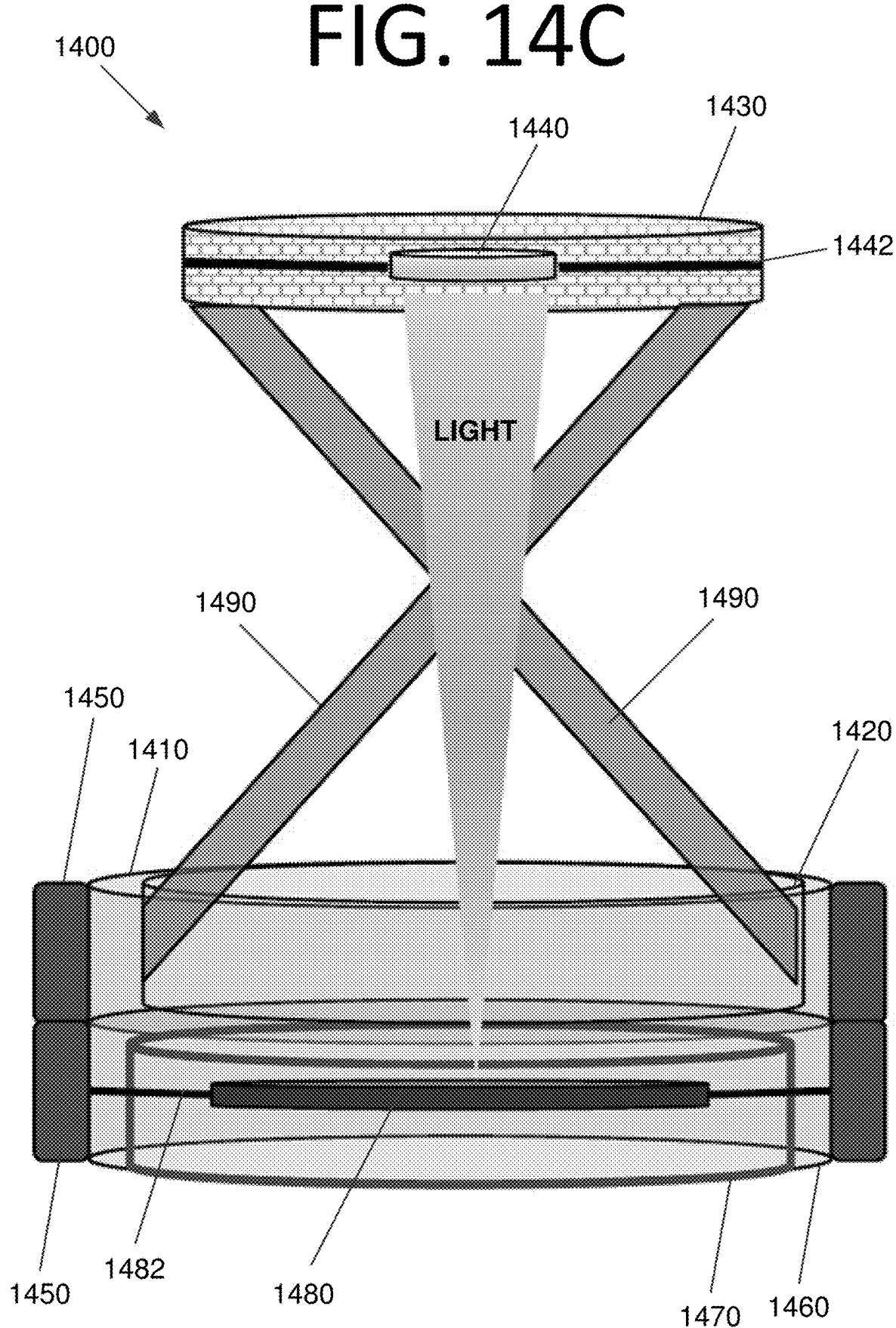
FIG. 14C is a side view illustrating the cell-based telescope in an extended configuration, according to an embodiment of the present invention.

FIGS. 14A-C illustrate a cell-based extensible/collapsible telescope 1400, according to an embodiment of the present invention. Telescope 1400 includes an upper portion with an outer ring 1410, an inner ring 1420, an upper lens/mirror support ring 1430, a lens/mirror 1440, supports 1442, and two prehensile contact points 1450. Prehensile contact points 1450 are movable trams on outer ring 1410 that allow cell-based extensible/collapsible telescope 1400 to be connected to at least two other rings. While two contact points 1450 are shown in this embodiment, more may be provided without deviating from the scope of the invention to enable more complex optics. Contact points 1450 have a prehensile grasp function, allowing a single contact point 1450 to grasp, be movable, and be rotatable, as in or similar to a ball-in-socket joint with a lock-clutch. The motion of contact point 1450 is controlled under motorized actuation control.

FIG. 14B shows a side view of telescope 1400. As seen in FIG. 14B, telescope 1400 also includes a lower portion with prehensile contact points 1450, an outer ring 1460, an inner ring 1470, a light sensor 1480, and light sensor supports 1482. Other components, such as light shields, light test instrumentation, etc. may be included in some embodiments.

FIG. 14C shows telescope 1400 when deployed. Lens support ring 1430 is extended via extension arms 1490. Extension arms 1490 may be controlled to place lens 1440 the desired distance from sensor 1480 in order to properly focus light. The received light may then be converted by sensor 1480 into analog, and then digital, electronic signals, which may then be processed by electronics (not shown) of telescope 1400. Additional mirrors may be used without deviating from the scope of the invention, and different configurations, such as a Schmidt-Cassegrain architecture, are also possible. Indeed, various such telescopes with different properties interconnected at prehensile contact points 1450 are possible without deviating from the scope of the invention. Due to the movable properties of contact points 1450, telescopes of some embodiments can be facing in one direction while others face in different directions.

Figure 14D:
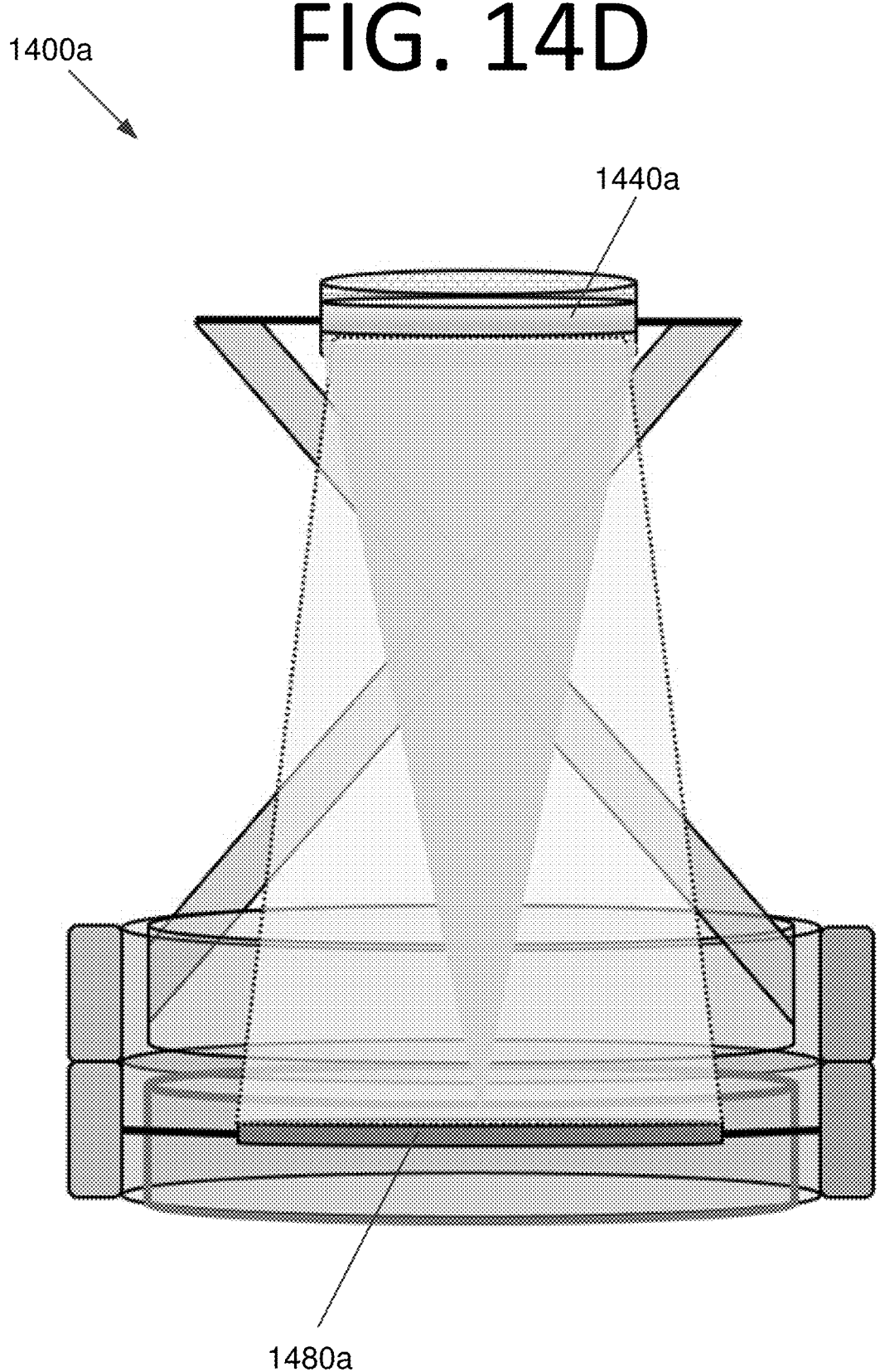
FIG. 14D is a side view illustrating a cell-based extensible/collapsible telescope with two reflecting mirrors, according to an embodiment of the present invention.

FIG. 14D illustrates a cell-based extensible/collapsible telescope 1400a similar to that of FIGS. 14A-C, except that telescope 1400a includes two reflecting mirrors 1440a, 1480a. In this embodiment, primary (larger) reflecting mirror 1480a has a hole in the middle (not shown) that houses sensors (e.g., photodetectors). Light striking mirror 1480a is focused and reflected onto mirror 1440a, which is then further focused and reflected through the hole onto the sensors. Components of telescope 1400a are otherwise similar to telescope 1400.

Figure 14E:
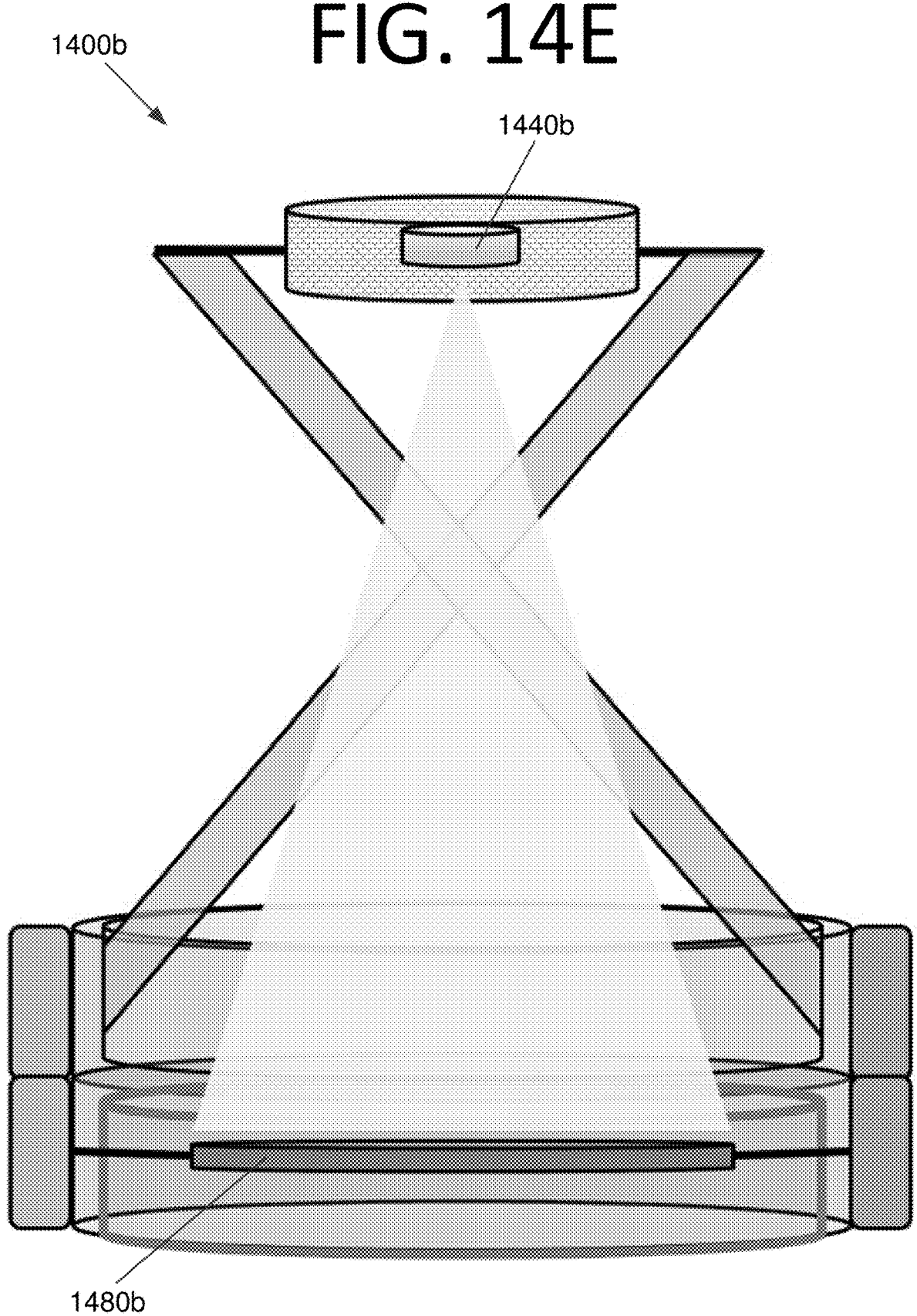
FIG. 14E is a side view illustrating an energy harvesting device, according to an embodiment of the present invention.

It should be noted that antennas or other energy harvesting devices that require a large capture aperture may be used in a similar manner to what is shown in FIGS. 14A-D without deviating from the scope of the invention. For example, FIG. 14E illustrates an example of an energy harvesting device 1400b. In FIG. 14E, a primary reflecting surface (i.e., an energy capture surface) 1480b is included, light from which is then focused onto a sensor 1440b. Components of energy harvesting device 1400b are otherwise similar to telescope 1400.

Figure 14F:
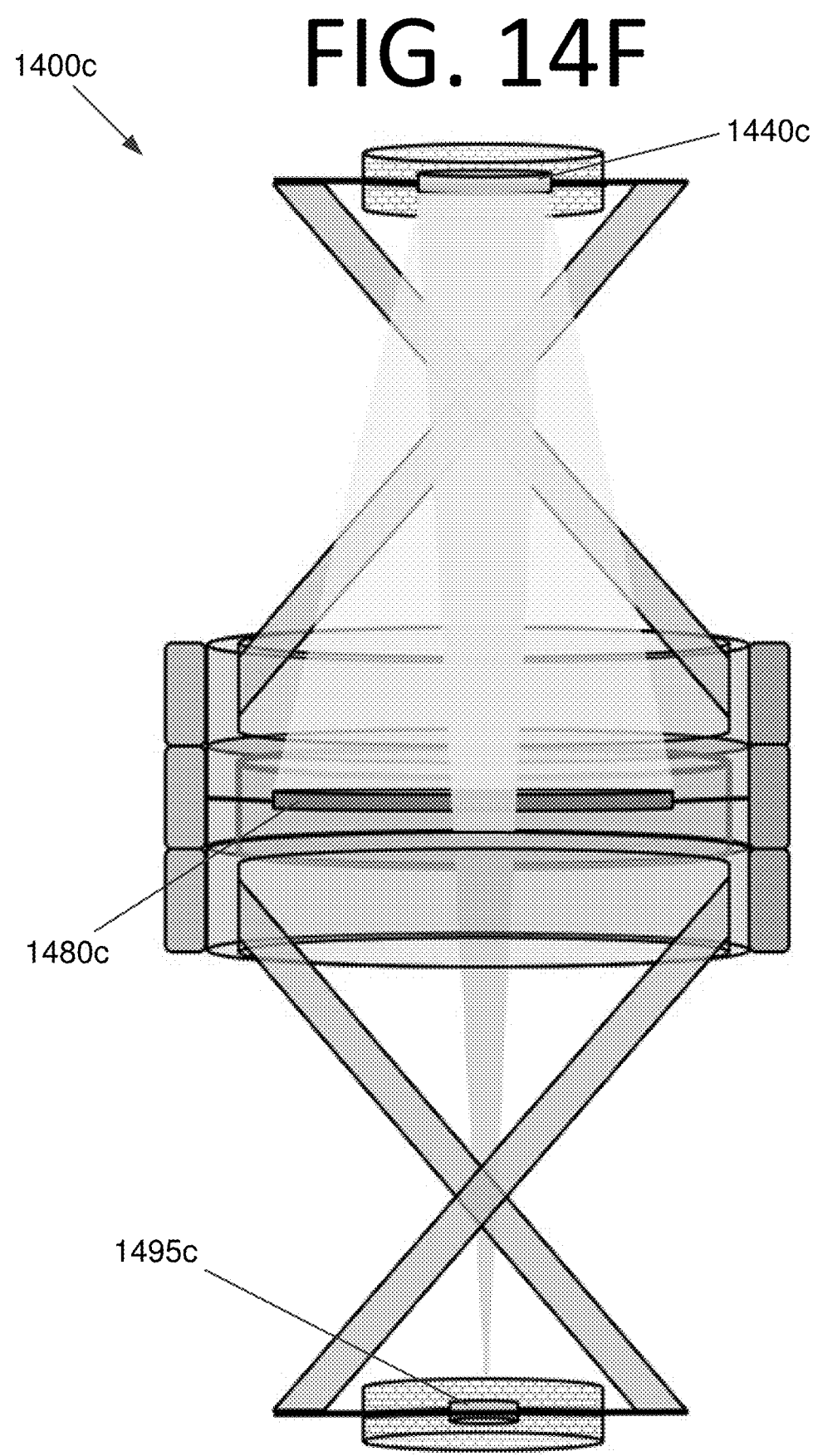
FIG. 14F is a side view illustrating another energy harvesting device, according to an embodiment of the present invention.

A more extended version of an energy harvesting device 1400c is shown in FIG. 14F. Energy harvesting device 1400c includes three attached rings, of which the top and bottom can expand. The center ring has a large reflector or energy harvesting surface 1480c, which has a hole (not visible). In this embodiment, while the top supported structure includes an energy harvesting reflector 1440c that captures the focused energy from reflector or energy harvesting surface 1480c, the bottom structure includes a sensor 1495c (e.g., a photodetector).

Figure 14G:
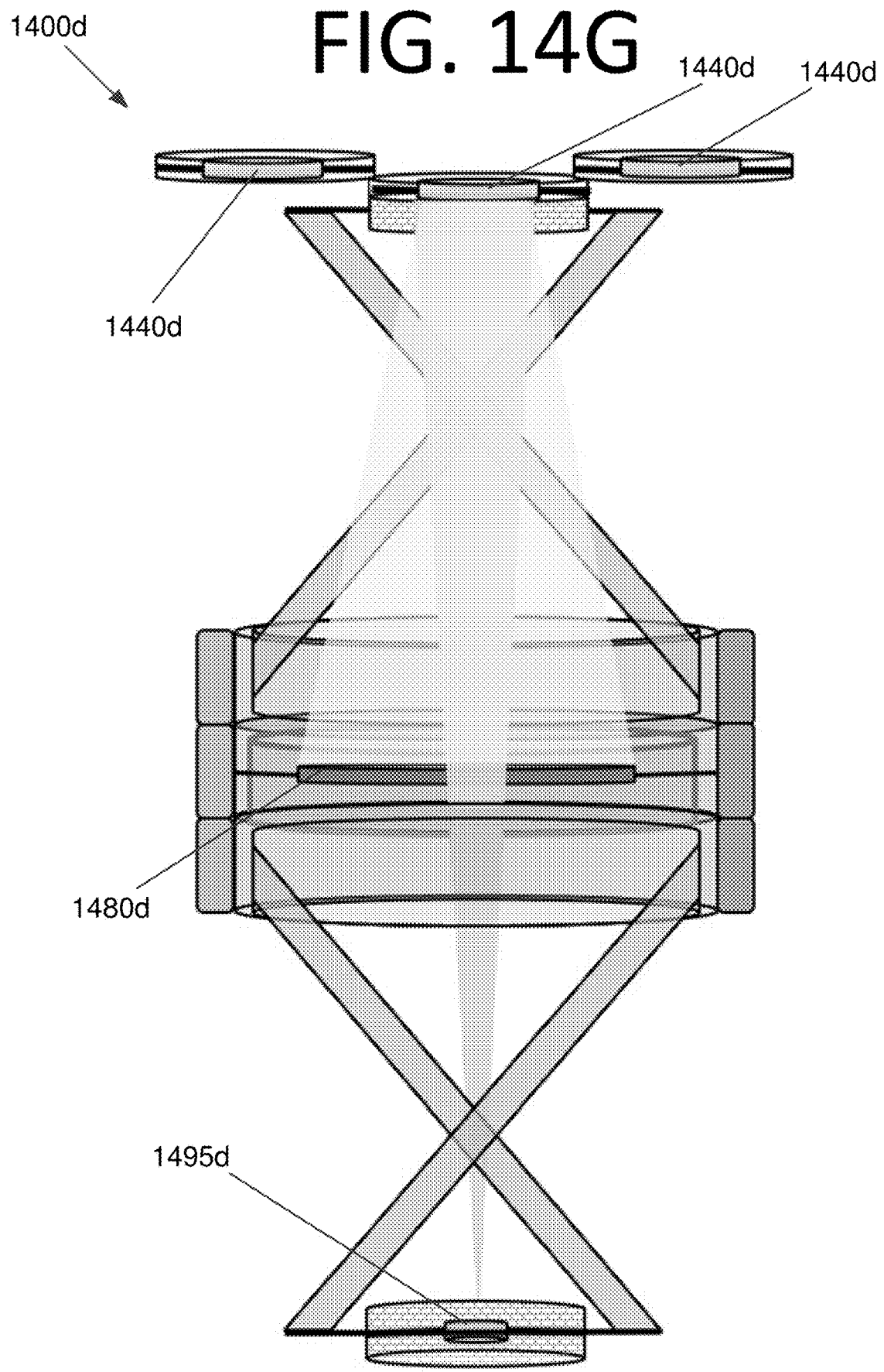
FIG. 14G is a side view illustrating still another energy harvesting device, according to an embodiment of the present invention.

A further expanded version of an energy harvesting device 1400d is shown in FIG. 14G, where a top optic/reflector 1440d can be replaced from one of three shown (even more can be attached in some embodiments). The top structure, which includes optic/reflector 1440d, actually has the shape as that shown in FIG. 9B, except that instead of structures 920, 930, 940, 950 being shields or solar panels, they are structures that hold a reflector with a different focal length, and can be rotated into position via connections similar to 922, 932, 942, and 952 (not shown). In FIG. 14G, the outer (or off-center) reflectors 1440d are displayed for easy delineation. In practice, connections similar to 922, 932, 942, 952 of FIG. 9 (not shown here) would allow the unused reflectors 1440d to be dropped down along the extension arms shown here (similar to extension arms 1490 of FIG. 14C) so that maximum energy or light could be harvested by reflector 1480d.

An advantage of the embodiment shown in FIG. 14G is that since both the top and bottom structures are collapsible, either or both can be retracted partially back. Consequently, this changes the focus of optic/reflector 1440d, reflector 1480d, and/or sensor 1495d. Energy harvesting device 1400d has a variable f-number, which is tantamount to a variable depth of field or resolution.

Figure 15:
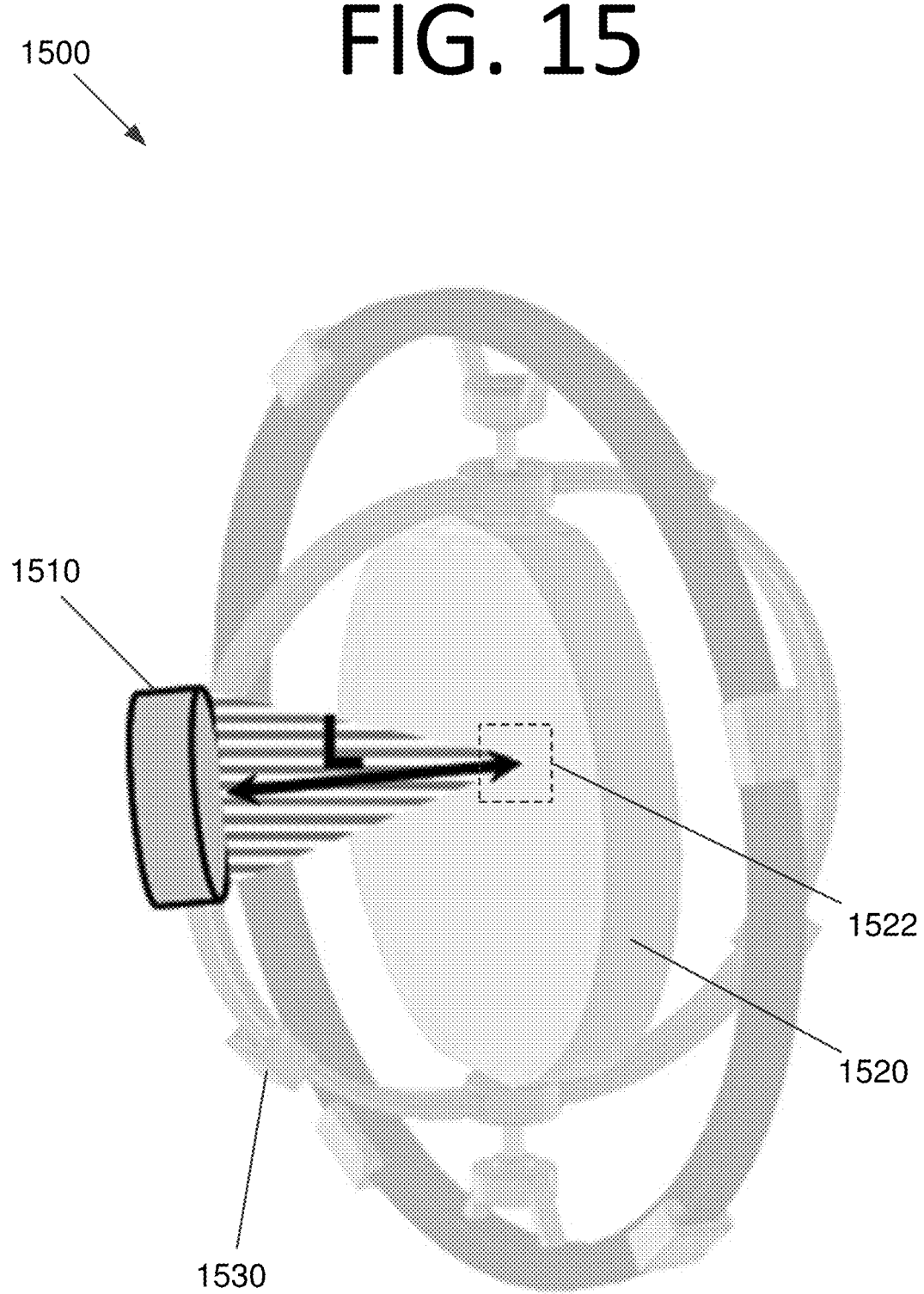
FIG. 15 is a perspective view illustrating a cell-based telescope system with a lens on a tram, according to an embodiment of the present invention.

In some embodiments, a lens/mirror may be deployed on a tram in order to provide additional telescope functionality. Such a cell 1500 is shown in FIG. 15. Telescope 1500 accommodates the need for an optical element (here, lens/mirror 1510) to be located at a precise distance from a component, such as a photodetector 1522 of payload control section 1520. Lens/mirror 1510 moves about its respective ring via a tram 1530. The specific tram 1530 that carries lens/mirror 1510 is obscured in this view. Lens/mirror 1510 on a movable tram 1530 can be a light shield, an RF collector, or any other device or structure that requires physical separation and precise distance separation without deviating from the scope of the invention.

REDUCING NOISE IN OPTICAL/RF DETECTORS

Figure 16:
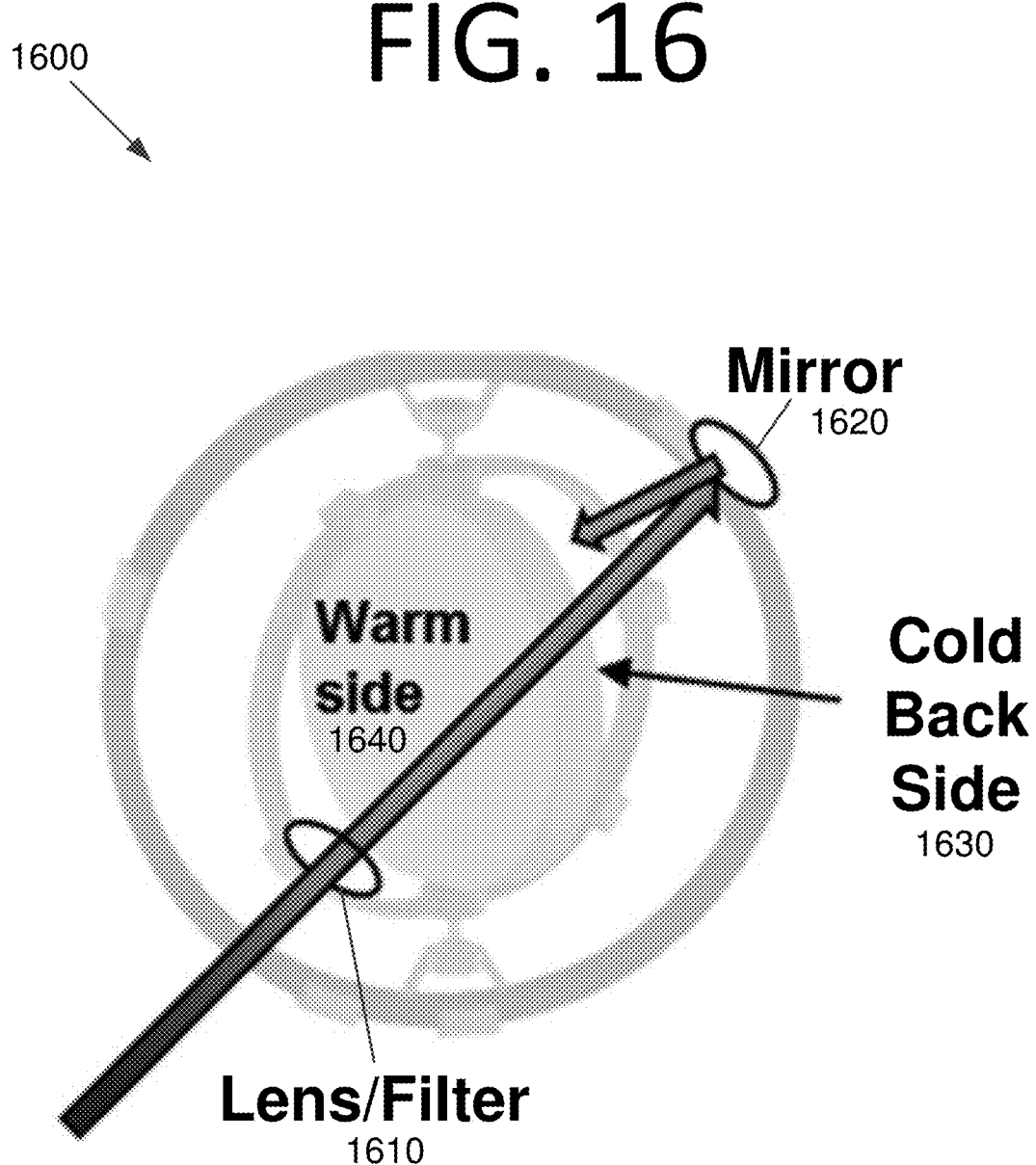
FIG. 16 is a perspective view illustrating a cell configured to reduce noise in an optical and/or RF detector, according to an embodiment of the present invention.

Some embodiments may also be used to reduce noise in an optical and/or RF detector. Such a cell 1600 is shown in FIG. 16. In cell 1600, a lens 1610 and a mirror 1620 with possible optical or RF filters/polarizers are employed to guide the incoming energy onto a side of the cell that is colder (e.g., cold side 1630) and holds a sensor (not visible). In this manner detection may occur on cold side 1630 rather than on warm side 1640, which may have more noise, be warm enough to damage the sensor, etc. A similar embodiment to that shown in FIG. 16 could be used to guide light or RF that is leaving the cell as (i.e., optical or RF reciprocity). In this example, the light or RF leaving the cell may come out from the warmer side in some embodiments.

LASER EMITTER/REFLECTOR SYSTEM

Figure 17:
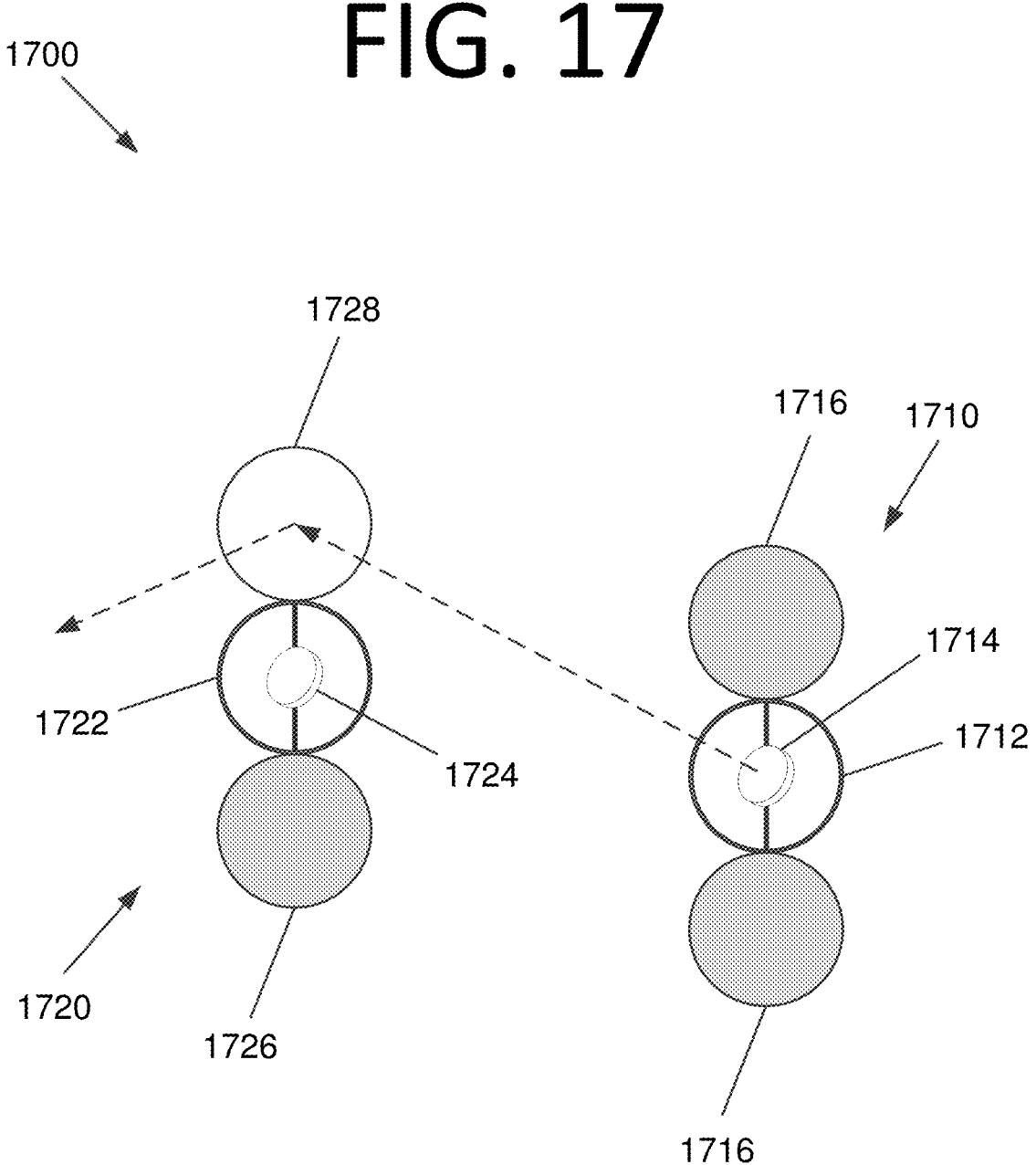
FIG. 17 illustrates a cell-based laser emitter/reflector system, according to an embodiment of the present invention.

Some embodiments may be used to transmit and reflect lasers, such as those containing a communication signal, to a target (e.g., another cell). Such a system 1700 is shown in FIG. 17. System 1700 includes a laser-emitting cell 1710 and a reflecting cell 1720. Laser-emitting cell includes a cell body 1712, a payload/control section 1714 that includes a laser, and two solar panels 1716. Reflecting cell 1720 includes a cell body 1722, a payload/control section 1724, a solar panel 1726, and a mirror 1728. Laser light emitted by payload control section 1714 is oriented towards mirror (or RF reflector) 1728. Mirror 1728 is oriented towards a target (e.g., a cell with another mirror, another space vehicle, a cell with a receiver, a ground station on Earth, etc.). In this manner, rapid intra-cell and external communications can be provided.

SPACE MASS-CONVEYOR BELT

It is also possible to form a cell-based space mass-conveyor belt. In some embodiments, the cell ensemble may have a large size (e.g., 1 km diameter or more). It may be desirable to move payloads (e.g., propellant, batteries, sensors, just mass, etc.) along the structure to mount it to a cell, or move it to a different cell.

Figure 18:
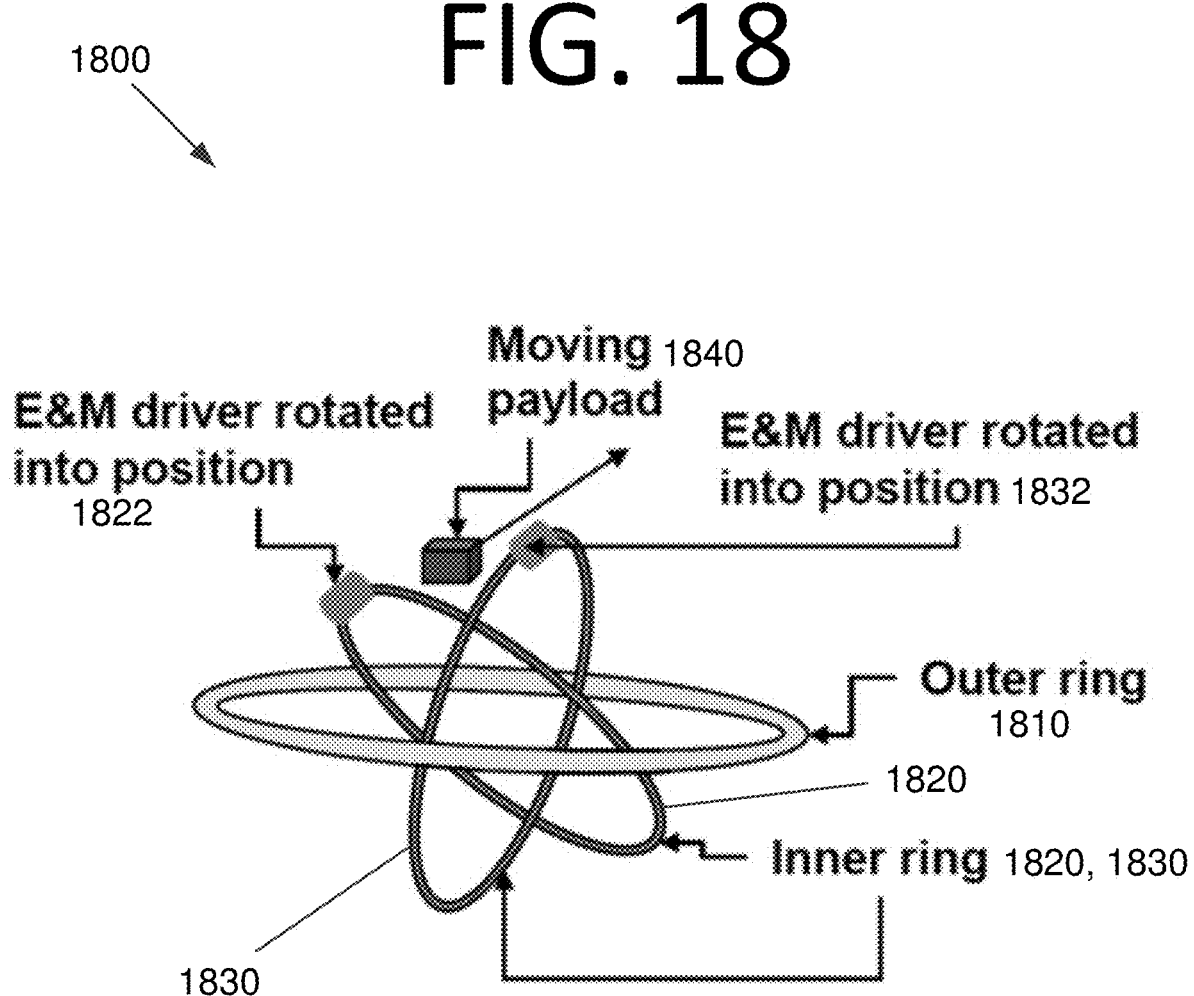
FIG. 18 is a perspective view illustrating a cell configured to move a payload, according to an embodiment of the present invention.

A cell 1800 for this purpose is shown in FIG. 18. Cell 1800 includes an outer ring 1810 and two inner rings 1820, 1830. Which inner ring is inside the other is a matter of design choice. As depicted, outer ring 1810 encompasses inner rings 1820, 1830, which are oriented to some angle with respect to one another and outer ring 1810.

Motion of a payload 1840 can be accomplished by moving a ring that is loaded by the payload using prehensile motion and mechanical transfer. Alternatively, and as shown here, two inner rings 1820, 1830 may be used to move the payload via electromagnetic actuation via electro & mechanical (E&M) drivers 1822, 1832. For instance, in the position shown in FIG. 18, it is assumed that payload 1840 has some relatively slow velocity as it enters rings 1810, 1820, 1830. E&M driver 1822 and E&M driver 1832 both briefly attract payload 1840 (i.e., pulling payload 1840 into the cross-ring structure of rings 1810, 1820, 1830). As payload 1840 moves into the middle of the cross-ring structure, E&M driver 1822 and E&M driver 1832 briefly turn off their magnetic attraction, and as the payload 1840 begins to exit the cross-ring structure, both E&M driver 1822 and E&M driver 1832 generate a field that repels payload 1840. This operation sequence, when exercised in a concatenated fashion along multiple connected rings (see FIG. 19, for example), will produce motion of payload 1840. Two items are not shown but are evident: (1) payload 1840 must itself be magnetic or must be in a magnetic container; and (2) another ring (not shown) or the payload/control section (not shown) provides a sequence of electromagnetic fields that maintain payload 1840 within the cross-ring structure of rings 1810, 1820, 1830.

Figure 19:
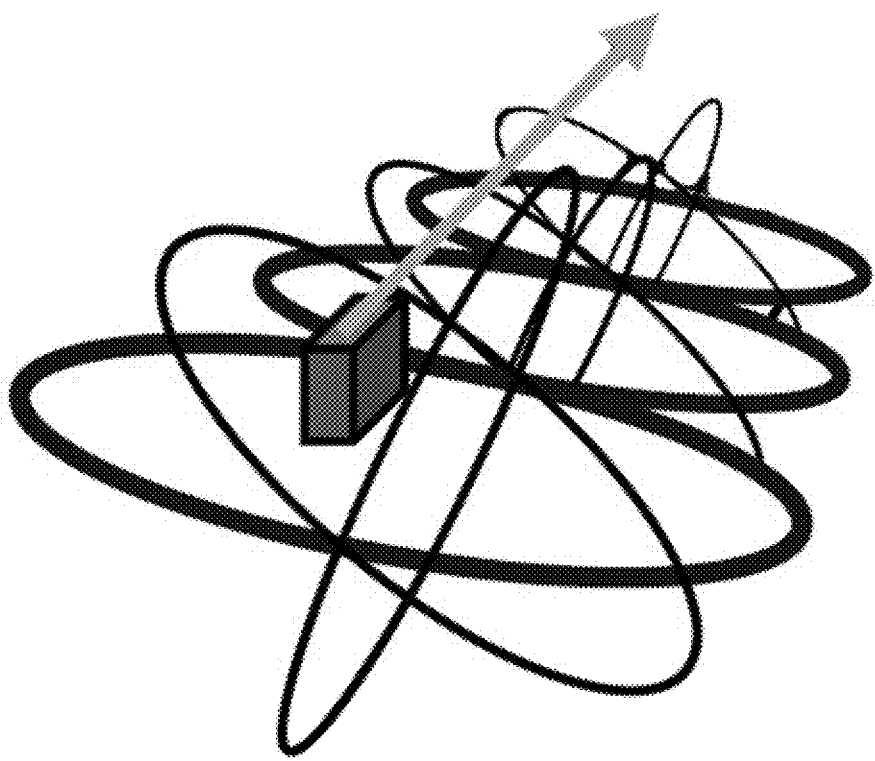
FIG. 19 is a perspective view illustrating a cell-based mass-conveyor belt in space, according to an embodiment of the present invention.

Multiple cells may form a virtual "rail" system that moves a payload along an electromagnetic "trap" by sequential electromagnetic actuation. Such a space cell-based conveyor belt system 1900 is shown in FIG. 19. In FIG. 19, the payload is moved along the line of the gray arrow. In some embodiments, a similar approach may be employed for terrestrial or underwater conveyor belt applications.

Figure 20:
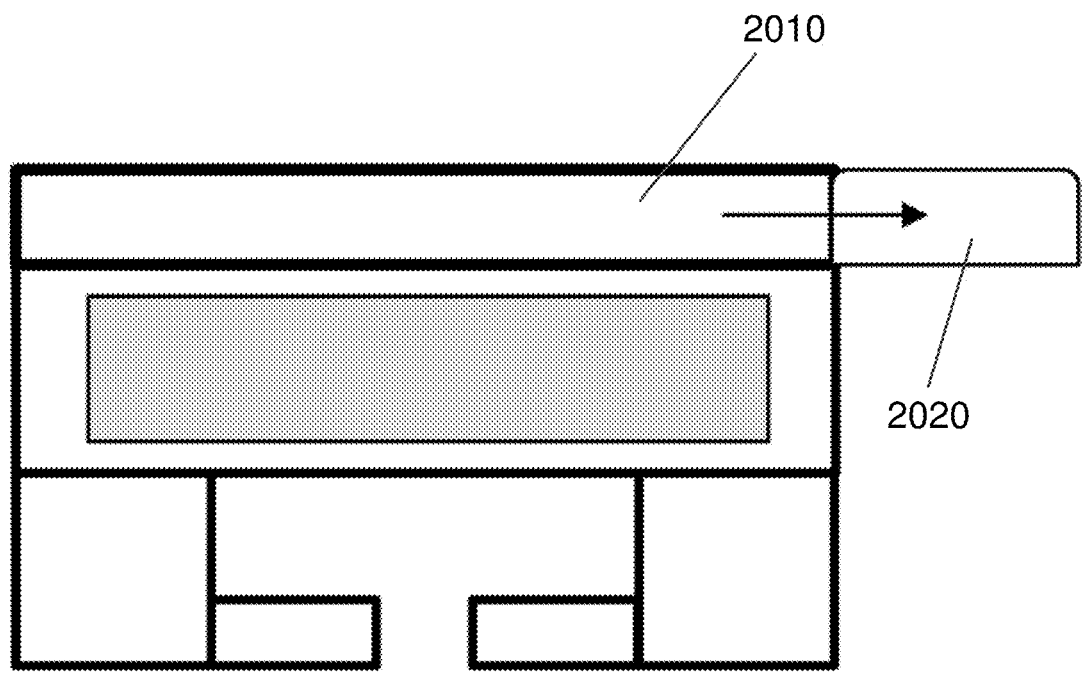
FIG. 20 is a front cutaway view illustrating a tram configured to be used in a mass-conveyor belt system, according to an embodiment of the present invention.

FIG. 20 is a front cutaway view illustrating a tram 2000 configured to be used in a mass-conveyor belt system, according to an embodiment of the present invention. Most components in team 2000 are similar to those of tram 140*a* in FIG. 1C. However, tram 2000 includes a magnet housing 2010 and electromagnets 2020 that are extendible outward from within magnet housing 2010. Alternatively, in some embodiments, electromagnets may be located on the left side of the top of the tram and be deployable via a hinge in a flip-out fashion, similar to the mechanism shown in FIG. 1H. Electromagnets 2020 alternate in polarity from north to south, as is better seen in FIG. 21. As a payload moves past magnets 2020, the polarities switch in a manner similar to a maglev train, driving the payload onward in conjunction with other electromagnets of other trams.

FIG. 21 illustrates a system 2100 for movement of a payload 2110 with respect to two trams 2120, 2130, according to an embodiment of the present invention. As can be seen, electromagnets of each tram 2120, 2130 have alternating polarities. Payload 2110 also has its own magnets (permanent or electromagnetic), the polarities of which may stay the same in some embodiments. As the electromagnets of trams 2120, 2130 alternate, payload 2110 moves along between trams 2120, 2130. The lower diagram shows the positions of trams 2120, 2130 during movement of payload 2110 in this example.

STRUCTURES

Various structures of cells are possible with nested-ring cell ensembles. Some such structures 2200 are shown in FIG. 22. For instance, the ring structures in the top shape can each rotate in any desired direction, and the collective structure may bend similar to a noodle. More exotic structures, such as an accordion-like cell structure separating connecting two arcs of cells, are also possible. Ring-based cells are easier to assemble in space than other types of structures (e.g., prismatic shapes). In all prismatic shape structures, there is the contention of dealing with the vertex or edge. A ring has no vertex, and can consequently "roll" about another attached ring using the movable tram concept. The concept of the prehensile grasp (or joint) as described above also enables a global twisting motion, which is shown in the top image of FIG. 22, without worrying about edge-contact since by fiat, the curvature about the contact point will always be away from the contact point.

Figure 23:
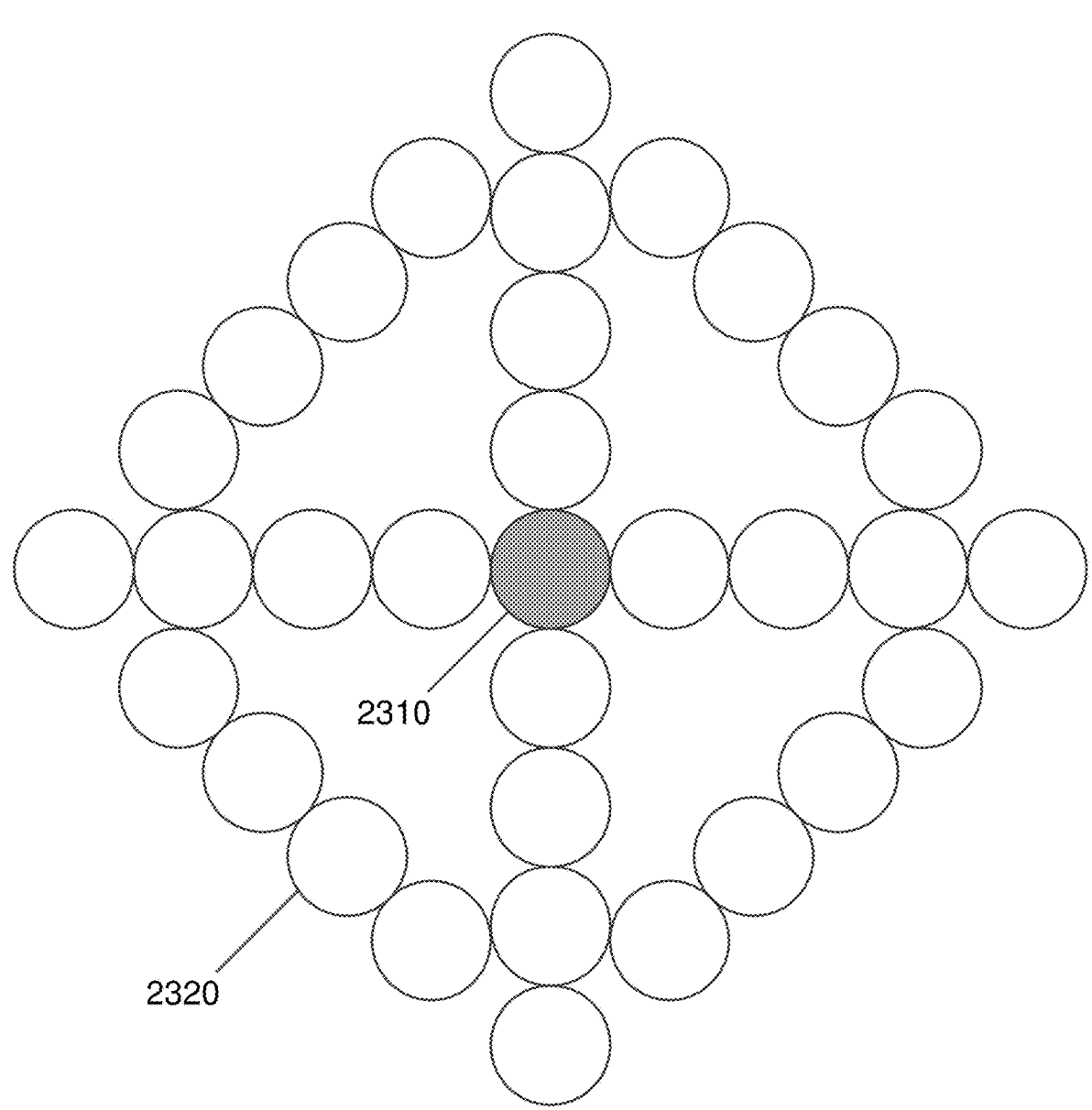
FIG. 23 illustrates a caged ensemble structure with a space-qualified nuclear reactor at its center, according to an embodiment of the present invention.

Per the above, it may be desirable to keep systems that are potentially damaging to other systems, such as a space-rated nuclear reactor, at a distance from sensitive sensors. A caged structure 2300 that does so with respect to the outer cells is shown in FIG. 23. Cell 2310 includes a space-rated nuclear reactor and is located at the center of the cage. Cells 2320 surround cell 2310 in a "boxed X" pattern. In this manner, cells at the outside of the cage may be kept some distance from cell 2310. Power and/or heat may be provided by cell 2310 to cells 2320.

Figure 24:
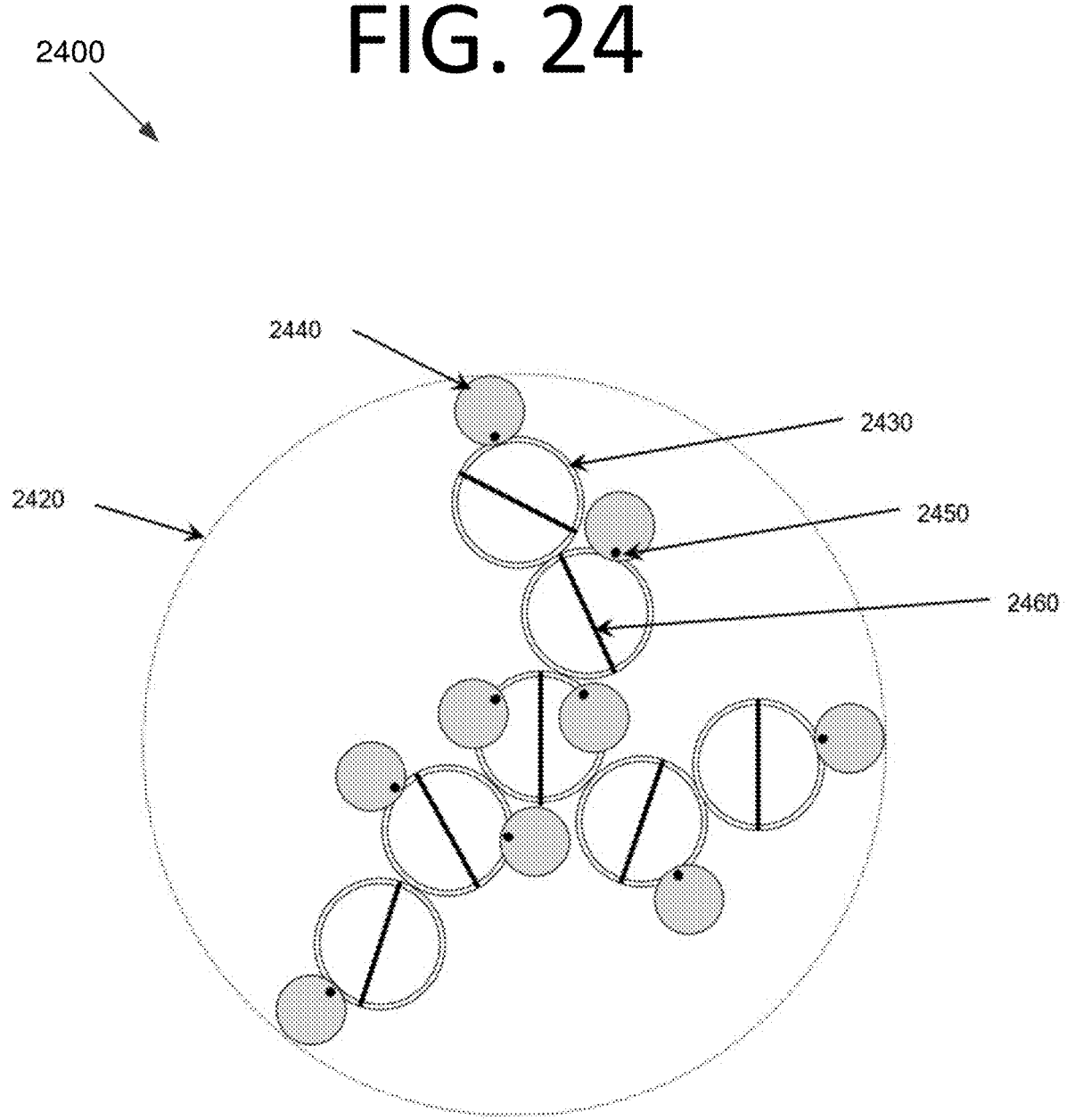
FIG. 24 is an architectural diagram illustrating a sparse aperture array, according to an embodiment of the present invention.

FIG. 24 is an architectural diagram illustrating a sparse aperture array 2400, according to an embodiment of the present invention. Sparse aperture array 2400 uses the configuration described with respect to FIG. 9B. In FIG. 24, seven cells 2430 include respective shafts 2460 (other nested cells and components not shown) that are connected (connections not shown) in a specific orientation defined in the literature as the Golay-9 array. See, for example, M. J. E. Golay, "Point Arrays Having Compact, Nonredundant Autocorrelations," J. Opt. Soc. America, Vol. 61, Issue 2, pp. 272-273 (1971). The Golay-9 refers to nine apertures 2440 that have rotated into the array shape shown using rotated connecting members 2450. Nine apertures 2440 are each designed to harness E&M radiation (e.g., light as per FIGS. 14A-G) and each have diameter of D. Mathematics shows that the Golay-9 array has resolution of an effective aperture of an approximate diameter of 11D, as given by effective aperture 2420.

Sparse aperture technology enables the use of many smaller apertures to arrive at a sensor (optical, microwave, RF, etc.) resolution that is given by a much larger aperture. Use of smaller apertures is beneficial at least because physically larger apertures are typically more difficult to manufacture and deploy. The Golay-9 is discussed by way of example only, and other sparse array distributions may be used without deviating from the scope of the invention.

TERRESTRIAL STRUCTURES

Unlike in space, where mass becomes relevant for changes in orbital motion and applied torques, for terrestrial applications (including applications on other celestial bodies, such as other planets, asteroids, comets, etc.), gravity and weight plays a role. Consequently, the materials used for the cells should be able to withstand the weight of the mass that is placed on top of them. This also applies to the interconnections or joints. The connection strength needs to be stronger than in space. However, a connection can be provided in some embodiments that can move, but then has a strong locking feature. Also, a tower to be built from connected rings should be designed to deploy from a stowed configuration (see FIG. 6A, for example) to an expanded configuration (see FIG. 6E, for example) such that the bottom ring can support the weight of all of the above-connected rings. However, such a structure may not be as practical as interconnected nested rings that form a truss structure (e.g., a deck, pony, or through truss, which is nomenclature used in bridge-forming technology). The strength requirement for each ring is reduced because the load bearing is shared, and so are the interconnections. Applications are also possible in some embodiments where the outer ring(s) are not circular, but rather triangular, square, or any other desired shape. Within this shape, one could also have nested ring structures, depending on the application.

UNDERWATER APPLICATIONS

Underwater, electrical connections need to be protected from water. The materials that make up the cells for underwater applications should also be water-compatible (for instance, able to resist corrosion in salt water). Depending on the water depth application, the outer ring in the nested ring structure could be made of a tubular material filled with air. The desired structure of connected nested rings may then be articulated or assembled on the water surface, and by removing the air and/or filling with water, it can be sunk to the desired depth. A variant of this idea includes overall structure designs that allow the major structure to have some buoyancy, and by a combination of partially removing or adding air or water in the ring tubes and/or changing the structure shape (via motion along the joints/trams, for instance), the buoyancy can be varied, thereby enabling structures to be moved up and down through a column of water (Archimedes principle). For example, an open cage structure, such as that in FIG. 23, could be made to float while a collapsed structure, such as that in FIG. 6A, could be made to sink.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A nested-ring cell, comprising:
an outer ring;
an inner ring located within the outer ring; and
one or more movable trams, each of the one or more movable trams located on and riding along the outer ring or the inner ring and configured to move along at least a portion of the outer ring or the inner ring on which the respective movable tram is located using the respective ring as a track, wherein
the nested-ring cell is a space vehicle.

2. The nested-ring cell of claim 1, further comprising:
a middle ring located between the outer ring and the inner ring.

3. The nested-ring cell of claim 2, further comprising:
a shaft connecting the outer ring, the middle ring, and the inner ring, wherein
the outer ring, the middle ring, and the inner ring are rotatably connected to the shaft.

4. The nested-ring cell of claim 3, further comprising:
outer ring motors, middle ring motors, and inner ring motors, wherein
the outer ring motors, the middle ring motors, and the inner ring motors are configured to facilitate rotation of the outer ring, the middle ring, and the inner ring, respectively.

5. The nested-ring cell of claim 1, wherein the outer ring and the inner ring are collapsible such that they can be stowed in a flattened configuration and then deployed once the nested-ring cell is in space.

6. The nested-ring cell of claim 1, wherein the outer ring, the inner ring, or both comprise control electronics configured to control operations of the respective ring or operation of the entire cell.

7. The nested-ring cell of claim 1, wherein at least one of the one or more movable trams comprises control electronics that are configured to control operation of one or both of the outer ring and the inner ring, or operation of the entire cell.

8. The nested-ring cell of claim 1, wherein the cell further comprises:
a payload/control section configured to control operations of the cell, wherein
the payload/control section has a flat shape that, in part, facilitates a compact form factor for the cell when in a stowed configuration.

9. The nested-ring cell of claim 8, wherein the payload/control section comprises at least one propellant storage tank.

10. The nested-ring cell of claim 8, wherein the payload/control section comprises:
a reaction wheel housing; and
a momentum management system that includes reaction wheels and a momentum dumping system that controls a net angular momentum vector of the payload/control section and enables desaturation of momentum generated by the reaction wheels, wherein
the payload/control section is configured to countermand rotation of the outer ring and/or the inner ring, or a plurality of interconnected cells, via the momentum management system.

11. The nested-ring cell of claim 1, wherein the outer ring, the inner ring, or both comprises a rail that comprises power and data lines to provide power to and control at least one of the one or more movable trams.

12. The nested-ring cell of claim 1, wherein the outer ring, the inner ring, or both, comprises:
at least one rotatable nozzle configured to propel the nested-ring cell; and
at least one propellant line configured to provide propellant to the at least one rotatable nozzle.

13. The nested-ring cell of claim 1, wherein at least one of the one or more movable trams is configured to:
connect to at least one other cell, at least one other tram of another cell, at least one other structure, or any combination thereof;
provide power, data, fuel, heat, or any combination thereof, to at least one other cell;
act as a support structure that holds external components that can be articulated; or
any combination of the above.

14. The nested-ring cell of claim 1, wherein at least one of the one or more movable trams comprises a linking mechanism that is configured to perform linking operations with linking members of other trams, with other structures, or both.

15. The nested-ring cell of claim 14, wherein the linking mechanism comprises an electromagnet configured to engage with magnets of rings, trams, or both.

16. The nested-ring cell of claim 15, wherein the linking mechanism comprises a layered interface comprising hardware and software that provides visual pose estimation for docking, testing of signals and information to be passed between trams, and security against cyber threats.

17. The nested-ring cell of claim 15, wherein the linking mechanism is motorized and comprises a portion of a hinge joint, a pivot joint, a ball and socket joint, an ellipsoid in socket joint, a saddle joint, plane joint, a mechanical and magnetic interlock, or a spring-loaded ball and groove joint.

18. The nested-ring cell of claim 1, wherein at least one of the one or more movable trams further comprises circuitry configured to control operation of the respective movable tram and its components.

19. The nested-ring cell of claim 1, wherein a ring along which at least one of the one or more movable trams moves comprises a rail with a tram retaining section.

20. The nested-ring cell of claim 19, wherein at least one of the one or more movable trams comprises tram retaining members configured to engage with the tram retaining section of the rail to keep the respective movable tram operably connected to its respective ring.

21. The nested-ring cell of claim 19, wherein at least one of the one or more movable trams comprises wheels that contact the tram retaining section of the rail and facilitate movement of the respective movable tram along the rail.

22. The nested-ring cell of claim 1, wherein at least one of the one or more movable trams comprises:
at least one nozzle configured to expel a propellant gas; and
a local propellant tank configured to supply the at least one nozzle with the propellant gas.

23. The nested-ring cell of claim 22, wherein at least one of the one or more movable trams further comprises:
a respective control valve for each of the at least one nozzles; and
control circuitry configured to control the at least one control valve.

24. The nested-ring cell of claim 1, wherein at least one of the one or more movable trams comprises:
a motorized hinge operably connected to the respective movable tram and a device, wherein
the hinge enables the device to flip out from the respective movable tram and deploy.

25. The nested-ring cell of claim 24, wherein the device comprises a lens, a mirror, a shade, a filter, a flip-out sensor, a flip-out angular momentum control device, a patterned electrode that serves as a linear motor, or any combination thereof.

26. The nested-ring cell of claim 1, wherein at least one of the one or more movable trams comprises:
at least two horn antennas located on different sides of the respective movable tram; and
control electronics operably connected to the at least two horn antennas, wherein
the at least two horn antennas and control electronics are configured to facilitate millimeter wave (mm-Wave) and microwave (µWave) sensing or broadcasting.

27. The nested-ring cell of claim 1, wherein at least one of the one or more movable trams comprises:
a plurality of imagers or detectors.

28. The nested-ring cell of claim 1, wherein at least one of the one or more movable trams comprises:
a laser system configured to provide a source laser for LIDAR or optical communications;
a gimbled or galvanometer-based beam delivery control system configured to control the source laser from the laser system; and
a cooling system configured to dissipate heat generated by the laser system.

29. The nested-ring cell of claim 1, wherein at least one of the one or more movable trams is a rotatable tram comprising:
a linking mechanism;
a rotatable collar to which the linking mechanism is operably connected;
an inner tram ring about which the rotatable collar rotates; and
control electronics configured to control rotation of the rotatable collar.

30. The nested-ring cell of claim 29, wherein the rotatable tram further comprises:
a plurality of rail guides on the inner tram ring that receive power from a ring to which the respective movable tram is connected and provide power for the control electronics.

31. The nested-ring cell of claim 1, further comprising:
at least one solar panel, at least one heat shield, at least one reflecting surface, at least one antenna dish, or any combination thereof, that is operably connected to the nested-ring cell via a respective extensible, rotatable connecting member driven by an actuator.

32. The nested-ring cell of claim 31, wherein when in a stowed configuration, the at least one solar panel, the at least one heat shield, the at least one reflecting surface, the at least one antenna dish, or the combination thereof, are stowed within a body of the nested-ring cell.

33. The nested-ring cell of claim 31, wherein the at least one solar panel, the at least one heat shield, the at least one reflecting surface, the at least one antenna dish, or the combination thereof, comprise a battery or a radiator on a side thereof.

34. The nested-ring cell of claim 1, further comprising:
a deployable telescope, a deployable energy harvesting device, or any combination thereof.

35. The nested-ring cell of claim 34, wherein a deployable telescope, a deployable energy harvesting device, or the combination thereof are configured from a plurality of cells.

36. The nested-ring cell of claim 1, further comprising:
a middle ring located between the outer ring and the inner ring, wherein
the middle ring and the inner ring each comprise at least one tram comprising electro & mechanical (E&M) drivers configured to move a magnetic payload, and
multiple cells of the plurality of cells form a virtual "rail" system that entraps a payload within the virtual rail and propels the payload by sequential electromagnetic actuation.

37. The nested-ring cell of claim 36, wherein the at least one tram of the middle ring and the inner ring comprise a plurality of extendible electromagnets that are collectively configured to propel the magnetic payload.

* * * * *